US011963526B2

(12) United States Patent
Freed

(10) Patent No.: US 11,963,526 B2
(45) Date of Patent: Apr. 23, 2024

(54) APPARATUS AND METHOD FOR ORGAN PERFUSION

(71) Applicant: TransMedics, Inc., Andover, MA (US)

(72) Inventor: Darren Freed, Edmonton (CA)

(73) Assignee: TRANSMEDICS, INC., Andover, MA (US)

(*) Notice: Subject to any disclaimer, the term of this patent is extended or adjusted under 35 U.S.C. 154(b) by 0 days.

(21) Appl. No.: 17/372,211

(22) Filed: Jul. 9, 2021

(65) Prior Publication Data
US 2021/0337782 A1 Nov. 4, 2021

Related U.S. Application Data

(63) Continuation of application No. 15/533,690, filed as application No. PCT/CA2015/051316 on Dec. 11, 2015, now Pat. No. 11,083,191.

(60) Provisional application No. 62/090,984, filed on Dec. 12, 2014.

(51) Int. Cl.
A01N 1/02 (2006.01)
(52) U.S. Cl.
CPC .................. A01N 1/0247 (2013.01)
(58) Field of Classification Search
CPC .............. A01N 1/0247; A01N 1/0278
See application file for complete search history.

(56) References Cited

U.S. PATENT DOCUMENTS 3,253,595 A 5/1966 Keller, Jr. et al.
3,388,803 A 6/1968 Scott
3,406,531 A 10/1968 Koski et al.
3,468,136 A 9/1969 Koski et al.
3,537,956 A 11/1970 Falcone
3,545,221 A 12/1970 Koski et al.
(Continued)

FOREIGN PATENT DOCUMENTS

CA 2144952 A1 3/1994
CA 2521324 A1 10/2004
(Continued)

OTHER PUBLICATIONS

US 11,758,904 B2, 09/2023, Freed (withdrawn)
(Continued)

Primary Examiner — Jonathan M Hurst
(74) Attorney, Agent, or Firm — Wilmer Cutler Pickering Hale and Dorr LLP

(57) ABSTRACT

Apparatus for perfusion of multiple types of organs include base unit configured to removably couple with a perfusion module for perfusing an organ. The base unit has conduits for connecting a source of a perfusate to the organ to circulate the perfusate through the organ; first and second pumps coupled to the conduits for driving circulation of the perfusate in the conduits; and a controller configured and connected for controlling the first and second pumps to regulate the circulation of the perfusate through the organ. The controller is operable to control the first and second pumps to perfuse the organ in accordance with organ specific perfusion parameters. The organ specific perfusions parameters are selected based on the type of the organ, and may be selected by an operator for at least two organ types selected from the group of heart, liver, kidney and lung.

15 Claims, 23 Drawing Sheets

(56) References Cited

U.S. PATENT DOCUMENTS

| | | |
|---|---|---|
| 3,545,605 A | 12/1970 | Robins |
| 3,587,567 A | 6/1971 | Schiff |
| 3,607,646 A | 9/1971 | de Roissart |
| 3,632,473 A | 1/1972 | Belzer et al. |
| 3,639,084 A | 2/1972 | Goldhaber |
| 3,654,085 A | 4/1972 | Fritz et al. |
| 3,660,241 A | 5/1972 | Michielsen |
| 3,738,914 A | 6/1973 | Thorne et al. |
| 3,772,153 A | 11/1973 | De Roissart |
| 3,777,507 A | 12/1973 | Burton et al. |
| 3,843,455 A | 10/1974 | Bier et al. |
| 3,851,646 A | 12/1974 | Sarns |
| 3,881,990 A | 5/1975 | Burton et al. |
| 3,995,444 A | 12/1976 | Clark et al. |
| 4,004,298 A | 1/1977 | Freed |
| 4,069,826 A | 1/1978 | Sessions |
| 4,186,253 A | 1/1980 | Yokoyama et al. |
| 4,186,565 A | 2/1980 | Toledo-Pereyra |
| 4,231,354 A | 11/1980 | Kurtz et al. |
| 4,415,556 A | 11/1983 | Bretschneider |
| 4,598,697 A | 7/1986 | Numazawa et al. |
| 4,605,644 A | 8/1986 | Foker |
| 4,666,425 A | 5/1987 | Fleming |
| 4,719,201 A | 1/1988 | Foker |
| 4,723,939 A | 2/1988 | Anaise |
| 4,745,759 A | 5/1988 | Bauer et al. |
| 4,759,371 A | 7/1988 | Franetzki |
| 4,801,299 A | 1/1989 | Brendel et al. |
| 4,847,470 A | 7/1989 | Bakke |
| 4,920,044 A | 4/1990 | Bretan, Jr. |
| 5,051,352 A | 9/1991 | Martindale et al. |
| 5,066,578 A | 11/1991 | Wikman-Coffelt |
| 5,141,847 A | 8/1992 | Sugimachi et al. |
| 5,145,771 A | 9/1992 | Lemasters et al. |
| 5,157,930 A | 10/1992 | McGhee et al. |
| 5,200,398 A | 4/1993 | Strasberg et al. |
| 5,217,860 A | 6/1993 | Fahy et al. |
| 5,285,657 A | 2/1994 | Bacchi et al. |
| 5,306,711 A | 4/1994 | Andrews |
| 5,326,706 A | 7/1994 | Yland et al. |
| 5,338,662 A | 8/1994 | Sadri |
| 5,354,268 A | 10/1994 | Peterson et al. |
| 5,356,593 A | 10/1994 | Heiberger et al. |
| 5,356,771 A | 10/1994 | O'Dell |
| 5,358,931 A | 10/1994 | Rubinsky et al. |
| 5,362,622 A | 11/1994 | O'Dell et al. |
| 5,370,989 A | 12/1994 | Stern et al. |
| 5,381,510 A | 1/1995 | Ford et al. |
| 5,385,821 A | 1/1995 | O'Dell et al. |
| 5,395,314 A | 3/1995 | Klatz et al. |
| 5,405,742 A | 4/1995 | Taylor |
| 5,407,669 A | 4/1995 | Lindstrom et al. |
| 5,407,793 A | 4/1995 | Del Nido et al. |
| 5,472,876 A | 12/1995 | Fahy |
| 5,473,791 A | 12/1995 | Holcomb et al. |
| 5,494,822 A | 2/1996 | Sadri |
| 5,498,427 A | 3/1996 | Menasche |
| 5,505,709 A | 4/1996 | Funderburk et al. |
| 5,514,536 A | 5/1996 | Taylor |
| 5,552,267 A | 9/1996 | Stern et al. |
| 5,554,123 A | 9/1996 | Herskowitz |
| 5,554,497 A | 9/1996 | Raymond |
| 5,571,801 A | 11/1996 | Segall et al. |
| 5,584,804 A | 12/1996 | Klatz et al. |
| 5,586,438 A | 12/1996 | Fahy |
| 5,588,816 A | 12/1996 | Abbott et al. |
| 5,599,173 A | 2/1997 | Chen et al. |
| 5,599,659 A | 2/1997 | Brasile et al. |
| 5,613,944 A | 3/1997 | Segall et al. |
| 5,643,712 A | 7/1997 | Brasile |
| 5,654,266 A | 8/1997 | Chen et al. |
| 5,656,420 A | 8/1997 | Chien |
| 5,679,565 A | 10/1997 | Mullen et al. |
| 5,693,462 A | 12/1997 | Raymond |
| 5,698,536 A | 12/1997 | Segall et al. |
| 5,699,793 A | 12/1997 | Brasile |
| 5,702,881 A | 12/1997 | Brasile et al. |
| 5,716,378 A | 2/1998 | Minten |
| 5,723,281 A | 3/1998 | Segall et al. |
| 5,733,894 A | 3/1998 | Segall et al. |
| 5,747,071 A | 5/1998 | Segall et al. |
| 5,752,929 A | 5/1998 | Klatz et al. |
| 5,759,148 A | 6/1998 | Sipin |
| 5,770,149 A | 6/1998 | Raible |
| 5,776,063 A | 7/1998 | Dittrich et al. |
| 5,786,136 A | 7/1998 | Mayer |
| 5,787,544 A | 8/1998 | Meade |
| 5,807,737 A | 9/1998 | Schill et al. |
| 5,823,799 A | 10/1998 | Tor et al. |
| 5,843,024 A | 12/1998 | Brasile |
| 5,856,081 A | 1/1999 | Fahy |
| 5,882,328 A | 3/1999 | Levy et al. |
| 5,965,433 A | 10/1999 | Gardetto et al. |
| 5,998,240 A | 12/1999 | Hamilton et al. |
| 6,024,698 A | 2/2000 | Brasile |
| 6,034,109 A | 3/2000 | Ramasamy et al. |
| 6,042,550 A | 3/2000 | Haryadi et al. |
| 6,046,046 A | 4/2000 | Hassanein |
| 6,050,987 A | 4/2000 | Rosenbaum |
| 6,090,776 A | 7/2000 | Kuberasampath et al. |
| 6,100,082 A | 8/2000 | Hassanein |
| 6,110,139 A | 8/2000 | Loubser |
| 6,110,504 A | 8/2000 | Segall et al. |
| 6,144,444 A | 11/2000 | Haworth et al. |
| 6,168,877 B1 | 1/2001 | Pedicini et al. |
| 6,217,546 B1 | 4/2001 | Hinchliffe et al. |
| 6,365,338 B1 | 4/2002 | Bull et al. |
| 6,375,611 B1 | 4/2002 | Voss et al. |
| 6,375,613 B1 | 4/2002 | Brasile |
| 6,389,308 B1 | 5/2002 | Shusterman |
| 6,402,461 B1 | 6/2002 | Tebby |
| 6,475,716 B1 | 11/2002 | Seki |
| 6,490,880 B1 | 12/2002 | Walsh |
| 6,492,103 B1 | 12/2002 | Taylor |
| 6,492,745 B1 | 12/2002 | Colley, III et al. |
| 6,524,785 B1 | 2/2003 | Cozzone et al. |
| 6,526,974 B1 | 3/2003 | Brydon et al. |
| 6,569,615 B1 | 5/2003 | Thatte et al. |
| 6,582,375 B2 | 6/2003 | Melvin et al. |
| 6,582,953 B2 | 6/2003 | Brasile |
| 6,600,941 B1 | 7/2003 | Khuri |
| 6,609,987 B1 | 8/2003 | Beardmore |
| 6,631,830 B2 | 10/2003 | Ma et al. |
| 6,642,045 B1 | 11/2003 | Brasile |
| 6,673,594 B1 | 1/2004 | Owen et al. |
| 6,696,238 B2 | 2/2004 | Murphy et al. |
| 6,740,484 B1 | 5/2004 | Khirabadi et al. |
| 6,764,462 B2 | 7/2004 | Risk, Jr. et al. |
| 6,783,328 B2 | 8/2004 | Lucke et al. |
| 6,792,309 B1 | 9/2004 | Noren |
| 6,794,124 B2 | 9/2004 | Steen |
| 6,811,965 B2 | 11/2004 | Vodovotz et al. |
| 6,837,851 B1 | 1/2005 | Coroneo |
| 6,878,339 B2 | 4/2005 | Akiyama et al. |
| 6,894,690 B2 | 5/2005 | Capers |
| 6,906,325 B2 | 6/2005 | Quek |
| 6,925,324 B2 | 8/2005 | Shusterman |
| 6,953,655 B1 | 10/2005 | Hassanein et al. |
| 6,974,436 B1 | 12/2005 | Aboul-Hosn et al. |
| 7,001,354 B2 | 2/2006 | Suzuki et al. |
| 7,008,380 B1 | 3/2006 | Rees et al. |
| 7,045,279 B1 | 5/2006 | Laske et al. |
| 7,122,371 B1 | 10/2006 | Ma |
| 7,238,165 B2 | 7/2007 | Vincent et al. |
| 7,316,666 B1 | 1/2008 | Entenman et al. |
| 7,410,474 B1 | 8/2008 | Friend et al. |
| 7,431,727 B2 | 10/2008 | Cole et al. |
| 7,452,711 B2 | 11/2008 | Daykin |
| 7,572,622 B2 | 8/2009 | Hassanein et al. |
| 7,651,835 B2 | 1/2010 | Hassanein et al. |
| 7,811,808 B2 | 10/2010 | Van Der Plaats et al. |
| 8,167,869 B2 | 5/2012 | Wudyka |
| 8,304,181 B2 | 11/2012 | Hassanein et al. |
| 8,323,954 B2 | 12/2012 | Kravitz et al. |

(56) References Cited

U.S. PATENT DOCUMENTS

| | | |
|---|---|---|
| 8,409,846 B2 | 4/2013 | Hassanein et al. |
| 8,420,380 B2 | 4/2013 | Fishman et al. |
| 8,465,970 B2 | 6/2013 | Hassanein et al. |
| 8,535,934 B2 | 9/2013 | Hassanein et al. |
| 8,585,380 B2 | 11/2013 | Hassanein et al. |
| 8,715,305 B2 | 5/2014 | Pate et al. |
| 8,822,203 B2 | 9/2014 | Hassanein et al. |
| 9,055,740 B2 | 6/2015 | Hassanein et al. |
| 9,215,867 B2 | 12/2015 | Hassanein et al. |
| 9,457,179 B2 | 10/2016 | Hassanein et al. |
| 9,462,802 B2 | 10/2016 | Fishman et al. |
| 9,706,768 B2 | 7/2017 | Freed et al. |
| 9,894,894 B2 | 2/2018 | Hassanein et al. |
| 10,076,112 B2 | 9/2018 | Hassanein et al. |
| 10,124,093 B1 | 11/2018 | Francis et al. |
| 10,321,676 B2 | 6/2019 | Hassanein et al. |
| 10,327,441 B2 | 6/2019 | Freed et al. |
| 10,362,780 B2 | 7/2019 | Kay et al. |
| 10,433,539 B2 | 10/2019 | White et al. |
| 10,736,314 B2 | 8/2020 | Hassanian et al. |
| 10,750,738 B2 | 8/2020 | Hassanian et al. |
| 11,122,795 B2 | 9/2021 | Hassanian et al. |
| 11,154,050 B2 | 10/2021 | Hassanein et al. |
| 11,191,263 B2 | 12/2021 | Hassanein et al. |
| 11,570,985 B2 | 2/2023 | Hassanein et al. |
| 11,723,357 B2 | 8/2023 | Hassanein et al. |
| 11,785,939 B2 | 10/2023 | Freed |
| 2001/0003652 A1 | 6/2001 | Freeman |
| 2001/0018569 A1 | 8/2001 | Erbel et al. |
| 2001/0025191 A1 | 9/2001 | Montgomery |
| 2002/0012988 A1 | 1/2002 | Brasile |
| 2002/0102720 A1 | 8/2002 | Steen |
| 2002/0132220 A1 | 9/2002 | Berens et al. |
| 2002/0151950 A1 | 10/2002 | Okuzumi |
| 2002/0164795 A1 | 11/2002 | Gen |
| 2002/0177117 A1 | 11/2002 | Wolf |
| 2002/0187132 A1 | 12/2002 | Mcgregor et al. |
| 2002/0198504 A1 | 12/2002 | Risk et al. |
| 2003/0040665 A1 | 2/2003 | Khuri et al. |
| 2003/0050689 A1 | 3/2003 | Matson |
| 2003/0053998 A1 | 3/2003 | Daemen et al. |
| 2003/0073227 A1 | 4/2003 | Hull et al. |
| 2003/0073912 A1 | 4/2003 | Melvin et al. |
| 2003/0074760 A1 | 4/2003 | Keller |
| 2003/0086830 A1 | 5/2003 | Haywood et al. |
| 2003/0111604 A1 | 6/2003 | Quek |
| 2003/0124503 A1 | 7/2003 | Olivencia-Yurvati et al. |
| 2003/0135152 A1 | 7/2003 | Kollar et al. |
| 2003/0147466 A1 | 8/2003 | Liang |
| 2003/0168064 A1 | 9/2003 | Daly et al. |
| 2004/0015042 A1 | 1/2004 | Vincent et al. |
| 2004/0017658 A1 | 1/2004 | Lo et al. |
| 2004/0018966 A1 | 1/2004 | Segall et al. |
| 2004/0029096 A1 | 2/2004 | Steen |
| 2004/0038192 A1 | 2/2004 | Brasile |
| 2004/0058432 A1 | 3/2004 | Owen et al. |
| 2004/0082057 A1 | 4/2004 | Alford et al. |
| 2004/0086578 A1 | 5/2004 | Segall et al. |
| 2004/0102415 A1 | 5/2004 | Thatte et al. |
| 2004/0102678 A1 | 5/2004 | Haindl |
| 2004/0106958 A1 | 6/2004 | Mathis et al. |
| 2004/0110800 A1 | 6/2004 | Bril et al. |
| 2004/0115689 A1 | 6/2004 | Augello et al. |
| 2004/0138542 A1 | 7/2004 | Khuri et al. |
| 2004/0168341 A1 | 9/2004 | Petersen et al. |
| 2004/0170950 A1 | 9/2004 | Prien |
| 2004/0171138 A1 | 9/2004 | Hassanein et al. |
| 2004/0193096 A1 | 9/2004 | Cooper |
| 2004/0202993 A1 | 10/2004 | Poo et al. |
| 2004/0221719 A1 | 11/2004 | Wright et al. |
| 2004/0224298 A1 | 11/2004 | Brassil et al. |
| 2004/0235142 A1 | 11/2004 | Schein et al. |
| 2004/0236170 A1 | 11/2004 | Kim |
| 2004/0248281 A1 | 12/2004 | Wright et al. |
| 2004/0258745 A1 | 12/2004 | Kai et al. |
| 2005/0010118 A1 | 1/2005 | Toyoda et al. |
| 2005/0019917 A1 | 1/2005 | Toledo-Pereyra et al. |
| 2005/0027237 A1 | 2/2005 | Weiner |
| 2005/0037330 A1 | 2/2005 | Fischer et al. |
| 2005/0063860 A1 | 3/2005 | Carpenter et al. |
| 2005/0085762 A1 | 4/2005 | Vijay et al. |
| 2005/0142532 A1 | 6/2005 | Poo et al. |
| 2005/0147958 A1 | 7/2005 | Hassanein et al. |
| 2005/0153271 A1 | 7/2005 | Wenrich |
| 2005/0170019 A1 | 8/2005 | Roth |
| 2005/0182349 A1 | 8/2005 | Linde et al. |
| 2005/0187469 A1 | 8/2005 | Phillips |
| 2005/0202394 A1 | 9/2005 | Dobson |
| 2005/0253390 A1 | 11/2005 | Blazek |
| 2005/0255442 A1 | 11/2005 | Brassil et al. |
| 2006/0034941 A1 | 2/2006 | Dobson |
| 2006/0039870 A1 | 2/2006 | Turner |
| 2006/0074470 A1 | 4/2006 | Bartels et al. |
| 2006/0121438 A1 | 6/2006 | Toledo-Pereyra et al. |
| 2006/0124130 A1 | 6/2006 | Bonassa |
| 2006/0134073 A1 | 6/2006 | Naka et al. |
| 2006/0148062 A1 | 7/2006 | Hassanein et al. |
| 2006/0154357 A1 | 7/2006 | Hassanein et al. |
| 2006/0154358 A1 | 7/2006 | Hassanein et al. |
| 2006/0154359 A1 | 7/2006 | Hassanein et al. |
| 2006/0160204 A1 | 7/2006 | Hassanein et al. |
| 2006/0166360 A1 | 7/2006 | Berthiaume et al. |
| 2006/0182722 A1 | 8/2006 | Hering et al. |
| 2006/0292544 A1 | 12/2006 | Hassanein et al. |
| 2007/0009881 A1 | 1/2007 | Arzt et al. |
| 2007/0098694 A1* | 5/2007 | Khuri .................. A01N 1/0226 435/1.1 |
| 2007/0135752 A1 | 6/2007 | Domash et al. |
| 2007/0135760 A1 | 6/2007 | Williams |
| 2007/0196461 A1 | 8/2007 | Weers |
| 2007/0275364 A1 | 11/2007 | Hassanein et al. |
| 2008/0009815 A1 | 1/2008 | Grabenkort et al. |
| 2008/0017191 A1 | 1/2008 | Davies et al. |
| 2008/0017194 A1 | 1/2008 | Hassanein et al. |
| 2008/0057488 A1 | 3/2008 | Steen |
| 2008/0234768 A1 | 9/2008 | Hassanein et al. |
| 2008/0286746 A1 | 11/2008 | Poo et al. |
| 2008/0295839 A1 | 12/2008 | Habashi |
| 2009/0142830 A1 | 6/2009 | Yamashiro et al. |
| 2009/0143417 A1 | 6/2009 | Smith et al. |
| 2009/0182302 A1 | 7/2009 | Garabet |
| 2009/0191614 A1 | 7/2009 | Miyahara |
| 2009/0197240 A1 | 8/2009 | Fishman et al. |
| 2009/0197241 A1 | 8/2009 | Fishman et al. |
| 2009/0197292 A1 | 8/2009 | Fishman et al. |
| 2009/0197324 A1 | 8/2009 | Fishman et al. |
| 2009/0197325 A1 | 8/2009 | Fishman et al. |
| 2009/0215022 A1 | 8/2009 | Page et al. |
| 2009/0312724 A1 | 12/2009 | Pipkin et al. |
| 2010/0028850 A1 | 2/2010 | Brassil |
| 2010/0056966 A1 | 3/2010 | Toth |
| 2010/0092939 A1 | 4/2010 | Belous et al. |
| 2010/0119554 A1 | 5/2010 | Dobson |
| 2010/0204663 A1 | 8/2010 | Wudyka |
| 2010/0322826 A1 | 12/2010 | Locascio et al. |
| 2010/0322862 A1 | 12/2010 | Ruoslahti et al. |
| 2011/0002926 A1 | 1/2011 | Matthews et al. |
| 2011/0076666 A1 | 3/2011 | Brassil |
| 2011/0129810 A1 | 6/2011 | Owen et al. |
| 2011/0136096 A1 | 6/2011 | Hassanein et al. |
| 2011/0177487 A1 | 7/2011 | Simsir et al. |
| 2011/0190572 A1 | 8/2011 | Brophy et al. |
| 2011/0212431 A1 | 9/2011 | Bunegin et al. |
| 2011/0294108 A1 | 12/2011 | Argoudelis et al. |
| 2012/0064050 A1 | 3/2012 | Calle et al. |
| 2012/0077771 A1 | 3/2012 | Fallouh et al. |
| 2012/0183945 A1 | 7/2012 | Steen |
| 2012/0277681 A1 | 11/2012 | Kravitz et al. |
| 2012/0282591 A1 | 11/2012 | Thatte et al. |
| 2012/0330438 A1 | 12/2012 | Keshavjee et al. |
| 2013/0011823 A1 | 1/2013 | Hassanein et al. |
| 2013/0078710 A1 | 3/2013 | Hassanein et al. |
| 2013/0102917 A1 | 4/2013 | Colbaugh et al. |
| 2013/0144227 A1 | 6/2013 | Locke et al. |

(56) References Cited

U.S. PATENT DOCUMENTS

| | | |
|---|---|---|
| 2013/0157248 A1 | 6/2013 | Fishman et al. |
| 2013/0220325 A1 | 8/2013 | Davis et al. |
| 2013/0295552 A1 | 11/2013 | Hassanein et al. |
| 2014/0001745 A1 | 1/2014 | Lehmann et al. |
| 2014/0007961 A1 | 1/2014 | Steen et al. |
| 2014/0017658 A1 | 1/2014 | Steinman et al. |
| 2014/0017660 A1 | 1/2014 | Steinman et al. |
| 2014/0135738 A1 | 5/2014 | Panian |
| 2014/0220550 A1 | 8/2014 | Van Der Plaats et al. |
| 2014/0283828 A1 | 9/2014 | Acker et al. |
| 2014/0308654 A1 | 10/2014 | Kay et al. |
| 2014/0315175 A1 | 10/2014 | Nguyen et al. |
| 2014/0377849 A1 | 12/2014 | Kay et al. |
| 2015/0017710 A1 | 1/2015 | Freed et al. |
| 2015/0079580 A1 | 3/2015 | Hassanein et al. |
| 2015/0093738 A1 | 4/2015 | Potenziano et al. |
| 2015/0230453 A1 | 8/2015 | Fontes et al. |
| 2015/0246164 A1 | 9/2015 | Heaton et al. |
| 2015/0275176 A1 | 10/2015 | Kobayashi et al. |
| 2015/0342177 A1 | 12/2015 | Hassanein et al. |
| 2016/0113269 A1 | 4/2016 | Woodard et al. |
| 2016/0262634 A1 | 9/2016 | Steen et al. |
| 2016/0361476 A1 | 12/2016 | Huang |
| 2017/0000110 A1 | 1/2017 | Korkut et al. |
| 2017/0015963 A1 | 1/2017 | Ott |
| 2017/0042141 A1 | 2/2017 | Kay et al. |
| 2017/0049096 A1 | 2/2017 | Kay et al. |
| 2019/0021308 A1 | 1/2019 | Hassanein et al. |
| 2020/0128813 A1 | 4/2020 | Kay et al. |
| 2020/0337298 A1 | 10/2020 | Hassanein et al. |
| 2020/0352155 A1 | 11/2020 | Fishman et al. |
| 2021/0244017 A1 | 8/2021 | Ritchie et al. |
| 2022/0039373 A1 | 2/2022 | Hassanein et al. |
| 2022/0071197 A1 | 3/2022 | Hassanein et al. |
| 2022/0232823 A1 | 7/2022 | Hassanein et al. |
| 2022/0361482 A1 | 11/2022 | Hassanein |
| 2023/0210104 A1 | 7/2023 | Hassanein |
| 2023/0263156 A1 | 8/2023 | Hassanein |

FOREIGN PATENT DOCUMENTS

| | | |
|---|---|---|
| CA | 2861545 A1 | 8/2013 |
| CN | 1232723 A | 10/1999 |
| CN | 1269471 A | 10/2000 |
| CN | 2418882 Y | 2/2001 |
| CN | 1452863 A | 11/2003 |
| CN | 2616058 Y | 5/2004 |
| CN | 1849102 A | 10/2006 |
| CN | 101677526 A | 3/2010 |
| CN | 103596426 A | 2/2014 |
| CN | 103893205 A | 7/2014 |
| CN | 203724222 U | 7/2014 |
| CN | 104039135 A | 9/2014 |
| CN | 104770361 A | 7/2015 |
| CN | 109310077 A | 2/2019 |
| DE | 4201259 A1 | 7/1993 |
| DE | 10121159 A1 | 11/2002 |
| DE | 102005048625 A1 | 4/2007 |
| EP | 0347923 | 12/1989 |
| EP | 0376763 | 7/1990 |
| EP | 1062870 B1 | 1/2003 |
| EP | 1488743 A2 | 12/2004 |
| EP | 1017271 B1 | 1/2006 |
| EP | 2809153 | 12/2014 |
| EP | 3229588 | 10/2017 |
| EP | 3347084 | 11/2020 |
| EP | 4032401 A1 | 7/2022 |
| FR | 2830183 A1 | 4/2003 |
| JP | S57-010695 U1 | 1/1982 |
| JP | 63270601 | 11/1988 |
| JP | H02-282301 A | 11/1990 |
| JP | 02-306901 A | 12/1990 |
| JP | H03-74302 A | 3/1991 |
| JP | 04-099701 A | 3/1992 |
| JP | H04-128201 A | 4/1992 |
| JP | 06-056601 | 3/1994 |
| JP | 06-305901 | 11/1994 |
| JP | H07-196401 A | 8/1995 |
| JP | H08-89518 A | 4/1996 |
| JP | 2002-119586 A | 4/2002 |
| JP | 2003-206201 A | 7/2003 |
| JP | 2004513889 A | 5/2004 |
| JP | 2004525290 A | 8/2004 |
| JP | 2008-515914 A | 5/2008 |
| JP | 2010-525076 A | 7/2010 |
| JP | 6625384 B2 | 12/2019 |
| JP | 6756775 B2 | 9/2020 |
| WO | WO-8805261 A1 | 7/1988 |
| WO | WO-9502326 A1 | 1/1995 |
| WO | WO-95/03680 A1 | 2/1995 |
| WO | WO-9531897 A1 | 11/1995 |
| WO | WO-9618293 A1 | 6/1996 |
| WO | WO-9629865 A1 | 10/1996 |
| WO | WO-9722244 A1 | 6/1997 |
| WO | WO-9746091 A1 | 12/1997 |
| WO | WO-9915011 A1 | 4/1999 |
| WO | WO-00/18226 A2 | 4/2000 |
| WO | WO-0022927 A1 | 4/2000 |
| WO | WO-200027189 A1 | 5/2000 |
| WO | WO-00/35340 A1 | 6/2000 |
| WO | WO-0060936 A1 | 10/2000 |
| WO | WO-200101774 A1 | 1/2001 |
| WO | WO-0226034 A2 | 4/2002 |
| WO | WO-02/35929 A1 | 5/2002 |
| WO | WO-02089571 A1 | 11/2002 |
| WO | WO-2003026419 A1 | 4/2003 |
| WO | WO-2004017838 | 3/2004 |
| WO | WO-2004026031 A2 | 4/2004 |
| WO | WO-2006042138 A2 | 4/2006 |
| WO | WO-2006060309 | 6/2006 |
| WO | WO-2006076590 A2 | 7/2006 |
| WO | WO-2006124820 A2 | 11/2006 |
| WO | WO-2007079185 A2 | 7/2007 |
| WO | WO-2007124044 A2 | 11/2007 |
| WO | WO-2008106724 A1 | 9/2008 |
| WO | WO-2008108996 A1 | 9/2008 |
| WO | WO-08150587 A2 | 12/2008 |
| WO | WO-2009/099939 A2 | 8/2009 |
| WO | WO-2011002926 A2 | 1/2011 |
| WO | WO-2011072012 A2 | 6/2011 |
| WO | WO-2012142487 A1 | 10/2012 |
| WO | WO-2012148685 | 11/2012 |
| WO | WO-2013068751 | 5/2013 |
| WO | WO-2013068752 A2 | 5/2013 |
| WO | WO-2013068753 | 5/2013 |
| WO | 2013106908 A1 | 7/2013 |
| WO | WO-2014011547 A2 | 1/2014 |
| WO | WO-2014059316 A1 | 4/2014 |
| WO | WO-2014194349 A1 | 12/2014 |
| WO | WO-2015126853 A1 | 8/2015 |
| WO | 2015143552 A1 | 10/2015 |
| WO | WO-2015154170 A1 | 10/2015 |
| WO | WO-2015154193 A1 | 10/2015 |
| WO | WO-2015187737 | 12/2015 |
| WO | WO-2016090498 A1 | 6/2016 |
| WO | WO-2017044465 | 3/2017 |
| WO | WO-2017205967 A1 | 12/2017 |

OTHER PUBLICATIONS

Written Opinion dated Mar. 15, 2016 in PCT/CA2015/051316.
International Search Report dated Mar. 16, 2016 in PCT/CA2015/051316.
International Preliminary Report on Patentability (IPRP) dated Apr. 10, 2017 in PCT/CA2015/051316.
International Preliminary Report on Patentability dated Sep. 27, 2016 in PCT/CA2015/050201.
Office Action dated Apr. 4, 2016 in related Canadian Patent Application No. 2,861,545.
Supplementary European Search Report dated Jan. 25, 2016 in EP Patent Application No. 13738530.
International Preliminary Report on Patentability dated Apr. 23, 2014 in PCT/CA2013/000031.

(56) References Cited

OTHER PUBLICATIONS

International Search Report dated Jun. 8, 2015 in PCT/CA2015/050201.
De Hart, et al., "An ex vivo platform to simulate cardiac physiology: a new dimension for therapy development and assessment", The International Journal of Artificial Organs, Jun. 2011, pp. 495-505, vol. 34, No. 6.
Tipton, et al., "The use of Langendorff preparation to study the bradycardia of training", Medicine and Science in Sports, vol. 9, No. 4, pp. 220-230 (1977).
International Search Report received in PCT Application No. PCT/CA2013/000031 dated Apr. 15, 2013.
Written Opinion received in PCT Application No. PCT/CA2013/000031 dated Apr. 15, 2013.
Written Opinion received in PCT/CA2015/050201 dated Jun. 8, 2015.
Non-final Office Action dated Jan. 8, 2016 in related U.S. Appl. No. 14/372,909.
Final Office Action dated Jul. 12, 2016 in related U.S. Appl. No. 14/372,909.
Non-final Office Action dated Jan. 20, 2017 in related U.S. Appl. No. 14/372,909.
Notice of Allowance dated Apr. 11, 2017 in related U.S. Appl. No. 14/372,909.
Communication from European Patent Office in related EP Patent Application No. 13738530.8 dated Nov. 21, 2017.
Extended European Search Report dated Nov. 30, 2017 in EP Patent Application No. 15767752.7.
Non-final Office Action dated May 31, 2018 in U.S. Appl. No. 15/128,634.
Examination Report No. 1 dated Apr. 27, 2018 in Australian Patent Application No. 2015234580.
Search Report dated Sep. 3, 2018 in related EP Patent Application No. 15867786.4.
Final Office Action dated Oct. 11, 2018 in related U.S. Appl. No. 15/128,634.
Search Report dated Feb. 8, 2019 in related EP Patent Application No. 15867786.4.
Notice of Allowance dated Feb. 8, 2019 in related U.S. Appl. No. 15/128,634.
Examination Report No. 1 dated Mar. 19, 2019 in related Australian Patent Application No. 2015361996.
Notice of Allowance dated May 15, 2019 in related U.S. Appl. No. 15/622,237.
First Office Action and Search Report dated Apr. 27, 2020 in related Chinese Patent Application No. 201580067259.0.
Non-Final Office Action dated Jul. 20, 2021 in related U.S. Appl. No. 16/423,867.
Office Action dated Mar. 11, 2021 issued in Chinese patent application No. 201580067259.0 (37 pages).
Notice of Granting Patent Right for Invention and accompanying Search Report dated Aug. 25, 2021 issued in Chinese patent application No. 201580067259.0 (8 pages).
Ki Moo Lim et al., "Computational analysis of the effect of the type of LVAD flow on coronary perfusion and ventricular afterload", The Journal of Physiological Science, Dec. 31, 2009, pp. 307-316, (2009) vol. 59.
Wang et al., "The management experience of long duration roller pump ventricular assist device," Chinese Journal of Extracorporeal Circulation, Sep. 15, 2011, vol. 9, No. 3, pp. 134-137.
Final Office Action dated Oct. 29, 2021 in U.S. Appl. No. 16/423,867 (19 pages).
"2002 Design & Engineering Awards, Portable Organ Preservation System", Science (2002) (1 page).
"Celsior™ Cold Storage Solution", Sangstat Medical Corporation (internet reference) (Aug. 1999) (5 pages).
"History of Transplantation and Organ Preservation," Barr Laboratories, Inc. (2004) (4 pages).
"Human heart beats on its own outside body", USA Today (2001) (1 page).
"Human Heart Kept Alive Outside Body for First Time in Study of Portable Organ Preservation System™ at University of Pittsburgh Medical Center", UPMC, McGowan Institute for Regenerative Medicine (2001) (2 pages).
"Machine Keeps Human Kidney Alive for 24-Hours", American Academy of Anti-Aging Medicine, 222.worldhealth.net, Aug. 25, 2001, (<http://wwwworldhealth.net/p/393, 1313.htm>) by Ronald Klatz , Accessed Jul. 5, 2006 (1 page).
"Machine may be organ transplant breakthrough", USA Today, by Stephen J. Carrera (<http://www.usatoday.com/news/health/2001-08-25-organ.htm>) (Aug. 25, 2001) (1 page).
"New discovery in organ transplantation", MSNBC Chicago, IL, No. Author Listed (2001) (www.nbc5/com <http://www.nbc5/com>) (1 page).
"The Nation: Warm-Storage Device May Aid Organ Transplants", Dow Jones Publications Library (2001) (1 page).
"The secret of the turtle", <https://mag.ebmpapst.com/en/industries/medical/the-secret--of-the-turtle_2433/>, mag:The Magazine of ebmpapst, Sep. 2009 (5 pages).
"ViaSpan (Belzer UW) Cold Storage Solution", Barr Laboratories, Inc. (2002), 2 pages.
"Warm storage for donor organs", University of Chicago Magazine (2001) (1 page).
Ahmad, N. et al., "A pathophysiologic study of the kidney tubule to optimize organ preservation solutions", Kidney International 66(1):77-90 (2004), 14 pages.
Aitchison, J.D. et al., "Functional assessment of non-heart-beating donor lungs: prediction of post-transplant function", European Journal of Cardio-thoracic Surgery, 20:187-194 (2001) (8 pages).
Aitchison, J.D. et al., "Nitric Oxide During Perfusion Improves Posttransplantation Function of Non-Heart-Beating Donor Lungs", Transplantation, 75(12):1960-1964, Jun. 27, 2003, 5 pages.
Albes, et al., "Influence of the Perfusate Temperature on Lung Preservation: Is There an Optimum?", European Surgical Research, 29:5-11, 1997 (7 pages).
Anathaswamy, A., "Machine keeps organs alive for longer", NewScientist.com, Aug. 16, 2001, (<http://www.newscientist.com/article.ns?id=dn1168&print=true> (1 page).
Andreasson, et al., "Ex vivo lung perfusion in clinical lung transplantation—State of the art", European Journal of Cardio-Thoracic Surgery, 46:779-788, 2014 (10 pages).
Aoki, M. et al., Anti-CD18 Attenuates Deleterious Effects of Cardiopulmonary Bypass and Hypothermic Circulatory Arrest in Piglets, J. Card. Surg. 10(Suppl):407-417 (1995) (11 pages).
Asparagine, Encyclopedia.com, https://www.encyclopedia.com/science-and-technology/biochemistry/biochemistry/asparagine, accessed May 7, 2022 (3 pages).
Baker, et al., "Calcium Content of St. Thomas' II Cardioplegic Solution Damages Ischemic Immature Myocardium", Annals of Thoracic Surgery, 52(4):993-999, Oct. 1991 (7 pages).
Baker, L.E. et al., "Artificial Maintenance Media for Cell and Organ Cultivation", Journal of Experimental Medicine, 70:29-38, Jul. 1, 1939 (15 pages).
Bando, K. et al., "Oxygenated perfluorocarbon, recombinant human superoxide dismutase, and catalase ameliorate free radical induced myocardial injury during heart preservation and transplantation", J. Thorac Cardiovasc Surg., 96:930-938, Dec. 1988 (9 pages).
Barinov, E.F., "Hormonal-metabolic disturbances during biological preservation of the heart", Fiziologicheskii Zhurnal (Kiev), 29(3):293-299, 1983 (8 pages)—Russian Language with English Abstract.
Becker, et al., "Evaluating acellular versus cellular perfusate composition during prolonged ex vivo lung perfusion after initial cold ischaemia for 24 hours", Transplant International, 29:88-97, 2016, published online Aug. 27, 2015 (10 pages).
Belzer, F.O., "Formula for Belzer MPS Solution", University of Wisconsin-Madison Organ Preservation, (<http://www.surgery.wisc.edu/transplat/research/southard/BelzerMPS.shtml>), Oct. 3, 2003 (2 pages).
Benichou, J. et al., "Canine and Human Liver Preservation for 6 to 18 HR by Cold Infusion", Transplantation, 24(6):407-411, Dec. 1977 (5 pages).

(56) References Cited

OTHER PUBLICATIONS

Besterman, et al., "Regulation of protein synthesis in lung by amino acids and insulin", American Journal of Physiology: Endocrinology and Metabolism, 245(8):E508-E514, Nov. 1, 1983 (7 pages).
Birkett, D. et al., "The Fatty Acid Content and Drug Binding Characteristics of Commercial Albumin Preparations", Clinica Chimica Acta 85:253-258, 1978 (6 pages).
Blanchard, J.M. et al., "Techniques for Perfusion and Storage of Heterotopic Heart Transplants in Mice", Microsurgery, 6:169-174, 1985 (6 pages).
Boggi, U. et al., "Pancreas Preservation with University of Wisconsin and Celsior Solutions", Transplantation Proceedings 36(3):563-565, 2004 (3 pages).
Boggi, U. et al., "Pancreas Preservation With University of Wisconsin and Celsior Solutions: A Single-Center, Prospective, Randomized Pilot Study", Transplantation, 27:77(8):1186-1190, Apr. 27, 2004 (5 pages).
Botha, P., "Extended Donor Criteria in Lung Transplantation", Current Opinion in Organ Transplantation, 14:206-210, 2009 (5 pages).
Boyle, E.M. Jr. et al., "Ischemia-Reperfusion Injury", Ann. Thorac. Surg., 64:S24-S30, 1997 (7 pages).
Brandes, H. et al. "Influence of High Molecular Dextrans on Lung Function in an ex Vivo Porcine Lung Model," Journal of Surgical Research, 101(12): 225-231, Dec. 2001 (7 pages).
Brasile, L. et al., "Organ Preservation Without Extreme Hypothermia Using an Oxygent™ Supplemented Perfusate", Art, Cells, Blood Subs., and Immob. Biotech., 22(4):1463-1468, 1994 (6 pages).
Burt, J.M. et al, "Myocardial function after preservation for 24 hours", J. Thorac. Cardiovasc Surg., 92(2):238-246, Aug. 1986 (9 pages).
Calhoon, J.H. et al., "Twelve-Hour Canine Heart Preservation With a Simple, Portable Hypothermic Organ Perfusion Device", Ann. Thorac. Surg., 62:91-93, 1996 (3 pages).
Canelo R. et al., "Experience with Hystidine Tryptophan Ketoglutarate Versus University Wisconsin Preservation Solutions in Transplantation", Int. Surg. 88(3):145-151, Jul.-Sep. 2003 (8 pages).
Carrier, B., "Chapter 4: Hypoxia and Oxygenation", Alaska Air Medical Escort Training Manual, Fourth Edition, pp. 71-82, 2006 (12 pages).
Chambers, D.J. et al., "Long-Term Preservation of the Heart: The Effect of Infusion Pressure During Continuous Hypothermic Cardioplegia", The Journal of Heart and Lung Transplantation, 11(4, Pt. 1):665-675, Jul./Aug. 1992 (11 pages).
Charest, et al., "Design and validation of a clinical-scale bioreactor for long-term isolated lung culture", Author Manuscript published in Final Edited form as Biomaterials, 52:79-87, Jun. 2015 (22 pages).
Chen, E. P. et al., "Milrinone Improves Pulmonary Hemodynamics and Right Ventricular Function in Chronic Pulmonary Hypertension", Ann Thorac Surg, 63:814-821, 1997 (8 pages).
Chen, F. et al., "Development of New Organ Preservation Solutions in Kyoto University", Yonsei Medical Journal, 45(5):1107-1114, 2004 (8 pages).
Chien, S. et al., "A simple technique for multiorgan preservation", The Journal of Thoracic and Cardiovascular Surgery, 95(1):55-61, Jan. 1988 (7 pages).
Chien, S. et al., "Canine Lung Transplantation After More than Twenty-four Hours of Normothermic Preservation", The Journal of Heart and Lung Transplantation, 16(3):340-351, Mar. 1997 (12 pages).
Chien, S. et al., "Functional Studies of the Heart During a 24-Hour Preservation Using a New Autoperfusion Preparation", The Journal of Heart and Lung Transplantation, 10(3):401-408, May/Jun. 1991 (8 pages).
Chinchoy, Edward Cheng-wey; "The Development, Refinement, and Uses of a Physiologically Working Isolated Ex Vivo Swine Heart Model", A thesis submitted to the Faculty of the Graduate School of the University of Minnesota, Dec. 1999 (136 pages).

Christophi, C. et al., "A Comparison of Standard and Rapid Infusion Methods of Liver Preservation During Multi-Organ Procurement", Aust. N.Z. J. Surg., 61(9):692-694, 1991 (3 pages).
Cimino, Adria, "Doctor develops device to preserve donated organs", Mass High Tech (2001), 2 pages.
CNN.com, "Heart kept beating outside body", Associated Press CNN News Health Section (Oct. 7, 2001, 02:59) (CNN.com/Health with WebMD.com), 2 pages.
Collins, B.H., "Organ Transplantation: What Is the State of the Art?", Annals of Surgery, 238(65 Suppl):S72-S89, Dec. 2003 (18 pages).
Cronin, D.C. et al., "Chapter 21: Liver Transplantation at the University of Chicago", Clinical Transplants, pp. 231-238, 1999 (9 pages).
Cysteine, Encyclopedia.com, https://www.encyclopedia.com/science-and-technology/biochemistry/biochemistry/cysteine, accessed May 7, 2022 (4 pages).
Daemen, J.H.C. et al., "Short-term outcome of kidney transplants from non-heart-beating donors after preservation by machine perfusion", Transpl. Int. 9(Supp 1):S76-S80, 1996 (5 pages).
Definition of Aqueous, Cambridge Dictionary, https://dictionary.cambridge.org/us/dictionary/english/aqueous, accessed Sep. 14, 2023 (2 pages).
Definition of Examine, Merriam-Webster Dictionary on-line. www.merriam-webster.com/dictionary/examine, Printed Feb. 9, 2011, (1 page).
Definition of Medium, Collins English Dictionary, https://www.collinsdictionary.com/us/dictionary/english/medium#:~:text=You%20use%20medium%20to%20describe,middling%20More%20Synonyms%20of%20medium, accessed Sep. 14, 2023 (2 pages).
Demertzis, S. et al., "University of Wisconsin Versus St. Thomas' Hospital Solution for Human Donor Heart Preservation", Ann Thorac Surg 55:1131-1137, 1993 (7 pages).
Den Butter, G. et al., "Comparison of solutions for preservation of the rabbit liver as tested by isolated perfusion", Transpl. Int., 8(6):466-471, 1995 (6 pages).
Denham, B.S. et al., "Twenty-Four Hour Canine Renal Preservation by Pulsatile Perfusion, Hypothermic Storage, and Combinations of the Two Methods", Transplantation Proceedings, 9(3):1553-1556 (1977), 4 pages.
Dobrian, A. et al., "In vitro formation of oxidatively-modified and reassembled human low-density lipoproteins: antioxidant effect of albumin", Biochimica et Biophysica Acta (BBA) 1169:12-24 (1993), 13 pages.
Dobson, et al., "Adenosine and lidocaine: A new concept in nondepolarizing surgical myocardial arrest, protection, and preservation", Journal of Thoracic and Cardiovascular Surgery, 127(3):794-805, Mar. 2004 (12 pages).
Drexler, H. et al., "Effect of L-arginine on coronary endothelial function in cardiac transplant recipients. Relation to vessel wall morphology," Circulation 89(4):1615-1623 (1994) (10 pages).
Duarte, J.D. et al., "Pharmacologic treatments for pulmonary hypertension; exploring pharmacogenomics", Future Cardiol., 9(3):335-349, 2013 (15 pages).
Ebel, et al., "Lidocaine reduces ischaemic but not reperfusion injury in isolated rat heart", British Journal Anaesthesia, 86(6):846-852, 2001 (7 pages).
Egan, T. M. et al., "Ex Vivo Evaluation of Human Lungs for Transplant Suitability", Ann Thorac Surg, vol. 81, No. 4, pp. 1205-1213 (Apr. 2006) (9 pages).
Eiseman, B. et al., "A disposable liver perfusion chamber", Surgery 60(6):1183-1186 (1966), 4 pages.
Ely, et al., "Protective Effects of Adenosine in Myocardial Ischemia", Circulation, 85(3):893-904, Mar. 1992 (12 pages).
Engelman, R.M. et al., "Influence of Steroids on Complement and Cytokine Generation After Cardiopulmonary Bypass", Ann Thorac Surg 60(3):801-04 (1995) (4 pages).
Erasmus, et al., "Normothermic ex vivo lung perfusion of non-heart-beating donor lungs in pigs: from pretransplant function analysis towards a 6-h machine preservation", Transplant International, 19(7):589-593, Jul. 1, 2006 (5 pages).
European Commission, Scientific Committee on Food, "Opinion on Substances for Nutritional Purposes Which Have Been Proposed for

(56) References Cited

OTHER PUBLICATIONS

Use in the Manufacture of Foods for Particular Nutritional Purposes ('Parnuts')", SCF/CS/ADD/NUT/20/Final, http://www.europa.eu.int/comm/dg24/health/sc/scf/index_en.html, Dec. 5, 1999 (19 pages).
European Extended Search Report issued in European Patent Application No. 17805438.3, dated Jan. 28, 2020 (14 pages).
European Extended Search Report issued in European Patent Application No. 15853016.2, dated Mar. 9, 2018 (12 pages).
European Extended Search Report issued in European Patent Application No. 15775970.5, dated Oct. 24, 2017 (10 pages).
European Extended Search Report issued in European Patent Application No. 16844964.3, dated Apr. 26, 2019 (7 pages).
European Extended Search Report issued in European Patent Application No. 18879106.5, dated Dec. 17, 2020 (8 pages).
European Extended Search Report issued in European Patent Application No. 20206681.7, dated Apr. 26, 2021 (8 pages).
European Extended Search Report issued in European Patent Application No. 22158928.6. dated Jun. 29, 2022 (13 pages).
European Search Report for issued in European Patent Application No. 08795820.3 dated Apr. 17, 2014 (6 pages).
European Search Report issued in European Patent Application No. 09707471.0 dated May 27, 2014 (7 pages).
European Search Report issued in European Application No. EP19204566.4, dated May 25, 2020 (7 pages).
European Search Report issued in European Patent Application No. 12770852.7, dated Sep. 23, 2014, 8 pages.
Extended European Search Report issued in European Application No. 17172411.5, dated Nov. 8, 2017 (7 pages).
Extended European Search Report issued in European Patent Application No. 15803127.8, dated May 22, 2018 (14 pages).
Fabregas, Luis, "UPMC tests machine to aid heart transplants", Pittsburg Tribune-Review, (<http://www.pittsburghlive.com/x/pittsburghrib/print_19181.html>), Feb. 24, 2002 (2 pages).
Faggian, G. et al., "Donor Organ Preservation in High-Risk Cardiac Transplantation", Transplantation Proceedings 36:617-619, 004 (3 pages).
FDA Premarket Approval 510k (extracts), "Perfadex Solution for Lung Perfusion", dated Mar. 8, 2001 (61 pages).
FDA Premarket Approval 510k, "Perfadex with THAM", dated Oct. 9, 2008 (5 pages).
FDA Summary of Safety and Probable Benefit, "XVIVO Perfusion System (XPS) with STEEN Solution Perfusate", HUD Designation No. 08-0194, Notice of Approval dated Aug. 12, 2014 (52 pages).
Featherstone, R.L. et al. "Comparison of Phosphodiesterase Inhibitors of Differing Isoenzyme Selectivity Added to St. Thomas' Hospital Cardioplegic Solution Used for Hypothermic Preservation of Rat Lungs", Am J Respir Crit Care Med, Mar. 2000, 162(3):850-856 (7 pages).
Fehrenberg, C. et al., "Protective Effects of B2 Preservation Solution in Comparison to a Standard Solution (Histidine-Tryptophan-Ketoglutarate/Bretschneider) in a Model of Isolated Autologous Hemoperfused Porcine Kidney", Nephron Physiol., 96:p. 52-p. 58, 2004 (7 pages).
Ferrera, R. et al., "Comparison of Different Techniques of Hypothermic Pig Heart Preservation", Ann Thorac Surg., 57(5):1233-1239, 1994 (7 pages).
File History for U.S. Appl. No. 60/616,835, filed Oct. 7, 2004 (82 pages).
File History for U.S. Appl. No. 60/694,971, filed Jun. 28, 2005 (280 pages).
File History for U.S. Appl. No. 60/725,168, filed Oct. 6, 2005 (699 pages).
Finn, A. et al., "Effects of Inhibition of Complement Activation Using Recombinant Soluble Complement Receptor 1 on Neutrophil CD11B/CD18 and L-Selectin Expression and Release of Interleukin-8 and Elastase in Simulated Cardiopulmonary Bypass", J Thorac Cardiovasc Surg, 111(2):451-459, Feb. 1996 (9 pages).
Fisher, et al., "An observational study of Donor Ex Vivo Lung Perfusion in UK lung transplantation: Develop-UK", Health Technology Assessment, vol. 20, No. 85, Nov. 2016 (310 pages)—3 parts.
Fourcade, C. et al., "Nouvelle Méthode De Conservation Du Rein Avec Une Solution De Collins", <<A New Method of Kidney Preservation with Collins' Solution,>> Biomed. 21(7):308-311, 1974 (5 pages)—English Abstract.
Fraser, C.D. Jr. et al., "Evaluation of Current Organ Preservation Methods for Heart-Lung Transplantation", Transplantation Proceedings, 20(1, Suppl. 1):987-990, Feb. 1988 (4 pages).
Gao, et al., "Role of Troponin I Proteolysis in the Pathogenesis of Stunned Myocardium", Circulation Research, 80(3):393-399, Mar. 1, 1997 (17 pages).
Gever, J., "Technique to Repair Damaged Donor Lungs for Graft Passes Clinical Test", MedPage Today, https://www.medpagetoday.org/surgery/transplantation/12245, Accessed Jul. 11, 2020, dated Dec. 19, 2008 (4 pages).
Givertz, M.M. et al., "Effect of Bolus Milrinone on Hemodynamic Variables and Pulmonary Vascular Resistance in Patients With Severe Left Ventricular Dysfunction: A Rapid Test for Reversibility of Pulmonary Hypertension", JACC, 28(7):1775-1780, Dec. 1996 (6 pages).
Glucose, The Merck Index, Eleventh Edition, Entry 4353, pp. 699-700, 1989 (3 pages).
Glutamine, Encyclopedia.com, https://www.encyclopedia.com/science-and-technology/biochemistry/biochemistry/glutamine, accessed May 7, 2022 (7 pages).
Gohrbandt, B., et al., "Glycine intravenous donor preconditioning is superior to glycine supplementation to low-potassium dextran flush preservation and improves graft function in a large animal lung transplantation model after 24 hours of cold ischemia", The Journal of Thoracic and Cardiovascular Surgery, 131(3):724-729, Mar. 2006 (6 pages).
Grynberg, A. et al., "Fatty Acid Oxidation in the Heart", Journal of Cardiovascular Pharmacology, 28(Suppl. 1):S11-S17, 1996 (8 pages).
Guarrera, J.V. et al., "Pulsatile Machine Perfusion With Vasosol Solution Improves Early Graft Function After Cadaveric Renal Transplantation", Transplantation 77(8):1264-1268, Apr. 27, 2004 (5 pages).
Gundry, S.R. et al., "Successful Transplantation of Hearts Harvested 30 Minutes After Death From Exsanguination", Ann Thorac Surg 53(5):772-775 (1992), 4 pages.
Habazetti, H. et al., "Improvement in Functional Recovery of the Isolated Guinea Pig Heart After Hyperkalemic Reperfusion With Adenosine", J Thorac Cardiovasc Surg 111(1):74-84, Jan. 1996 (11 pages).
Hachida, M. et al., "Efficacy of myocardial preservation using HTK solution in continuous 120 min cross-clamping method-a comparative study with GIK method", Nippon Kyobu Geka Gakkai Zasshi. 41(9):1495-1501 (1993), 1 page—Abstract Only.
Hai, Human Body Atlas, First Edition, Liaoning Science and Technology Publishing House, p. 120, Oct. 31, 2011 (3 pages)—with English Translation.
Han, B. et al., "Study on the clinical efficacy of specific phosphodiesterase inhibitor in patients with pulmonary hypertension due to left heart disease", Experimental and Therapeutic Medicine, 16:1175-1186, 2018 (12 pages).
Hardesty, R.L. et al., "Original Communications: Autoperfusion of the heart and lungs for preservation during distant procurement", J Thorac Cardiovasc Surg, 93(1):11-18, Jan. 1987 (8 pages).
Hartman, J.C., "The Role of Bradykinin and Nitric Oxide in the Cardioprotective Action of ACE Inhibitors", Ann Thorac Surg 60:789-792, 1995 (4 pages).
Hassanein, W.H. et al., "Abstract 2080: A Novel Approach for 12 Hour Donor Heart Preservation", Presented at the 70th Scientific Sessions of the American Heart Association, published in Circulation, Supplement 1, 1997 (1 page).
Hassanein, W.H. et al., "Continuous Perfusion of Donor Hearts in the Beating State Extends Preservation Time and Improves Recovery of Function", Journal of Thoracic and Cardiovascular Surgery, 116(5):821-830, Nov. 1998 (10 pages).

(56) References Cited

OTHER PUBLICATIONS

Hearse, et al., "Protection of the myocardium during ischemic arrest", Journal of Thoracic Cardiovascular Surgery, 81(6):873-879, Jun. 1981 (7 pages).
Heil, J.E. et al., "A Controlled Comparison of Kidney Preservation by Two Methods: Machine Perfusion and Cold Storage", Transplantation Proceedings 19(1):2046, Feb. 1987 (1 page).
Hoeper, M.M. et al., "Intensive Care Unit Management of Patients with Severe Pulmonary Hypertension and Right Heart Failure", Am J Respir Crit Care Med, 184:1114-1124, 2011 (11 pages).
Howarth, F.C. et al., "Effects of extracellular magnesium and beta adrenergic stimulation on contractile force and magnesium mobilization in the isolated rat heart", Magnesium Research, 7(3/4):187-197, Dec. 1994 (13 pages).
Hui-Li, G. "The Management of Acute Pulmonary Arterial Hypertension", Cardiovascular Therapeutics, 29:153-175, 2011 (23 pages).
Hülsmann, W.C et al., "Loss of cardiac contractility and severe morphologic changes by acutely lowering the pH of the perfusion medium: protection by fatty acids", BBAGEN 20256, Biochimica et Biophysica Acta., 1033:214-218, 1990 (5 pages).
Ida, K. "Titanium for Medical and Dental Use", Japanese journal of medical electronics and biological engineering, 24(1):47-54, 1986 (12 pages)—with English Summary.
Imber, C. et al., "Advantages of Normothermic Perfusion Over Cold Storage in Liver Preservation", Transplantation, 73(5):701-709, Mar. 15, 2002 (9 pages).
Ingemansson, et al., "Importance of Calcium in Long-Term Preservation of the Vasculature", Ann Thorac Surg, 61:1158-1162, 1996 (5 pages).
International Preliminary Report on Patentability issued by Canadian Patent Office as International Searching Authority in International Application No. PCT/CA15/50297, dated Oct. 12, 2016 (6 pages).
International Preliminary Report on Patentability issued by Canadian Patent Office as International Searching Authority in International Application No. PCT/CA15/51084, dated Feb. 15, 2017 (3 pages).
International Search Report and Written Opinion issued by the U.S. Patent and Trademark Office as International Searching Authority in International Application No. PCT/US2012/033626 dated Sep. 20, 2012 (12 pages).
International Search Report and Written Opinion issued by Canadian Patent Office as International Searching Authority in International Application No. PCT/CA18/51474, dated Mar. 4, 2019 (6 pages).
International Search Report and Written Opinion issued by the Canadian Patent Office as International Searching Authority in International Application No. PCT/CA15/50297, dated Jul. 13, 2015 (8 pages).
International Search Report and Written Opinion issued by the Canadian Patent Office as International Searching Authority in International Application No. PCT/CA15/51084, dated Feb. 5, 2016 (8 pages).
International Search Report and Written Opinion issued by the U.S. Patent and Trademark Office as Searching Authority, in International Application No. PCT/US16/50512, dated Dec. 12, 2016 (9 pages).
International Search Report, issued by the European Patent Office as Searching Authority, in PCT/US07/009652 International Search Report, dated Apr. 18, 2008 (5 pages).
International Search Report, issued by the European Patent Office as Searching Authority, issued in PCT/US98/19912, dated Mar. 5, 1999 (4 pages).
International Search Report, issued by the U.S. Patent Office as Searching Authority, issued in PCT/US08/61454 International search report dated Dec. 5, 2008 (3 pages).
International Search Report, issued by the U.S. Patent Office as Searching Authority, issued in PCT/US09/032619, dated Jun. 4, 2009 (4 pages).
Jakobsen, et al., "Adenosine instead of supranormal potassium in cardioplegia: It is safe, efficient, and reduces the incidence of postoperative atrial fibrillation. A randomized clinical trial", Journal of Thoracic and Cardiovascular Surgery, 145(3):812-818, Mar. 2013 (7 pages).
Janßen, H. et al., "UW is Superior to Celsior and HTK in the Protection of Human Liver Endothelial Cells Against Preservation Injury", Liver Transplantation, 10(12):1514-1523 (2004), 10 pages.
Jaski, B.E. et al., "Positive inotropic and vasodilator actions of milrinone in patients with severe congestive heart failure. Dose-response relationships and comparison to nitroprusside", J. Clin Invest., 75(2):643-649, 1985 (8 pages).
Jirsch, D.W. et al., "Ex Vivo Evaluation of Stored Lungs", The Annals of Thoracic Surgery, 10(2):163-168, Aug. 1970 (6 pages).
Johnson, Kerry et al, "POPS: Portable Organ Preservation System", UPMC Health System and TransMedics, Inc. (No date) (1 page).
Johnston, R., "What's Normal About DLCO?", http://www.pftforum.com/blog/whats-normal-about-dlco/, PFT Blog, Jan. 1, 2014 (17 pages).
Kawakami, et al., "Successful Preservation of the Isolated Canine Heart for 24 Hours by Low Pressure-Low Temperature Continuous Perfusion", Japanese Annals of Thoracic Surgery, Japan, 7(6):543-547, Dec. 25, 1987 (13 pages)—English Translation.
Kawamura, T. et al., "Long-Term Preservation of Canine Pancreas by a New Simple Cold Storage Method Using Perfluorochemical—The Two-Layer Cold Storage Method (Euro-Collins' Solution/Perfluorochemical)-", Kobe J. Med. Sci., 38(2):135-145 (Apr. 1992), (11 pages).
Kelly, R.F., "Current strategies in lung preservation", J. Lab Clin Med, 136:427-440, Dec. 2000 (14 pages).
Keshavjee, S.H. et al., "A method for safe twelve-hour pulmonary preservation", J Thorac Cardiovasc Surg, 98:529-534 (1989), 6 pages.
Keshavjee, S.H. et al., "The role of dextran 40 and potassium in extended hypothermic lung preservation for transplantation", Journal of Thoracic and Cardiovascular Surgery, 103(2):314-325, Feb. 1992 (12 pages).
Kioka, Y. et al., "Twenty-Four-Hour Isolated Heart Preservation by Perfusion Method with Oxygenated Solution Containing Perfluorochemicals and Albumin", The Journal of Heart Transplantation, 5:437-443, 1986 (7 pages).
Koike, et al., "An Experimental Study on the Hypothermic Preservation of the Rabbit Heart Using Glucose-Insulin-Potassium Solution—Intermittent Perfusion Method Versus Simple Immersion Method", Japanese Annals of Thoracic Surgery, 7(6):527-532, Dec. 25, 1987 (16 pages)—English Translation.
Kozaki, K. et al., "Usefulness of a Combination of Machine Perfusion and Pentoxifylline for Porcine Liver Transplantation From Non-Heart-Beating Donors With Prolonged Hypotension", Transplantation Proceedings, 29:3476-3477, 1997 (2 pages).
Kubono, K. et al., "Examination of Plasma and Corpuscle Adenosine Concentration in Normal Subject by Radioimmunoassay", Rinshou Kagaku (Clinical Chemistry, 20(2):72-77, Jun. 1991 (6 pages)—Japanese Language.
Kuroda, Y. et al., "A New, Simple Method for Cold Storage of the Pancreas Using Perfluorochemical", Transplantation, 46(3):457-460, 1988 (4 pages).
Lasley, R.D. et al., "Protective Effects of Adenosine in the Reversibly Injured Heart", Ann Thorac Surg, 60(3):843-846 (1995), 4 pages.
Lawrence, C., "Machine preserves organs outside body," Chicago Sun Times (2001), 1 page.
Lefer, A.M., "Attenuation of Myocardial Ischemia-Reperfusion Injury With Nitric Oxide Replacement Therapy", Ann Thorac Surg 60(3):847-851 (1995), 5 pages.
Li, G. et al., "Functional Recovery in Rabbit Heart after Preservation with a Blood Cardioplegic Solution and Perfusion," J Heart Lung Transplant, 12(2)263-270 (1993) (8 pages).
Li, X. et al., "Insulin in University of Wisconsin Solution Exacerbates the Ischemic Injury and Decreases the Graft Survival Rate in Rat Liver Transplantation", Transplantation, 76(1):44-49, Jul. 15, 2003 (6 pages).

(56) References Cited

OTHER PUBLICATIONS

Li, X. et al., "Insulin in UW Solution Exacerbates Hepatic Ischemia / Reperfusion Injury by Energy Depletion Through the IRS-2 / SREBP—1c Pathway", Liver Transplantation, 10(9):1173-1182 (2004), 10 pages.

Liu, J. et al., "Annexin V Assay-proven Anti-apopototic Effect of Ascorbic Acid 2-glucoside after Cold Ischemia/Reperfusion Injury in Rat Liver Transplantation", Acta Med. Okayama, 57(5):209-216, Oct. 2003 (8 pages).

Lobato, E.B. et al., "Treatment with phosphodiesterase inhibitors type III and V: milrinone and sildenafil is an effective combination during thromboxane-induced acute pulmonary hypertension", British Journal of Anaesthesia, 96(3):317-322, 2006 (6 pages).

Loor, et al., "Prolonged EVLP Using OCS Lung: Cellular and Acellular Perfusates", Author Manuscript published in final edited form as Transplantation, 101(10):2303-2311, Oct. 2017 (20 pages).

Macchiarini, P. et al. "Ex Vivo Lung Model of Pig-To-Human Hyperacute Xenograft Rejection", The Journal of Thoracic and Cardiovascular Surgery, 114(3):315-325, Sep. 1997 (11 pages).

Mankad, P. et al., "Endothelial dysfunction caused by University of Wisconsin preservation solution in the rat heart", J Thorac Cardiovasc Surg, 104(6):1618-1624, 1992 (7 pages).

Matsuno, N. et al., "Effectiveness of Machine Perfusion Preservation as a Viability Determination Method for Kidneys Procured from Non-Heart-Beating Donors", Transplantation Proceedings, 26(4):2421-2422, Aug. 1994 (2 pages).

Matsuno, N. et al., "The Effect of Machine Perfusion Preservation Versus Cold Storage on the Function of Kidneys From Non-Heart-Beating Donors", Transplantation, 57(2):293-294, Jan. 1994 (2 pages).

Mehaffey, et al., "Airway pressure release ventilation during ex vivo lung perfusion attenuates injury", Journal Thoracic Cardiovascular Surgery, 153(1):197-204, Jan. 2017 (8 pages).

Menasché, P. et al., "Experimental evaluation of Celsior®, a new heart preservation solution", Eur J Cardio-thorac Surg, 8:207-213, 1994 (7 pages).

Menasché, P. et al., "Improved recovery of heart transplants with a specific kit of preservation solutions", The Journal of Thoracic and Cardiovascular Surgery, 105(2):353-363, Feb. 1993 (11 pages).

Menasché, P., "The inflammatory response to cardiopulmonary bypass and its impact on postoperative myocardial function", Current Opinion in Cardiology, 10:597-604, 1995 (8 pages).

Moisiuk, Y. et al., "Histidine-Tryptophan-Ketoglutarate Versus Euro-Collins for Preservation of Kidneys From Non-Heart-Beating Donors", Transplantation Proceedings, 28(1):202, Feb. 1996 (1 page).

Moller-Pedersen, T. et al., "Evaluation of potential organ culture media for eye banking using human donor corneas", Br J Ophthamol, 85(9):1075-1079 (2001), 5 pages.

Morimoto, T. et al., "A Simple Method for Extended Heart-Lung Preservation by Autoperfusion", Trans Am Soc Artif Intern Organs, 30:320-324 (1984), 5 pages.

Muhlbacher, et al., "Preservation Solutions for Transplantation", Transplantation Proceedings, 31(5):2069-2070, Aug. 1999 (2 pages).

Munshi, et al., "Donor management and lung preservation for lung transplantation", Lancet Respir Med, 1:318-328, published online Feb. 20, 2013 (11 pages).

Nelson, et al., "Abstract 736: Determination of Optimum Ventilation Strategy for Ex-Vivo Lung Perfusion: Comparing Negative and Positive Pressure Ventilation", Journal of Heart and Lung Transplantation, 34(4 Supplement):S270, Apr. 2015 (1 page).

Nicholson, M.L. et al., "A Comparison of Renal Preservation by Cold Storage and Machine Perfusion Using a Porcine Autotransplant Model", Transplantation 78(3):333-337, 2004 (5 pages).

No Author Listed, "CUSTODIOL® HTK Solution for Multi-Organ Protection", Saudi Center for Organ Transplantation, Date Unknown, originally cited to U.S. Patent Office Jun. 30, 2014, in U.S. Appl. No. 12/892,451 (2 pages).

No Author Listed, "SOLTRAN Kidney perfusion fluid", Baxter, No. Month Listed—2001-2004 (1 page).

No Author Listed, "The comprehensive resource for physicians, drug and illness information", VIASPAN™ DuPont Pharma Cold Storage Solution, Date Unknown (3 pages).

No Author Listed, "UW Solution Composition", DuPont Pharmaceutical, Date Unknown (1 page).

No Author Listed. "Custodiol HTK" Physicians' Desk Reference, 57th Edition, Thomson PDR. ISBN:1-56363-445-7. No Month Listed—2003 (3 pages).

O'Blenes, et al., "Protecting the aged heart during cardiac surgery: The potential benefits of del Nido cardioplegia", Journal Thoracic and Cardiovascular Surgery, 141(3):762-770, Mar. 2011 (9 pages).

Odagiri, S. et al., "Pusatile Assist Device: New Pulsatile Pump Using Pulsatile Assist Device—Hemodynamic Comparison of Pulsatile V-A Bypass (VABP), Pulsatile Left Heart Bypass (LHBP) and Constant Flow Left Heart Bypass (LHB)", Journal of Japan Surgical Society, 83(6):515-523, Jun. 1982, 12 pages—English Abstract.

Yamauchi, et al., "Portal blood flow in chronic liver disease: measurement of portal blood flow using 2D-cine phase contrast magnetic resonance angiography", Journal of Saitama Medical University, 37(2):103-112, 2011 (10 pages).

Opelz, G. et al., "Advantage of Cold Storage Over Machine Perfusion for Preservation of Cadaver Kidneys", Transplantation, 33(1):64-68 (1982), 5 pages.

Opelz, G. et al., "Comparative Analysis of Kidney Preservation Methods", Transplantation Proceedings 28(1):87-90, 1996 (4 pages).

Open Anesthesia—Milrinone: pharmacology, https://www.openanesthesia.org/milrinone_pharmacology/, accessed 2019 (3 pages).

Ota, K. et al., "Artificial Organ", Current State and Future of Substitution of Functions, pp. 150-151, 1983 (7 pages)—English Translation.

Pearl, J.M. et al., "Loss of endothelium-dependent vasodilatation and nitric oxide release after myocardial protection with University of Wisconsin solution", Cardiovascular Surgery 107(1):257-264, 1994 (8 pages).

Pego-Fernandes, et al., "Ex vivo lung perfusion: initial Brazilian experience", J. Bras. Pneumol., 35(11):1107-1112, 2009 (6 pages).

Perfadex Guidelines, NHS Cardiothoracic Advisory Group (CTAG), Mar. 2016 (2 pages).

Petrovsky, B.V. et al., "Justification and Application of a New Method for Transorganic Oxygen Preservation of the Kidneys", Vestn. Akad. Med. Nauk, SSSR., 2:69-82 (1989)—English Abstract, 15 pages.

Pinsky, D. et al., "Restoration of the cAMP Second Messenger Pathway Enhances Cardiac Preservation for Transplantation in a Heterotopic Rat Model", J. Clin. Invest. 92(6):2994-3002 (1993) (9 pages).

Ploeg, R.J. et al., "Successful 72-Hour Cold Storage of Dog Kidneys With UW Solution", Transplantation, 46(2):191-196, Aug. 1988 (6 pages).

Pokorny, H. et al., "Histidine-tryptophan-ketoglutarate solution for organ preservation in human liver transplantation—a prospective multi-centre observation study", Transpl Int, 17(5):256-260 (2004), (5 pages).

Popov, et al., "Ex Vivo Lung Perfusion—State of the Art in Lung Donor Pool Expansion", Medical Science Monitor Basic Research, 21:9-14, Feb. 3, 2015 (6 pages).

Poston, R.S. et al., "Optimizing Donor Heart Outcome After Prolonged Storage With Endothelial Function Analysis and Continuous Perfusion", Ann Thorac Surg, 78:1362-1370, 2004 (9 pages).

Potdar, S. et al., "Initial experience using histidine-tryptophan-ketoglutarate solution in clinical pancreas transplantation", Clin Transplant, 18(6):661-665 (2004), 5 pages.

Pozniak, A., "Keeping Hearts Alive Doctors Develop a High-Tech System to Salvage Donated Organs", ABC News.com, (Dec. 7, 2001) (<http://abcnews.go.com/print?id=117085>), (2 pages).

Probst, R. et al. "Carbohydrate and fatty acid metabolism of cultured adult cardiac myocytes", Am. J. Physiol. 250 (Heart, Circ. Physiol. 19):H853-H860 (1986) (8 pages).

Pruitt, "Pharmacological Treatment of Respiratory Disorders", RT Magazine, http://www.rtmagazine.com/2007/05/pharmacological-treatment-of-respiratory-disorders, May 3, 2007, accessed Jan. 1, 2019 (6 pages).

(56) References Cited

OTHER PUBLICATIONS

Rao, M.V. et al., "Magnesium Sulfate: Chemical and Technical Assessment", MgSO4 (CTA), 2007 (5 pages).
Rao, V. et al., "Donor Blood Perfusion Improves Myocardial Recovery After Heart Transplantation", J. Heart Lung Transplant. 16(6):667-673, Jun. 1997 (7 pages).
Raymondos, et al., "Combined Negative- and Positive-Pressure Ventilation for the Treatment of ARDS", Case Reports in Critical Care, Article ID714902, 2015 (5 pages).
Reddy, S.P. et al., "Preservation of Porcine Non-Heart-Beating Donor Livers by Sequential Cold Storage and Warm Perfusion", Transplantation, 77(9):1328-1332, May 15, 2004 (5 pages).
Rega, et al., "Long-term Preservation With Interim Evaluation of Lungs From a Non-Heart-Beating Donor After a Warm Ischemic Interval of 90 Minutes", Annals of Surgery, 238(6):782-793, Dec. 2003 (12 pages).
Richens, D. et al., "Clinical Study of Crystalloid Cardiplegia vs Aspartate-Enriched Cardioplegia Plus Warm Reperfusion for Donor Heart Preservation", Transplantation Proceedings, 25(1):1608-1610, Feb. 1993 (3 pages).
Rinder, C.S. et al., "Blockade of C5a and C5b-9 Generation Inhibits Leukocyte and Platelet Activation during Extracorporeal Circulation", J. Clin. Invest. 96(3):1564-1572, Sep. 1995 (9 pages).
Robinson, et al., "Lowering the calcium concentration in St. Thomas' Hospital cardioplegic solution improves protection during hypothermic ischemia", Journal of Thoracic and Cardiovascular Surgery, 101(2):314-325, Feb. 1991 (12 pages).
Rosenkranz, E.R., "Substrate Enhancement of Cardioplegic Solution: Experimental Studies and Clinical Evaluation", Ann Thorac Surg 60:797-800 (1995) (4 pages).
Rossi, L. et al., "Innovations-report: New organ preservation solution easier to use", (<http://www.innovations-report.com/html/reports/medicine_report-18854.html>), Feb. 6, 2003 (2 pages).
Rossi, L., "Portable Organ Preservation System™ Keeps Human Heart Alive Outside Body", PITT Campaign Chronicle, Oct. 7, 2001 (2 pages).
Rudd, et al., "Eight hours of cold static storage with adenosine and lidocaine (Adenocaine) heart preservation solutions: Toward therapeutic suspended animation", Journal of Thoracic Cardiovascular Surgery, 142(6):1552-1561, Dec. 2011 (10 pages).
Rudd, et al., "Toward a new cold and warm nondepolarizing, normokalemic arrest paradigm for orthotopic heart transplantation", The Journal of Thoracic and Cardiovascular Surgery, 137(1):198-207, Jan. 2009 (10 pages).
Russell, H.E., Jr. et al., "An Evaluation of Infusion Therapy (Including Dextran) for Venous Thrombosis", Circulation, 33:839-846, Jun. 1966 (8 pages).
Saez, D.G. et al., "Evaluation of the Organ Care System in Heart Transplantation With an Adverse Donor/Recipient Profile", Ann. Thorac. Surg., 98:2099-2106, 2014 (8 pages).
Sato, H. et al., "Supplemental L-Arginine During Cardioplegic Arrest and Reperfusion Avoids Regional Postischemic Injury", J Thorac Cardiovasc Surg 110(2):302-314, Aug. 1995 (13 pages).
Schmid, T. et al., "The Use of Myocytes as a Model for Developing Successful Heart Preservation Solutions", Transplantation, 52(1):20-26, Jul. 1991 (7 pages).
Schon, M.R. et al., "Liver Transplantation After Organ Preservation With Normothermic Extracorporeal Perfusion", Annals of Surgery, 233(1):114-123, Jan. 2001 (10 pages.
Schwalb, H. et al., "New Solution for Prolonged Myocardial Preservation for Transplantation", The Journal of Heart and Lung Transplantation, 17(2):222-229, Feb. 1998 (8 pages).
Seccombe, J.F. et al., "Coronary Artery Endothelial Function After Myocardial Ischemia and Reperfusion", Ann Thorac Surg, 60:778-788, 1995 (11 pages).
Segel, L.D. et al., "Posttransplantation Function of Hearts Preserved with Fluorochemical Emulsion", J Heart Lung Transplant, 13(4):669-680, Jul./Aug. 1994 (12 pages).
Segel, L.D. et al., "Recovery of Sheep Hearts After Perfusion Preservation or Static Storage with Crystalloid Media", The Journal of Heart and Lung Transplantation, 17:211-221, Feb. 1998 (11 pages).
Sekine, M. et al., "Effect of Obese and Aging on Blood Fatty Acid Consumption in Japanese", Bulletin of the Graduate School of Human Life Science, Showa Women's University, 4:63-70, 1995 (8 pages)—English Abstract.
Semat, H. and Katz, R., "Physics, Chapter 9: Hydrodynamics (Fluids in Motion)", University of Nebraska—Lincoln, pp. 165-181, 1958 (18 pages).
Shimokawa, S. et al., "A New Lung Preservation Method of Topical Cooling by Ambient Cold Air Combined with High-Frequency Oscillation: An Experimental Study", Transplantation Proceedings, 26(4):2364-2366, Aug. 1994 (3 pages).
Shimokawa, S. et al., "A New Lung Preservation Method of Topical Cooling by Ambient Cold Air: An Experimental Study", Transplantation Proceedings, 23(1):653-654, Feb. 1991 (2 pages).
Shirakura, R. et al., "Multiorgan Procurement from Non-Heart-Beating Donors by use of Osaka University Cocktail, Osaka Rinse Solution, and the Portable Cardiopulmonary Bypass Machine", Transplantation Proceedings, 25(6):3093-3094, Dec. 1993 (2 pages).
Siobal, M.S. "Pulmonary Vasodilators", Respir Care, 52(7):885-899, Jul. 2007 (15 pages).
Southard, J., "The Right Solution for Organ Preservation", Business Briefings: Global Surgery, pp. 79-84, 2004 (6 pages).
Steen Solution, Consultation Procedure Public Assessment Report (CPAR), European Medicines Agency, EMEA/CHMP/329441/2005, Aug. 8, 2012 (20 pages).
Steen, S. et al., "Transplantation of lungs from non-heart-beating donors after functional assessment ex vivo", Ann Thorac Surg, 76:244-252, 2003 (11 pages).
Stubenitsky, B.M. et al., "Kidney preservation in the next millennium", Transpl Int, 12:83-91 (1999), 9 pages.
Sunamori, M. et al., "Relative Advantages of Nondepolarizing Solution to Depolarizing University of Wisconsin Solution in Donor Heart Preservation", Transplantation Proceedings, 25(1):1613-1617, Feb. 1993 (5 pages).
Sutherland, et al., "The Isolated Blood and Perfusion Fluid Perfused Heart", https://www.southalabama.edu/ishr/help/hearse/, Cardiovascular Research—The Centre for Cardiovascular Biology and Medicine, the Rayne Institute, King's College, St Thomas' Hospital, London, UK; originally retrieved on Oct. 16, 2017, accessed Aug. 28, 2023 (12 pages).
Synchrony Definition, http://dictionary.reference.com/browse/synchrony, Random House Unabridged Dictionary, 2006 (1 page).
Takemoto, et al., "The reciprocal protective effects of magnesium and calcium in hyperkalemic cardioplegic solutions on ischemic myocardium", Basic Research in Cardiology, 87(6):559-569, 1992 (11 pages).
Tane, et al., "Ex Vivo Lung Perfusion: A Key Tool for Translational Science in the Lungs", Chest, 151(6):1220-1228, Jun. 2017 (9 pages).
Tang, D.G. et al., "Warm Ischemia Lung Protection With Pinacidil: An ATP Regulated Potassium Channel Opener", Ann Thorac Surg, 76:385-390, 2003 (6 pages).
Taylor, et al., "Registry of the International Society for Heart and Lung Transplantation: Twenty-sixth Official Adult Heart Transplant Report—2009", Journal of Heart and Lung Transplantation, 28(10):1007-1022, Oct. 2009 (16 pages).
Tesi, R.J., et al., "Pulsatile Kidney Perfusion for Preservation and Evaluation: Use of High-Risk Kidney Donors to Expand the Donor Pool", Transplantation Proceedings, 25(6):3099-3100, Dec. 1993 (2 pages).
Turpin, B.P., et al., "Perfusion of Isolated Rat Adipose Cells", The Journal of Clinical Investigation, 60:442-448, Aug. 1977 (7 pages).
U.S. Food and Drug Administration, Center for Drug Evaluation and Research, "Drugs@FDA—Solu-Medrol: Label and Approval History", (Available online at http://www.accessdata.fda.gov/scripts/cder/drugsatfda/index.cfm?fuseaction=Search.Label_ApprovalHistory#apphist . . . ), accessed Feb. 9, 2010 (3 pages).
U.S. Food and Drug Administration, Center for Drug Evaluation and Research, "Drugs@FDA—Solu-Medrol: Drug Details", (Acces-

(56) References Cited

OTHER PUBLICATIONS sible online at http://www.accessdata.fda.gov/scripts/cder/drugsatfda/index.cfm?fuseaction=Search.DrugDetails . . .), accessed Feb. 9, 2010 (1 page).
unitslab.com, Online Converter, Lidocaine, https://unitslab.com/node/178, retrieved Aug. 29, 2023 (3 pages).
Venuta, F. et al., "History of lung transplantation", Journal of Thoracic Disease, 9(12):5458-5471, Dec. 2017 (14 pages).
Vinten-Johansen, J. et al., "Reduction in Surgical Ischemic-Reperfusion Injury With Adenosine and Nitric Oxide Therapy", Ann Thorac Surg 60(3):852-857 (1995), 6 pages.
Voiglio, E. et al. "Rat Multiple Organ Blocks: Microsurgical Technique of Removal for Ex Vivo Aerobic Organ Preservation Using a Fluorocarbon Emulsion", Microsurgery 20:3, 109-115, 2000 (7 pages).
Wallinder, et al., "Transplantation of initially rejected donor lungs after ex vivo lung perfusion", Cardiothoracic Transplantation, 144(5):1222-1228, Nov. 2012 (7 pages).
Watanabe, S. et al., "Effects of free fatty acids on the binding of bovine and human serum albumin with steroid hormones", Biochimica et Biophysica Acta, 1289:385-396, 1996 (12 pages).
Wei, Y. et al., "Protective Effect of Specific Phosphodiesterase Inhibitor Milrinone for Donor Lungs", Chinese Journal of New Drugs, 16(21):1762-1765, 2007—English Translation issued by U.S. Patent and Trademark Office, Aug. 2020 (17 pages).
Wei, Z., et al., "A Study on the Preservation of Rat Kidney with HX-III Solution", J WCUMS, 31(3):347-349, 2000 (5 pages)—English Abstract.
White et al., "Abstract 735: Impact of Initial Acidic Reperfusion on the Functional Recovery of DCD Hearts During Ex Vivo Heart Perfusion", Journal of Heart and Lung Transplantation, 34(4Supplemental):S269-S270, Apr. 2015 (2 pages).
White, et al., "Abstract 385: Impact of Initial Acidic Reperfusion on the Functional Recovery of DCD Hearts During Ex Vivo Heart Perfusion", Canadian Journal Cardiology, 30:S251-252, 2014 (2 pages).
White, et al., "Impact of Reperfusion Calcium and pH on the Resuscitation of Hearts Donated After Circulatory Death", Annals of Thoracic Surgery, 103:122-130, Jan. 2017 (9 pages).
Wicomb, W. et al., "Orthotopic transplantation of the baboon heart after 20 to 24 hours' preservation by continuous hypothermic perfusion with an oxygenated hyperosmolar solution", J. Thorac Cardiovasc Surg, 83(1):133-140, Jan. 1982 (8 pages).
Wicomb, W.N. et al., "24-Hour Rabbit Heart Storage With UW Solution", Transplantation, 48(1):6-9, Jul. 1989 (4 pages).
Wicomb, W.N. et al., "Cardiac Transplantation Following Storage of the Donor Heart by a Portable Hypothermic Perfusion System", The Annals of Thoracic Surgery, 37(3):243-248, Mar. 1984 (6 pages).
Wild et al., "PEEP and CPAP", British Journal of Anaesthesia, 1(3):89-92, 2001 (4 pages).
Wittwer, et al., "Experimental Lung Transplantation: Impact of Preservation Solution and Route of Delivery", The Journal of Heart and Lung Transplantation, 24(8):1081-1090, Aug. 2005 (10 pages).
Wright, N. et al. "A porcine ex vivo paracorporeal model of lung transplantation", Laboratory Animals Ltd., Laboratory Animals: 34(1):56-62, 2000 (7 pages).
Xvivo Perfusion, RedEye Equity Research, May 29, 2020 (3 pages).
Yang, W. et al., "Effect of Hypoxia and Reoxygenation on the Formation and Release of Reactive Oxygen Species by Porcine Pulmonary Artery Endothelial Cells", Journal of Cellular Physiology, 164:414-423, 1995 (10 pages).
Yeung, J., et al., "Physiologic assessment of the ex vivo donor lung for transplantation", Journal of Heart and Lung Transplantation, 31(10):1120-1126, Oct. 2012 (7 pages).
Yland, M.J. et al., "New Pulsatile Perfusion Method for Non-Heart-Beating Cadaveric Donor Organs: A Preliminary Report", Transplantation Proceedings, 25(6):3087-3090, Dec. 1993 (4 pages).
Yokoyama, H. et al., "Isolated Dog Hearts Prepared in Cold Tyrode Solution and Reperfused with Arterial Blood Are Functionally and Ultrastructurally Normal", The Tohoku Journal of Experimental Medicine, 156:121-134, 1988 (14 pages).
Zalewska, et al., National Standards for Organ Retrieval from Deceased Donors (extracts), NHS Blood and Transplant, UK National Health Service, MPD1043/8, effective date Oct. 15, 2018 (50 pages).
Zhang, Z. et al., "Research Progress on Preservation of Severed Limbs", Chinese Journal of Reparative and Reconstructive Surgery, 14(3):189-192, 2000 (8 pages)—English Abstract.

* cited by examiner

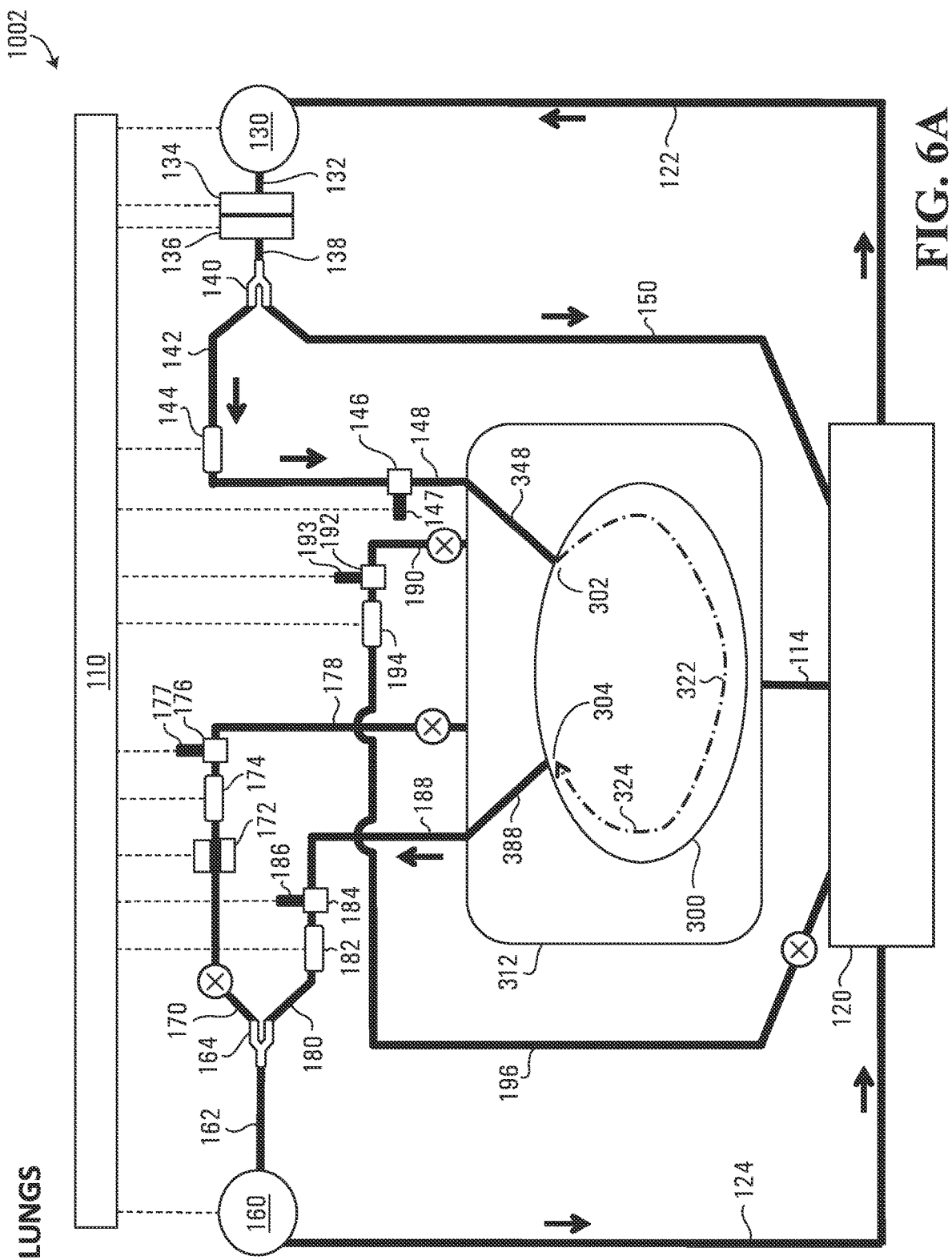

ion of the perfusate in the conduits; and a controller configured and connected for controlling the first and second pumps to regulate the circulation of the perfusate through the organ; wherein the perfusion module is one of a plurality of organ-specific modules each configured to couple with the base unit, the organ-specific modules comprising a first module configured for perfusing a lung. The base unit and the first module may be configured such that when the base unit is coupled to the module for perfusing the lung, a first one of the conduits is connectable to a pulmonary artery of the lung for supplying the perfusate into the lung, a second one of the conduits is connectable to a pulmonary vein of the lung for returning perfusate egressed from the lung to the source, and the controller is operable to control the first and second pumps to apply a first pressure in the first conduit to drive flow of the perfusate into the pulmonary artery and to maintain a second pressure in the second conduit to resist the flow of the perfusate out of the atrium of the lung. The first module may comprise a ventilator for ventilating the lung, or may comprise a connector for connecting the lung to an external ventilator. The organ-specific modules may include a second module configured for perfusing a heart. The base unit and the second module may be configured such that when the base unit is coupled to the second module, the conduits are connectable to the heart to circulate the perfusate through the aorta, right atrium, left atrium and a pulmonary artery of the heart, and the controller is operable to control the first and second pumps to apply a first pressure at the right atrium and left atrium with the first pump and a second pressure at the aorta with the second pump. The apparatus may be configured to be operable to perfuse the heart in a resting condition or in a working condition. The second module may comprise connectors for connecting the heart to at least one of a pacemaker, an electrocardiogram monitor, and a defibrillator. The organ-specific modules may comprise a module configured for perfusing a liver. The base unit and the module for perfusing the liver may be configured such that when the base unit is coupled to the module for perfusing the liver, the conduits are connectable to the liver to supply the perfusate to the liver through a portal vein and a hepatic artery of the liver, and the controller is operable to control the first and second pumps to regulate flow of the perfusate through each one of the portal vein and the hepatic artery. The module for perfusing the liver may comprise a bile collector for collecting bile from the liver. The organ-specific modules may comprise a module configured for perfusing a kidney. The apparatus may comprise one or more of the organ-specific modules. The base unit may comprise a conditioning system coupled to the conduits for conditioning the perfusate. The conditioning system may comprise a heat exchanger for controlling a temperature of the perfusate, and a gas exchanger for selectively oxygenating or deoxygenating the perfusate. The controller may be operable to control the heat exchanger to regulate the temperature of the perfusate, and to control the gas exchanger to oxygenate or deoxygenate the perfusate. The apparatus may comprise a plurality of pressure sensors and flow rate sensors for detecting signals indicative of pressures and flow rates at selected locations in selected ones of the conduits, and a temperature sensor for detecting a signal indicative of a temperature of the perfusate or the organ. The controller may be operable to control a perfusate flow property based on, at least in part, the detected signals from at least one of the pressure sensors and the flow rate sensors. The perfusate flow property may include at least one of a pressure at a selected location in the conduits, or a flow rate in a selected one of the plurality of the conduits. The base

APPARATUS AND METHOD FOR ORGAN PERFUSION

CROSS-REFERENCE TO RELATED APPLICATION

This application is a continuation application of U.S. patent application Ser. No. 15/533,690, filed Jun. 7, 2017, which application is a national filing of PCT International Patent Application No. PCT/CA2015/051316, filed Dec. 11, 2015, which claims the benefit of, and priority from, U.S. Provisional Patent Application No. 62/090,984, filed Dec. 12, 2014, the entire contents of each of the prior applications are incorporated herein by reference.

FIELD

This disclosure relates generally to organ perfusion apparatus and methods, and particularly to apparatus and methods with customized control of perfusate flow using fluid pumps for different types of organs, such as heart, lung, liver or kidney.

BACKGROUND

Organ perfusion is a useful technique, particularly for preserving, testing and assessing donated organs for transplantation. For example, different perfusion apparatus, system and methods have been developed for ex vivo maintenance and transportation of harvested organs. After an organ for transplantation is harvested from an organ donor, it is usually maintained ex vivo by perfusion for a period of time before it is transplanted into a recipient. For ex vivo maintenance of an excised organ, a perfusion solution may be used to supply oxygen and nutrients to the cells and tissues within the harvested organ, and to remove carbon dioxide and wastes, through the organ's endogenous vasculature. The perfusate may be formed of whole blood, a blood fraction mixed with a dilutant such as PERFADEX™, or an appropriate substitute for blood such as STEEN Solution™, and which has the appropriate temperature, gas composition, solute concentrations and pH. The perfusate may be supplied into the organ's primary artery or arteries, passed through capillary beds in the organ and into the veins, and then excreted from the organ's primary vein or veins.

Despite advancement in perfusion technology to date, a large percentage of donated organs have not been used for transplantation due to a number of reasons. For example, the functionality of some harvested organs were not adequately preserved or restored, rendering them unsuitable for transplantation. Some harvested organs were discarded as unsuitable based on visual inspection, which were in fact good candidates for transplantation. It has been reported that currently only about 15-25% of donated lungs and hearts were found suitable and used for transplantation.

Further improvement in perfusion techniques is thus desirable.

SUMMARY

In accordance with an aspect of the present disclosure, there is provide an apparatus for perfusion of organs, comprising a base unit configured to removably couple with a perfusion module for perfusing an organ, the base unit comprising conduits for connecting a source of a perfusate to the organ to circulate the perfusate through the organ; first and second pumps coupled to the conduits for driving unit may comprise a user interface for receiving a user input, and controls circulation or condition of the perfusate based on, at least in part, the user input. The user input may include an indication of a desired pressure at a selected location, or a desired flow rate in a selected conduit. The base unit may comprise a container for receiving and storing the perfusate to provide the source of the perfusate. The pumps may comprise centrifugal pumps. The conduits may comprise a bypass conduit for returning a portion of the perfusate from the conduits or the perfusion module to the source without passing through the organ. The perfusion module may comprise an organ-specific perfusion chamber.

In another aspect of the present disclosure, there is provided a perfusion module as described herein and being configured to couple with a base unit described herein.

In a further aspect, there is provided an apparatus for perfusion of organs, comprising a plurality of organ-specific perfusion modules each comprising a perfusion chamber for perfusing a respective specific organ and a set of fluid conduits configured for connecting the specific organ to a source of a perfusate; and a base unit comprising a receptacle for removably mounting a selected one of the organ-specific modules onto the base unit, conduits connecting the source of the perfusate to the fluid conduits of the each organ-specific perfusion module, to allow circulation of the perfusate through the respective specific organ, first and second pumps coupled to the conduits for regulating circulation of the perfusate through the specific organ, a heat exchanger for controlling a temperature of the perfusate, a gas exchanger for oxygenating or deoxygenating the perfusate, and a controller for controlling the pumps and the heat exchanger to regulate circulation of the perfusate through the specific organ and to regulate a property or condition of the perfusate, the controller configurable to regulate circulation of the perfusate based on a specific set of control settings associated with each one of the organ-specific modules.

In another aspect, there is provided a method of perfusing a lung, comprising circulating a perfusate through the lung by supplying the perfusate into the lung through a pulmonary artery and withdraw the perfusate from the lung through a pulmonary vein; applying a first pressure in the pulmonary artery to drive flow of the perfusate through the lung; applying a second pressure in the pulmonary vein to resist the flow of the perfusate through the lung. The second pressure may be regulated to maintain the second pressure substantially constant.

In a further aspect, there is provided an apparatus for perfusion of multiple types of organs, comprising a base unit configured to removably couple with a perfusion module for perfusing an organ, the base unit comprising conduits for connecting a source of a perfusate to the organ to circulate the perfusate through the organ; first and second pumps coupled to the conduits for driving circulation of the perfusate in the conduits; and a controller configured and connected for controlling the first and second pumps to regulate the circulation of the perfusate through the organ; wherein the controller is operable to control the first and second pumps to perfuse the organ in accordance with organ specific perfusion parameters, and wherein the organ specific perfusions parameters are selected based on the type of the organ and may be selected by an operator for at least two organ types selected from the group of heart, liver, kidney and lung.

In another aspect, there is provided an apparatus for perfusing lungs, comprising conduits for connecting a source of a perfusate to a lung to circulate the perfusate through the lung, the conduits comprising a first conduit connectable to supply the perfusate into the lung through a pulmonary artery of the lung and a second conduit connectable to return perfusate egressed from the lung to the source through a pulmonary vein of the lung; a first pump coupled to the first conduit for driving flow of the perfusate into the lung; a second pump coupled to the second conduit for resisting flow of the perfusate out of the lung; and a controller for controlling the first and second pumps to regulate circulation of the perfusate through the lung. The apparatus may further comprise a ventilator for ventilating the lung.

Other aspects, features, and embodiments of the present disclosure will become apparent to those of ordinary skill in the art upon review of the following description of specific embodiments in conjunction with the accompanying figures.

BRIEF DESCRIPTION OF DRAWINGS

In the figures, which illustrate, by way of example only, embodiments of the present disclosure.

FIG. 6A is a schematic diagram of an embodiment of the apparatus of FIG. 1, with a lung-specific module coupled to the base unit of FIG. 2;

DETAILED DESCRIPTION

In overview, it has been realized that multiple pumps can be conveniently used in ex vivo perfusion devices, not only for heart perfusion but also for lung perfusion or perfusion of other organs, to achieve improved flow control to allow better simulation of blood circulation in intact organs, and assessment of organ conditions. A fluid subsystem with pumps and a control subsystem may be conveniently provided in a base unit that can be coupled to different organ-specific modules. The inclusion of multiple pumps allows the base unit to be conveniently configured and adapted to work with multiple organ-specific modules for perfusing different types of organs, such as heart, lung, liver, or kidney.

For example, to perfuse an excised lung, a first pump may be used to apply a preload pressure to drive flow of a perfusate into a pulmonary artery of the lung, and a second pump may be used to maintain an afterload pressure to resist the flow of the perfusate out of a pulmonary vein of the lung. As the first and second pumps can be individually controlled, such as by a controller, the preload pressure, the flow rate, and the afterload pressure can be conveniently controlled and regulated. For example, while the afterload pressure is maintained at a constant level, the preload pressure and flow rate may be adjusted as desired.

In another example, to perfuse an excised liver, a first pump may be used to drive flow of a perfusate into a hepatic artery of the liver, and a second pump may be used to drive flow of a perfusate into a portal vein of the liver. As the first and second pumps can be individually controlled, the flow properties of perfusate flows into the hepatic artery and the portal vein can be separately or independently adjusted and regulated.

In a further example, multiple pumps may be used to perfuse a heart, as described herein, or as described in WO 2013/106908, published Jul. 25, 2013, and in WO 2015/143552, published Oct. 1, 2015, the entire contents of each of which are incorporated herein by reference.

Figure 1:
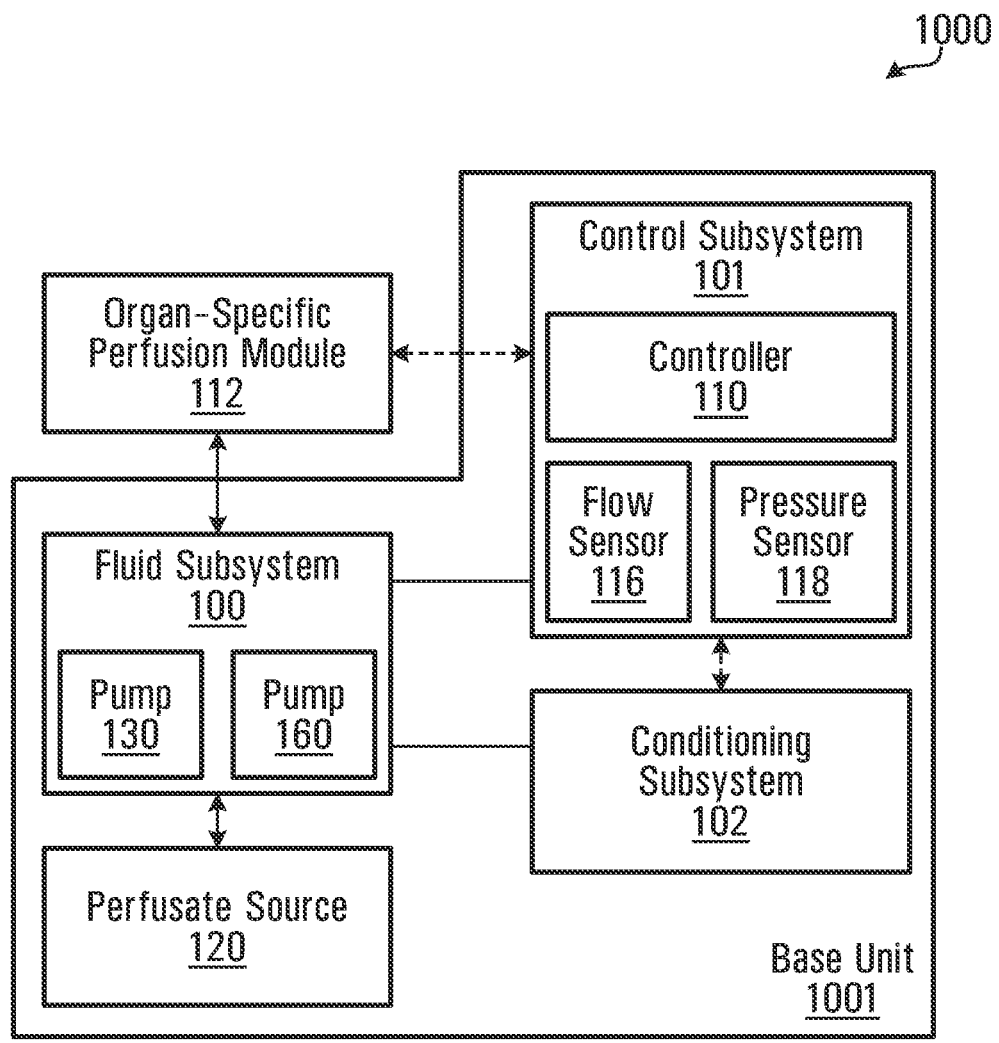
FIG. 1 is a block diagram of an apparatus with a base unit coupled to an organ-specific perfusion module, according to an embodiment of the present disclosure.

FIG. 1 illustrates an example apparatus 1000 for perfusion of different organ types. Apparatus 1000 includes a base unit 1001 and a perfusion module 112 removably coupled to the base unit 1001.

Perfusion module 112 is selected from a number of selectable organ-specific modules each for perfusing a specific type of organ. Each perfusion module 112 may include a perfusion chamber (not shown in FIG. 1) for supporting the organ to be perfused. The perfusion module 112 may also be configured to provide an environment that sustains the function or health of an excised organ ex vivo, such as maintenance of humidity, gas composition, and temperature.

The base unit 1001 includes a fluid subsystem 100 for connecting a perfusate source 120 to the organ supported on a perfusion module 112 in order to circulate the perfusate through the organ. Base unit 1001 also includes a conditioning subsystem 102 for conditioning the perfusate, and a control subsystem 101 for controlling perfusate circulation through the organ.

Fluid subsystem 100 may include any number of conduits (not separately shown in FIG. 1) configured to supply fluids to the organ and return fluids from the organ or any selected location in the fluid subsystem 100 back to the perfusate source 120. The conduits may be provided in any suitable form, shape or size, as will be further described below. The number of conduits and their configuration may be selected depending on the types of organs to be perfused with the apparatus 1000, as can be understood by those skilled in the art. Sufficient conduits are provided and configured so as to accommodate all selectable organ-specific perfusion modules 112 and different modes of operation for perfusion of multiple types of excised organs. The fluid subsystem 100 may include multiple pumps, such as first pump 130 and second pump 160.

The perfusion module 112 may be configured to position the organ for connection to conduits in the fluid subsystem 100. The perfusion module 112 may also optionally include its own conduits for such connection. The base unit 1001 and the perfusion module 112 may include coupling structures (not shown) for quick coupling and connection of conduits there between.

The perfusate source 120 may be mounted on base unit 1001, or may be attached or connected to base unit 1001. It is not necessary that the perfusate source 120 be included in base unit 1001 but it may be convenient to provide a perfusate storage or container in base unit 1001. In some embodiments, it may be convenient to provide the perfusate source within the perfusion module 112.

The conditioning subsystem 102 may include any necessary or optional conditioning devices or equipment for conditioning the perfusate, such as its composition, temperature, pH, or the like. In an embodiment, conditioning subsystem 102 may include a heat exchanger (not shown in FIG. 1, but see below and other figures) for controlling and regulating the temperature of the perfusate or the organ. The heat exchanger may be replaced with a heater, or separate heater and cooler. Conditioning subsystem 102 may also include a gas exchanger (not shown in FIG. 1, but see below and other figures) for adjusting a gas content in the perfusate. Typically, the gas exchanger may include an oxygenator for oxygenating or deoxygenating the perfusate, depending on the application. Other perfusate conditioning devices may be provided as understood by those skilled in the art.

As depicted, conditioning subsystem 102 may be coupled to conduits in fluid subsystem 100 for conditioning the perfusate, at one or more selected locations in the fluid subsystem 100. In different embodiments, conditioning subsystem 102 may be coupled to the perfusate source 120 to condition the perfusate stored in perfusate source 120.

In an embodiment, the control subsystem 101 includes a controller 110, for controlling the operation of the apparatus 1000, and any additional necessary or optional control components or devices such flow sensors 116, pressure sensors 118, communication lines or the like (not all shown in FIG. 1, but see below and other figures). The controller 110 is configured and connected for controlling pumps 130, 160 to regulate circulation of the perfusate through the organ. The pumps 130, 160 are coupled to selected conduits in fluid subsystem 100 for driving circulation of the perfusate through the conduits.

As will be appreciated by those skilled in the art, controller 110 may be a digital controller such as a general or specifically-designed microcontroller, or an analog controller, or a combination thereof. A suitable controller may include hardware such as a processor or electronic circuit, and software which may be stored in a memory. A controller or any of its components may also be implemented by hardware only.

Conveniently, different types of organs may be perfused and assessed using the apparatus 1000, by coupling the corresponding organ-specific perfusion module 112 to the base unit 1001. To this end, control subsystem 101 may be configured and adapted to allow customized, organ-specific control settings and control parameters to be used with respective organ-specific module.

Figure 2:
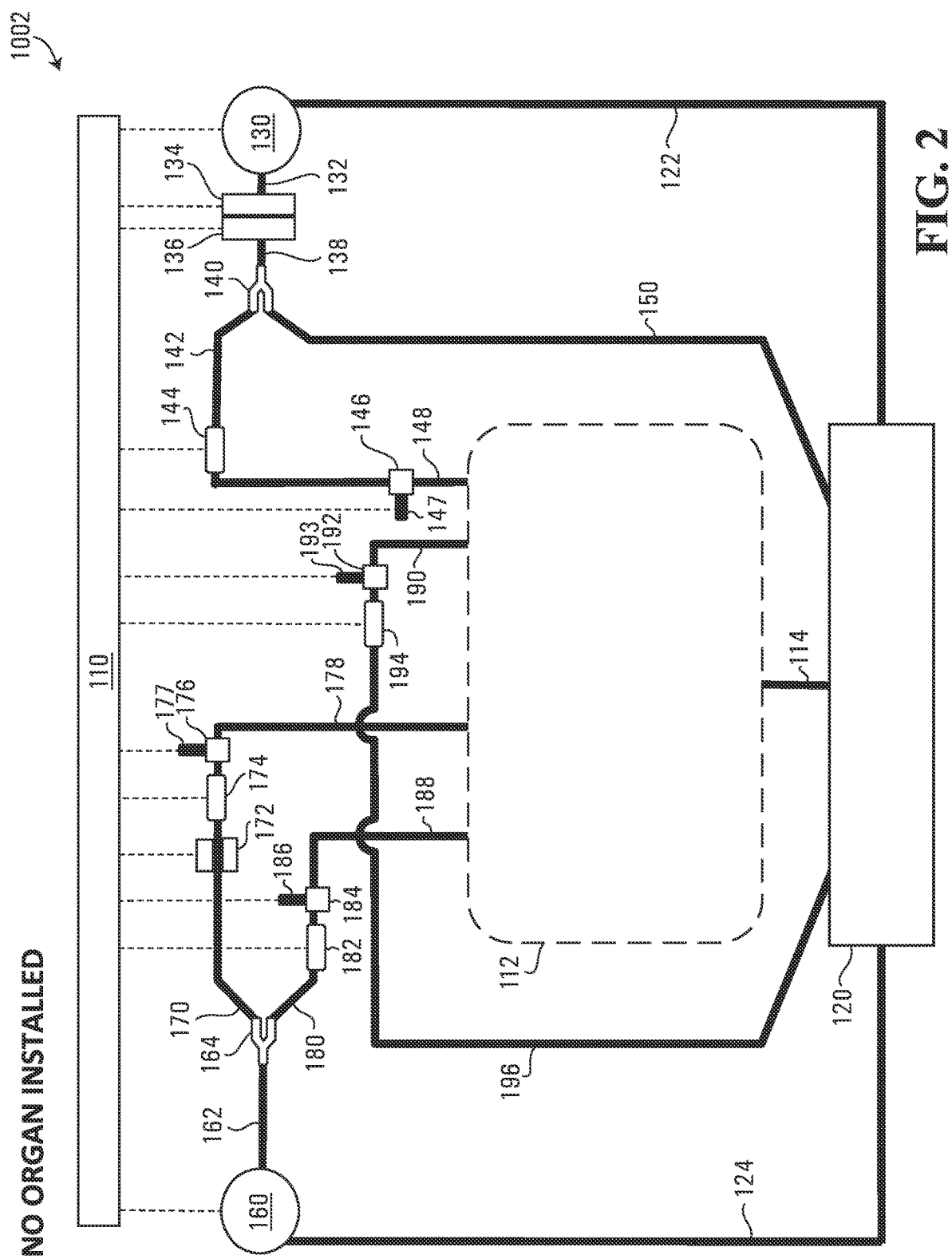
FIG. 2 is a schematic diagram of an embodiment of the base unit in the apparatus of FIG. 1.

FIG. 2 illustrates a base unit 1002, which is a particular embodiment of base unit 1001. As depicted, the base unit 1002 can removably couple with the organ-specific perfusion module 112.

Perfusate that collects in the perfusion module 112 can flow to the perfusate source 120 through a drainage conduit 114.

The perfusion module 112 may include one or more sensors (not shown), which may be connected with the controller 110, for monitoring the level of a pool of perfusate, if any, in the perfusion module 112. Other sensors (not shown) may also be provided and connected with the controller 110 for monitoring other aspects of the environment surrounding an organ in the perfusion module 112, as would be understood by persons skilled in the art. The perfusion module 112 may include connectors, such as a tubing connector or a cannula, for connecting a blood vessel or a chamber of an organ to a conduit of the fluid subsystem 100. Suitable, commercially-available cannulae may include those available from XVIVO™ Perfusion.

The perfusate source 120 may be provided in the form of a container, chamber, or the like, and is alternatively referred to as a reservoir. The perfusate source 120 can have different forms, shapes, and sizes and may be pressurized or unpressurized.

The fluid subsystem 100 in the base unit 1002, as illustrated in FIG. 2, may include conduits 122, 124, 132, 138, 142, 148, 150, 162, 170, 178, 180, 188, 190, and 196, depicted as thick lines in FIG. 2; centrifugal pumps 130 and 160; Y-connectors 140 and 164; and pressure ports 146, 176, 184, and 192. A conduit may be formed of a tubing, a channel, a chamber, a pipe, or the like, or a combination thereof. A conduit may also include a cannula that connects another conduit to a blood vessel of an organ. A conduit may have any suitable diameter and flexibility, and may be formed of any suitable material. Some conduits in a base unit may be rigid. End connection conduits may be flexible to easy handling. Examples of suitable conduit materials include PVC perfusion tubing as may be utilized in cardiopulmonary bypass surgery, including those available from Sorin Group, Maquet Getinge Group, or Medtronic; silicone tubing; or other suitable inert, durable plastic tubing.

Connections between conduits and other components of the fluid subsystem 100 (e.g., pumps, pressure ports, heat exchanger, gas exchanger) or components of the control subsystem 101 (e.g. pressure sensors, flow sensors), perfusate source 120, and conditioning subsystem 102 may be sealed, such that the base unit 1002 and the perfusion module 112 form a closed fluid circuit.

As noted above the conditioning subsystem 102 in base unit 1002 includes heat exchanger 134 and gas exchanger 136, which are configured and adapted to condition the perfusate supplied to the organ. The temperature, gas composition, pH, concentrations of solutes (e.g., $[Na^+]$, $[K^+]$, $[Cl^-]$, $[Ca^{2+}]$, lactate concentration, or glucose concentration), and other parameters of the perfusate can be monitored and modulated in manners or with techniques known to persons of skill in the art. In particular, the perfusate can be heated or cooled to a desired temperature, such as a normothermic temperature from the range of about 20° C. to about 39° C., by the heat exchanger 134, as depicted in FIG. 2. The heat exchanger 134 is typically connected to a power source, such an electrical socket or battery (not shown). Further, the gas composition of the perfusate can be modulated or maintained by the gas exchanger 136, as depicted in FIG. 2. The gas exchanger 136 may be connected to a gas source, such as a pressurized gas tank (not shown), where the gas may be oxygen. The gas exchanger 136 may be titrated to maintain a pH of 7.35 to 7.45, partial pressure of arterial oxygen of 300 to 400 millimeters of mercury ("mmHg"), and partial pressure of arterial carbon dioxide of 35 to 45 mmHg.

It is noted that different organs may require different gas compositions in the perfusate. For instance, while for heart perfusion the perfusate may be oxygenated to increase its oxygen content, a perfusate to be pumped into a pulmonary artery of a lung may be conditioned to have comparatively lower concentrations of oxygen and comparatively higher concentrations of carbon dioxide. In some embodiments, gas treatment or mixing may not be necessary. For different organs, the requirements may also vary. For example, a standard gas mix may be suitable for perfusion of heart, liver and kidney, and a separate, unique gas mix may be provided for lung perfusion.

The heat exchanger 134, gas exchanger 136, and other components of the conditioning subsystem 102 may communicate with the controller 110, through either wired or wireless communication. The controller 110 may control, possibly through feedback control using information from selected sensors such as temperature sensors, the conditioning of the perfusate. The location of the heat exchanger 134 and the gas exchanger 136 depicted in FIG. 2 should not be understood as limiting, as alternative positions in the apparatus may be suitable in different embodiments. Moreover, multiple heat exchangers and gas exchangers may be used in the apparatus 1000. The heat exchanger 134 and the gas exchanger 136 may be combined in a single device. For instance, the Affinity NT™ oxygenation system available from Medtronic modulates the temperature and the gas composition of a perfusate.

The control subsystem 101, as specifically embodied in the base unit 1002 depicted in FIG. 2, includes a controller 110 in communication, either by wired or wireless connection, with the following components: flow sensors 144, 174, 182, and 194; pressure sensors 147, 177, 186, and 193; and valve 172. As can be appreciated, a valve may include or be replaced by a clamp. The controller 110 depicted in FIG. 2 also communicates with components of the fluid subsystem 100, including the centrifugal pumps 130 and 160, and components of the conditioning subsystem 102, including a heat exchanger 134 and a gas exchanger 136. The controller 110 depicted in FIG. 2 may also communicate with components of the perfusion module 112, such as organ-specific devices that monitor or control the organ (not shown in FIG. 2, but see other figures). More specifically, controller 110 controls the pump speeds of the pumps 130 and 160, as well as the occlusion of a passage between two conduits by the valve (or clamp) 172, in response to information provided by the flow sensors 144, 174, 182, and 194 and information provided by the pressure sensors 147, 177, 186, and 193.

The pump 130 and 160 in base unit 1002 can each apply a fluid pressure to a perfusate in conduit 132 or 162 respectively. Such pressure can drive flow of the perfusate, or provide resistance to the flow as retrograde flow through a centrifugal pump is possible. Suitable, commercially-available centrifugal pumps may include ROTAFLOW™ pumps, which are available from Maquet Getinge Group;

BIO-PUMP™ pumps, which are available from Medtronic; and RevOlution 5™ pumps, which are available from Sorin Group.

The pressure sensors 147, 177, 186, and 193 in base unit 1002 can detect pressures in the interior of the respective conduit via the respective pressure port 146, 176, 184, and 192 respectively. The pressure ports form junctions between conduits through which perfusate can pass. The pressure ports also include a channel into which a pressure sensor can be inserted.

The flow sensors 144, 174, 182, and 194 in base unit 1002 may be attached to the exterior of the respective conduit. Suitable, commercially-available flow sensors may include a TX40 or TX50 Bio-Probe™ Flow Transducer, which is available from Medtronic, and PXL series flow probes, which are available from Transonic Systems.

The valve or clamp 172 connecting two conduits can control or regulate the flow of perfusate between the two conduits by occluding a passage between the conduits.

The valve or clamp 172 may be a servo-actuated partial occlusion clamp with variable clamping positions that enable regulation of flow. Examples of suitable valves or clamps may include an electrical remote-controlled tubing clamp available from Sorin Group, an electrical venous occluder available from Sorin Group or a venous line clamp.

The fluid subsystem 100 may include three sections of conduits and associated components, as depicted in FIG. 2. Many of the associated components communicate with the controller 110 as indicated by dotted lines in FIG. 2.

The first section of fluid subsystem 100 connects to the reservoir 120 via a conduit 122. The conduit 122 is connected to the centrifugal pump 130. The centrifugal pump 130 is connected to the heat exchanger 134 and the gas exchanger 136 via conduit 132. The gas exchanger 136 connects to a Y-connector 140 via conduit 138. One branch of the Y-connector 140 connects to a purge line 150.

The purge line 150, which may also be referred to herein as a bypass line, connects to the reservoir 120. Purge line 150 can be used to remove air from conduits in the fluid subsystem 100. For example, for pursing a heart or another organ, it may be important to remove air pockets or air bubbles from the perfusate stream before the perfusate is supplied to the heart. While not specifically shown, a bypass or purge line may be provided for each one of the arteries that are cannulated in each organ to allow easier de-airing of the fluid subsystem at the startup phase of perfusion, or for handling air entrained in the fluid circuit. While not specifically depicted in FIG. 2, it can be appreciated that a top portion of purge line 150 can be raised to be higher than the upstream conduit connected thereto, so that an air bubble or pocket in the conduit can rise to the top portion of the purge line 150 and be removed through the purge line 150, to prevent the air from entering the arterial system of the organ.

The other branch of the Y-connector 140 connects to conduit 142. Flow sensor 144 is attached to the conduit 142. The conduit 142 is connected to a pressure port 146, which is associated with a pressure sensor 147. The pressure port 146 is also connected to a conduit 148. When the base unit 1002 is not coupled with a perfusion module 112, the conduit 148 is not connected on one end, and a cap may be inserted into the free end of the conduit 148, in a manner that is known to the skilled person, for instance to stop leakage from or maintain sterility of the fluid subsystem 100.

The second section of the fluid subsystem 100 includes a conduit 124 that connects the reservoir 120 to the centrifugal pump 160. The centrifugal pump 160 is connected to a Y-connector 164 via a conduit 162. One branch from the Y-connector 164 is a conduit 170, to which is attached a valve or clamp 172 and a flow sensor 174. The conduit 170 connects to pressure port 176, which is associated with a pressure sensor 177. Pressure port 176 also connects with a conduit 178. The other branch from the Y-connector 164 connects to a conduit 180, to which a flow sensor 182 is attached. The conduit 180 connects to a pressure port 184, which is associated with a pressure sensor 186. The pressure port 184 also connects with a conduit 188.

The third section of the fluid subsystem 100 has a conduit 190 that connects to a pressure port 192, which is associated with a pressure sensor 193. The pressure port 192 connects to a conduit 196, to which is attached a flow sensor 194. The conduit 196 also connects to the reservoir 120. The third section of the fluid subsystem 100 may optionally contain a third centrifugal pump (not shown) which can provide back pressure to a blood vessel connected to conduit 190.

When the base unit 1002 is not coupled with an organ-specific perfusion module 112, the terminal conduits 148, 178, 188, and 190 are not connected on one end, and a cap or stopper (not shown in FIG. 2) may be inserted into the free end of the conduits, in a manner that is known to persons of skill in the art, for instance to stop leakage from or maintain sterility of the fluid subsystem 100. The base unit 1002 may include additional components, including bubble detectors, leukocyte filters, additional flow sensors, additional pressure sensors, additional heat exchangers, additional gas exchangers, and additional pumps.

As would be understood by persons of skill in the art, some of the conduits in the fluid subsystem 100 can be isolated from the perfusate in other conduits of the fluid subsystem 100 through the addition of valves, clamps, or stoppers at appropriate locations (not shown). As one example, when the base unit 1002 is coupled with a particular organ-specific perfusion module 112, the third section of the fluid subsystem 100, as described, may not be necessary and so can be isolated by placing a cap, stopper or the like (not shown) in the free end of conduit 190 and by placing a clamp or the like (not shown) on conduit 196. Similarly, when the base unit 1002 is coupled with a particular organ-specific perfusion module 112, the purge line 150 can be isolated from flows of perfusate through the Y-connector 140 by placing a clamp (not shown) or the like on the purge line 150.

Alternatively, in different embodiments, some of the organ-specific conduits of the fluid subsystem 100 may be provided on a corresponding organ-specific perfusion module 112, instead of on the base unit 1002.

As would be understood by persons of skill in the art, in order to prevent siphoning of perfusate into the reservoir, an additional chamber (not shown) can be added to one or more of the conduit 190, the conduit 196, the drainage conduit 114, and the purge line 150. An example of said additional chamber is a soft shell reservoir, such as the CVR 1200 or BMR 1900 available from Sorin Group or the VRB 1200 from Maquet Getinge Group.

Prior to coupling the base unit 1002 to an organ-specific perfusion module 112, the fluid subsystem 100 may be primed with a fluid, such as a saline or a perfusate, so as to remove air from the conduits prior to coupling with the perfusion module.

Figure 6B:
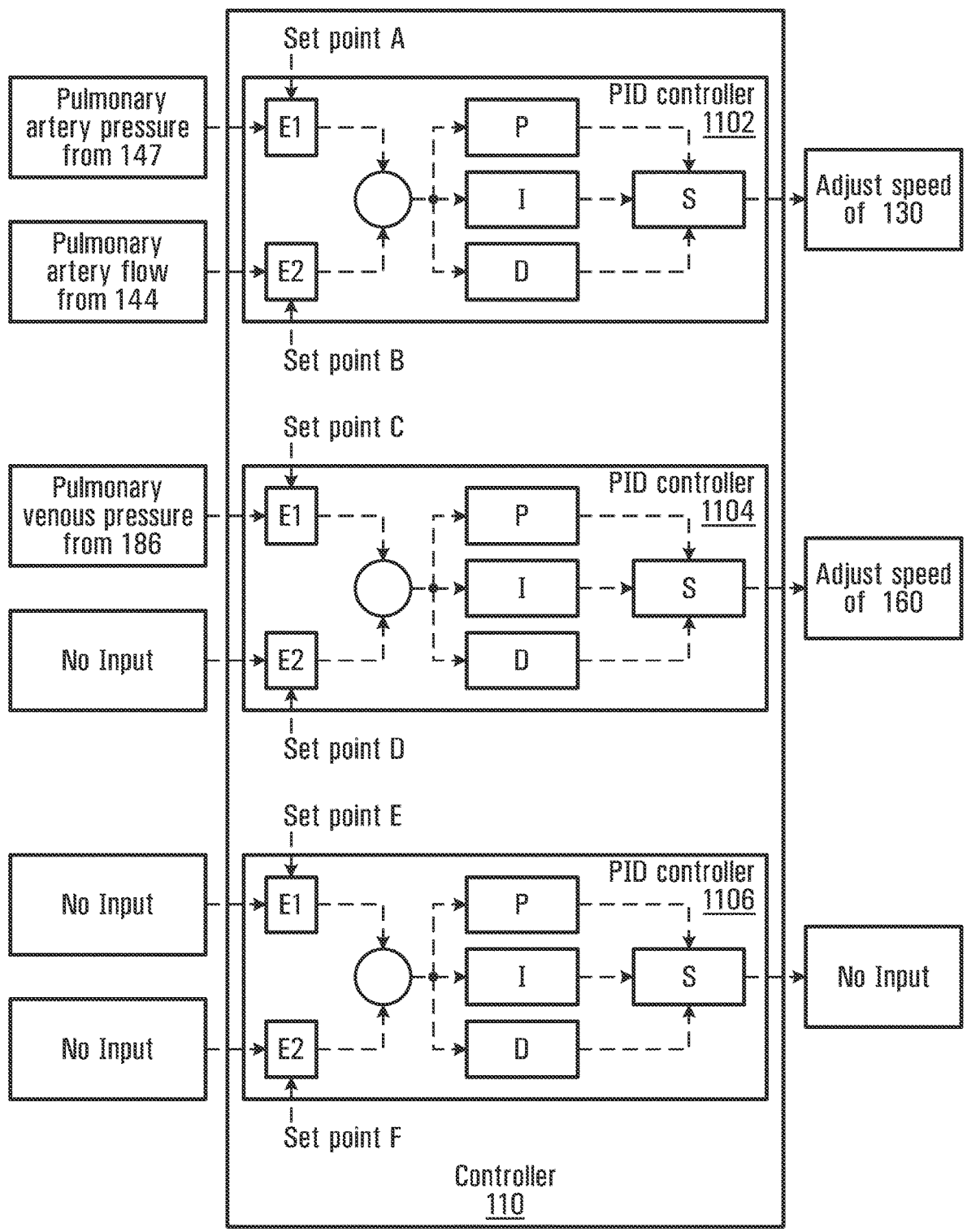
FIG. 6B is a schematic diagram illustrating feedback control of components of the apparatus of FIG. 6A.
Figure 7A:
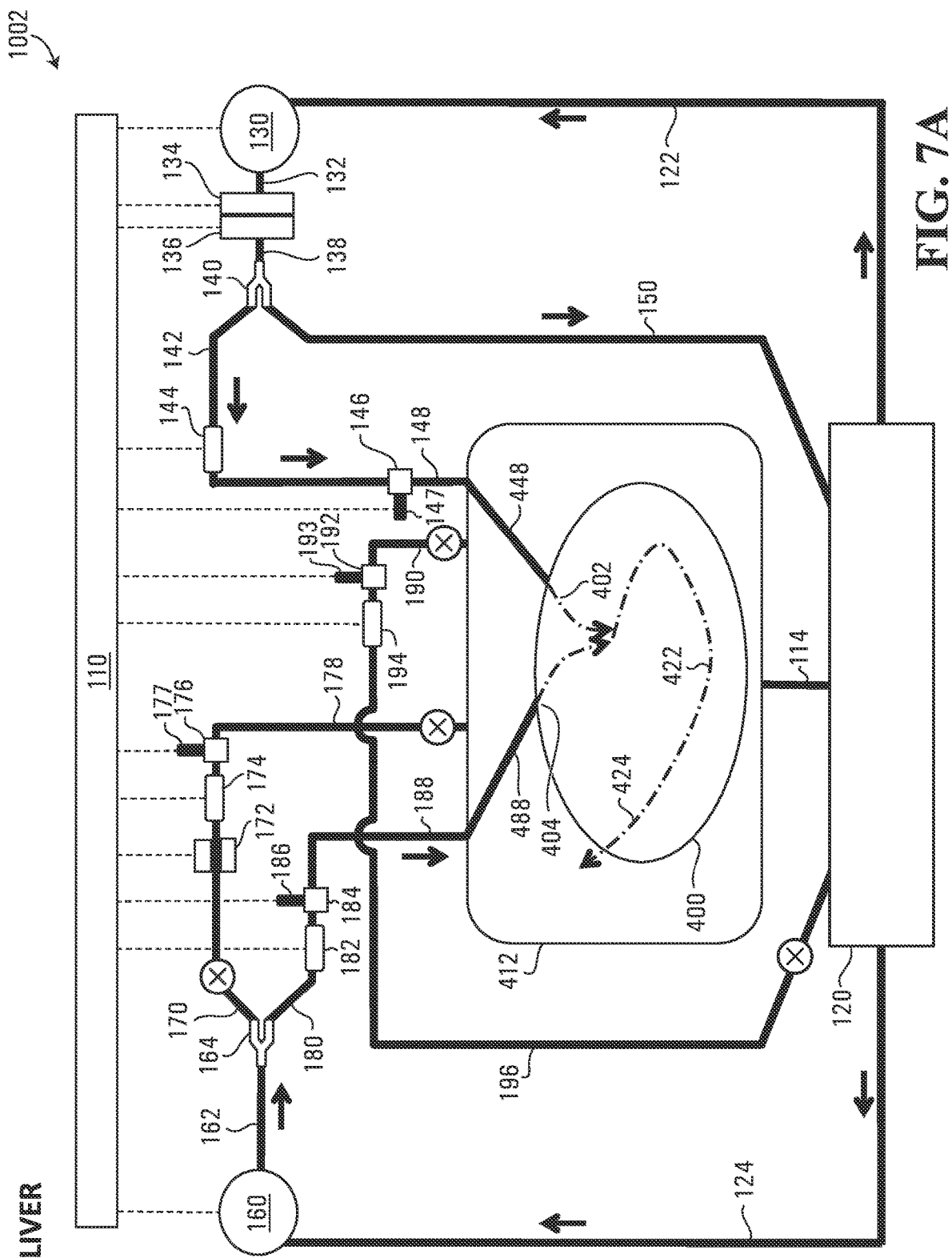
FIG. 7A is a schematic diagram of an embodiment of the apparatus of FIG. 1, with a liver-specific module coupled to the base unit of FIG. 2.
Figure 7B:
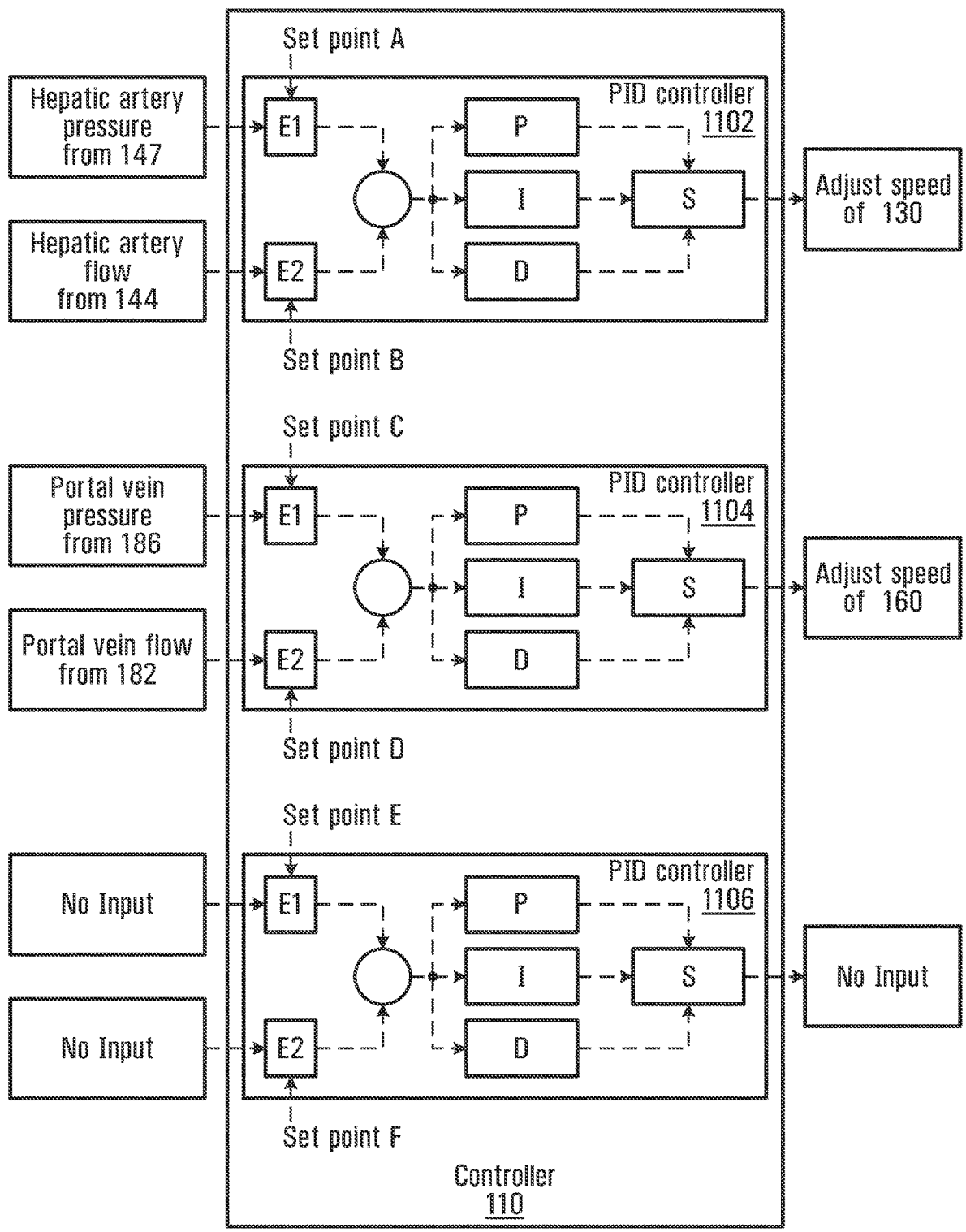
FIG. 7B is a schematic diagram illustrating feedback control of components of the apparatus of FIG. 7A.
Figure 8A:
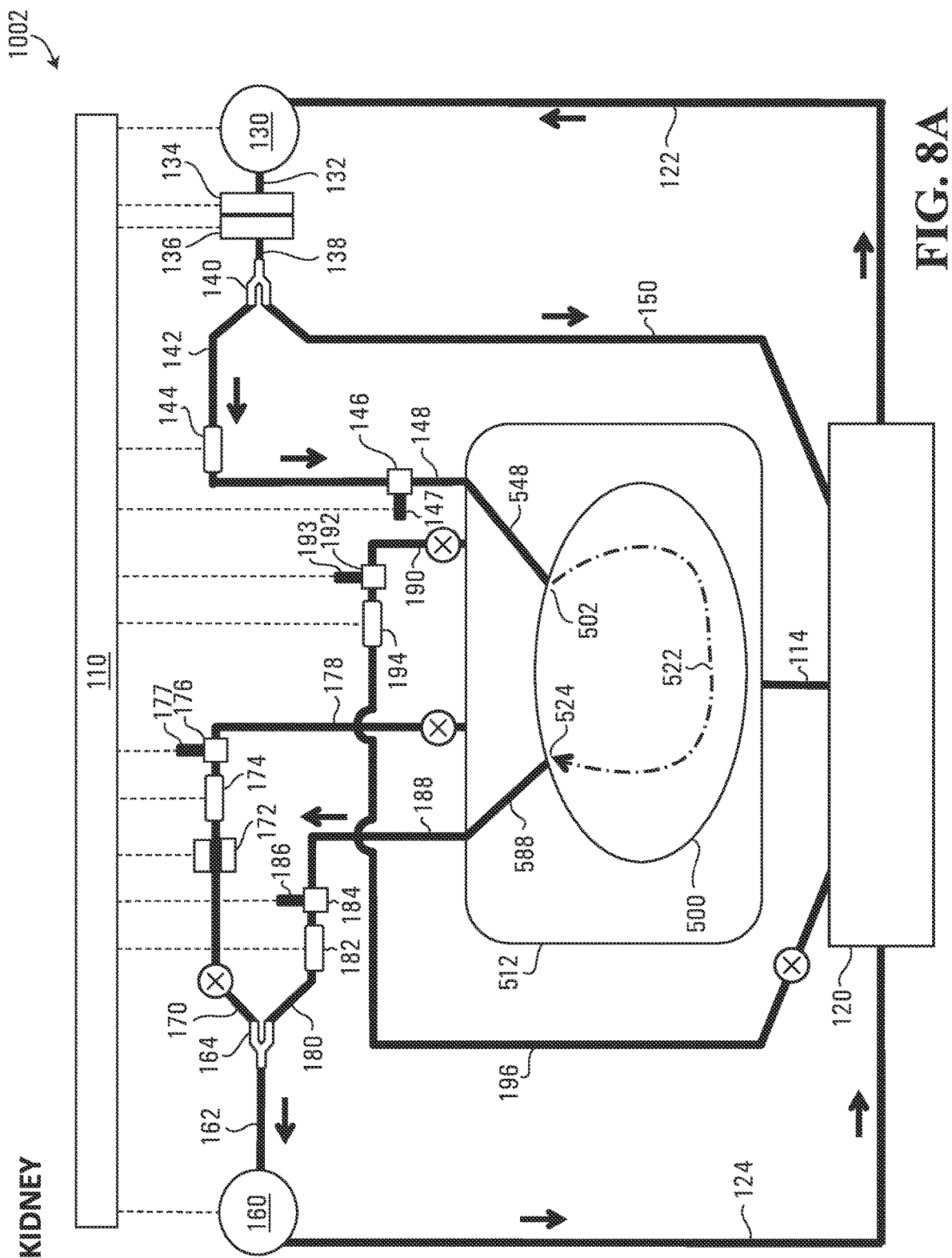
FIG. 8A is a schematic diagram of an embodiment of the apparatus of FIG. 1, with a kidney-specific module coupled to the base unit of FIG. 2.
Figure 8B:
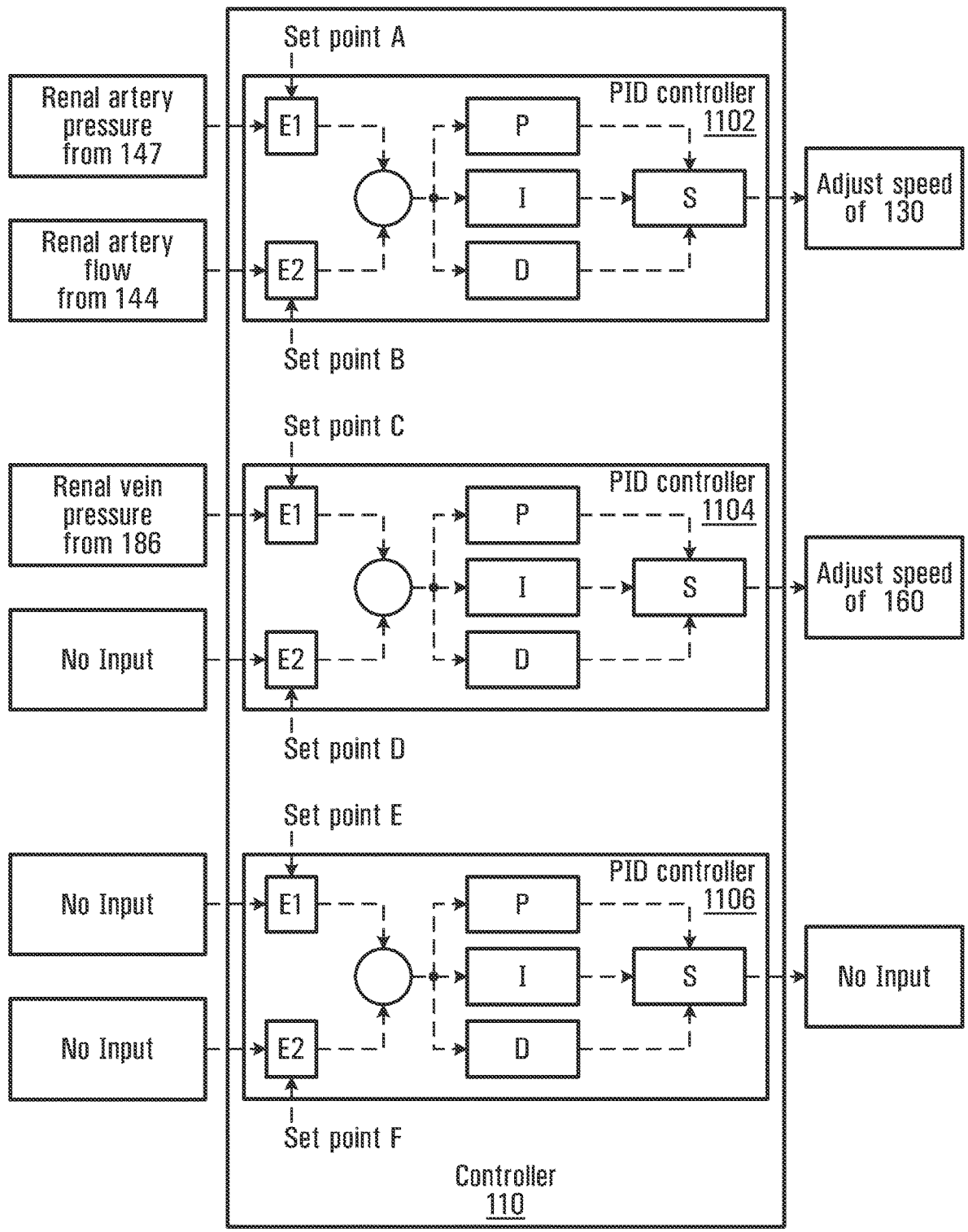
FIG. 8B is a schematic diagram illustrating feedback control of components of the apparatus of FIG. 8A.

FIGS. 3 to 8B illustrate different configurations of apparatus 1000 where the base unit 1002, as illustrated in FIG. 2 and described above, is coupled to different organ-specific perfusion modules for heart 200 (FIGS. 3-5B), lung 300 (FIG. 6A-6B), liver 400 (FIG. 7A-7B), or kidney 500 (FIG. 8A-8B). In each specific configuration shown in FIGS.

3-8B, the same base unit 1002 is used, but a different organ-specific module 112 is coupled to the base unit 1002, including through connection of one or more of conduits 148, 178, 188, and 190 to a vein or artery of the organ, which connection may be made by a different type of conduit such as a cannula. In addition, controller 110 controls the pump speeds of the centrifugal pumps 130 and 160, as well as the occlusion of a passage between two conduits by the valve or clamp 172, in response to organ-specific information in the memory of the controller or inputted by a user. The organ-specific information may include desired flows or pressures at specified points in the conduits of the fluid subsystem 100, which may be achieved or maintained by the controller 110 by way of feedback control using information provided by the flow sensors (144, 174, 182, 194) and the pressure sensors (147, 177, 186, and 193).

Figure 3:
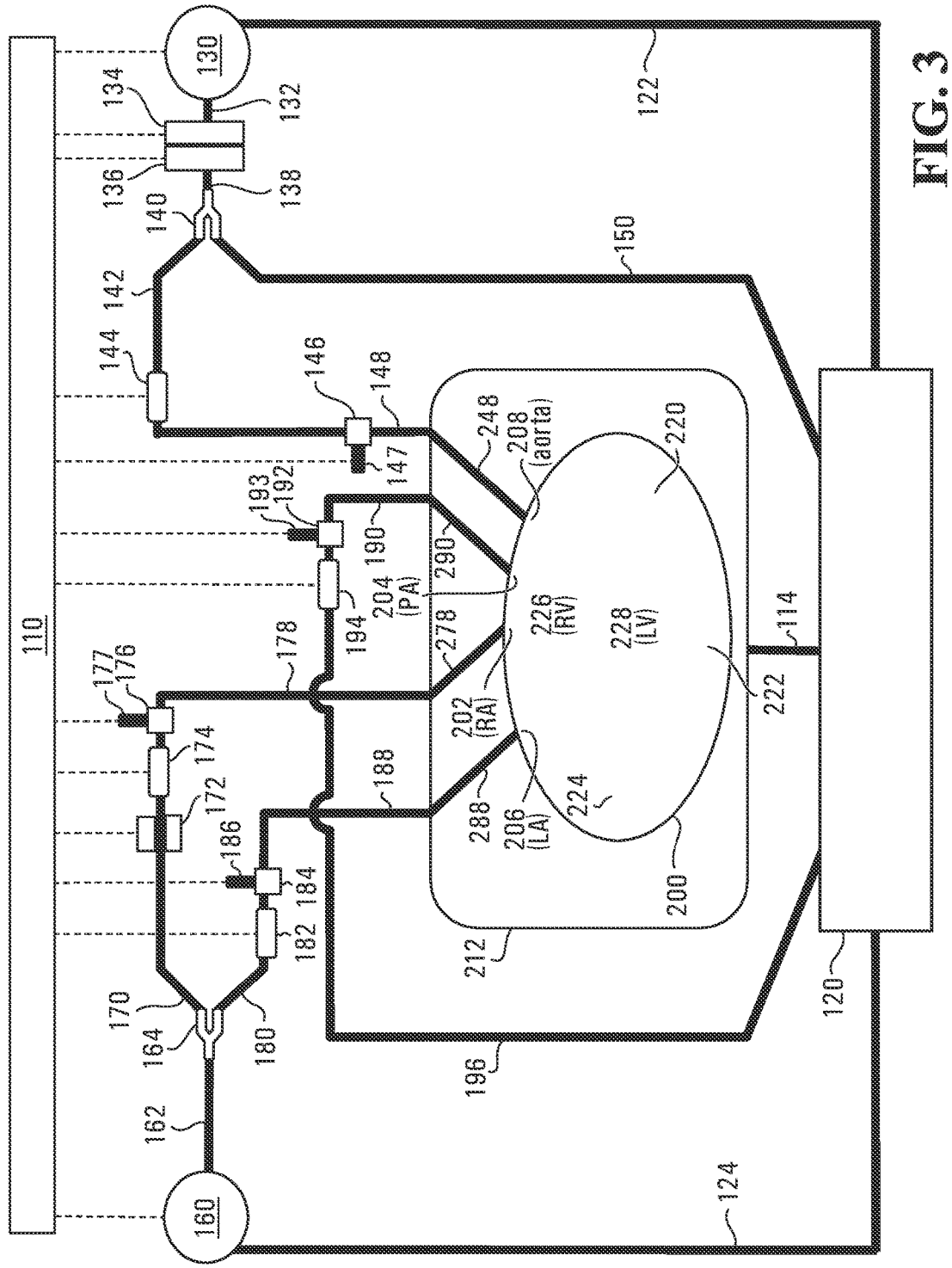
FIG. 3 is a schematic diagram of an embodiment of the apparatus of FIG. 1, with a heart-specific module coupled to the base unit of FIG. 2.

FIG. 3 illustrates a specific embodiment of an apparatus 1000 in which a base unit 1002 is attached to a heart-specific perfusion module 212, such as that of a human or a pig. Blood vessels extending from the heart are connected to a fluid subsystem 100. Heart-specific parameters, such as desired pressures or flow rates in particular locations of fluid subsystem 100, are inputted into the controller 110.

Prior to connection of the heart 200 to the fluid subsystem 100, the fluid subsystem 100 is primed with a perfusate and one end of a cannula is connected to each of the aorta 208, the pulmonary artery 204, the right atrium 202, and the left atrium 206 of the excised heart 200. Cannulae 248, 278, 288, and 290 of the heart-specific perfusion module 212 act as an interface between the heart 200 and the fluid subsystem 100 of the base unit 1002. A cannula 248 connects the aorta 208 to the free end of a conduit 148. A cannula 290 connects the pulmonary artery 204 to the free end of a conduit 190. A cannula 278 connects the right atrium 202 to the free end of a conduit 178. A cannula 288 connects the left atrium 206 to the free end of a conduit 188.

Once the heart 200 is connected to the fluid subsystem 100, perfusion can begin, so as to drive perfusate through the coronary arteries 220, into the capillaries of the heart 222, and then into the coronary veins 224 (perfusion is not illustrated on FIG. 3). A number of suitable perfusate solutions are known to those skilled in the art. Suitable perfusion solutions can include whole blood; whole blood with additional calcium, phosphate, or dextrose; modified Krebs solutions; STEEN solution; and the like. One perfusate can be replaced with another in a number of ways that would be known to persons of skill in the art, such as connecting the fluid subsystem 100 to a different reservoir 120 containing a different perfusate. Any perfusate that accumulates in the heart-specific perfusion module 212, such as perfusate that leaks from the attachment points of the heart's blood vessels to the cannulae, can be returned to the reservoir 120 through drainage conduit 114.

Figure 4:
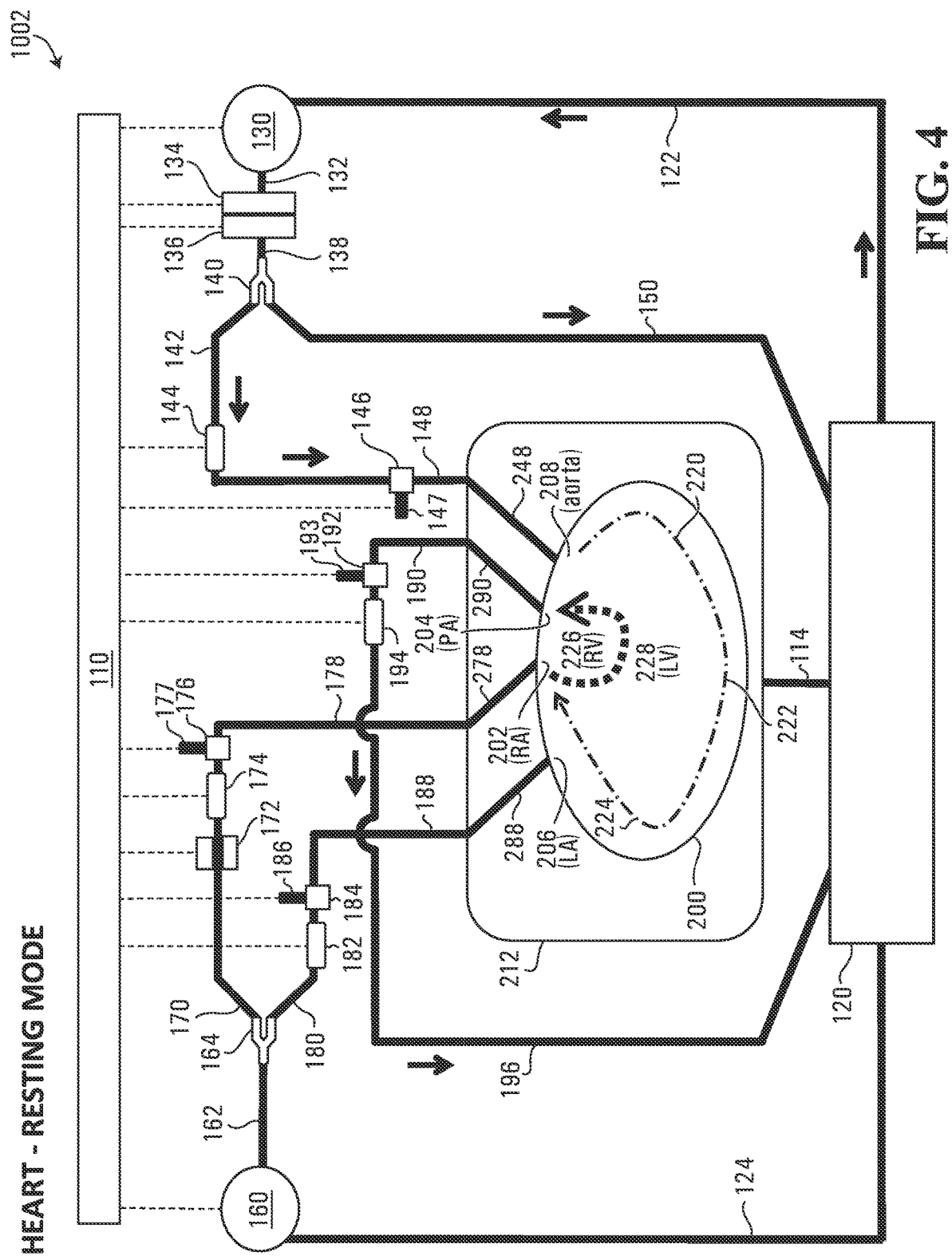
FIG. 4 is a schematic diagram illustrating operation of the apparatus of FIG. 3 in a resting mode.
Figure 5A:
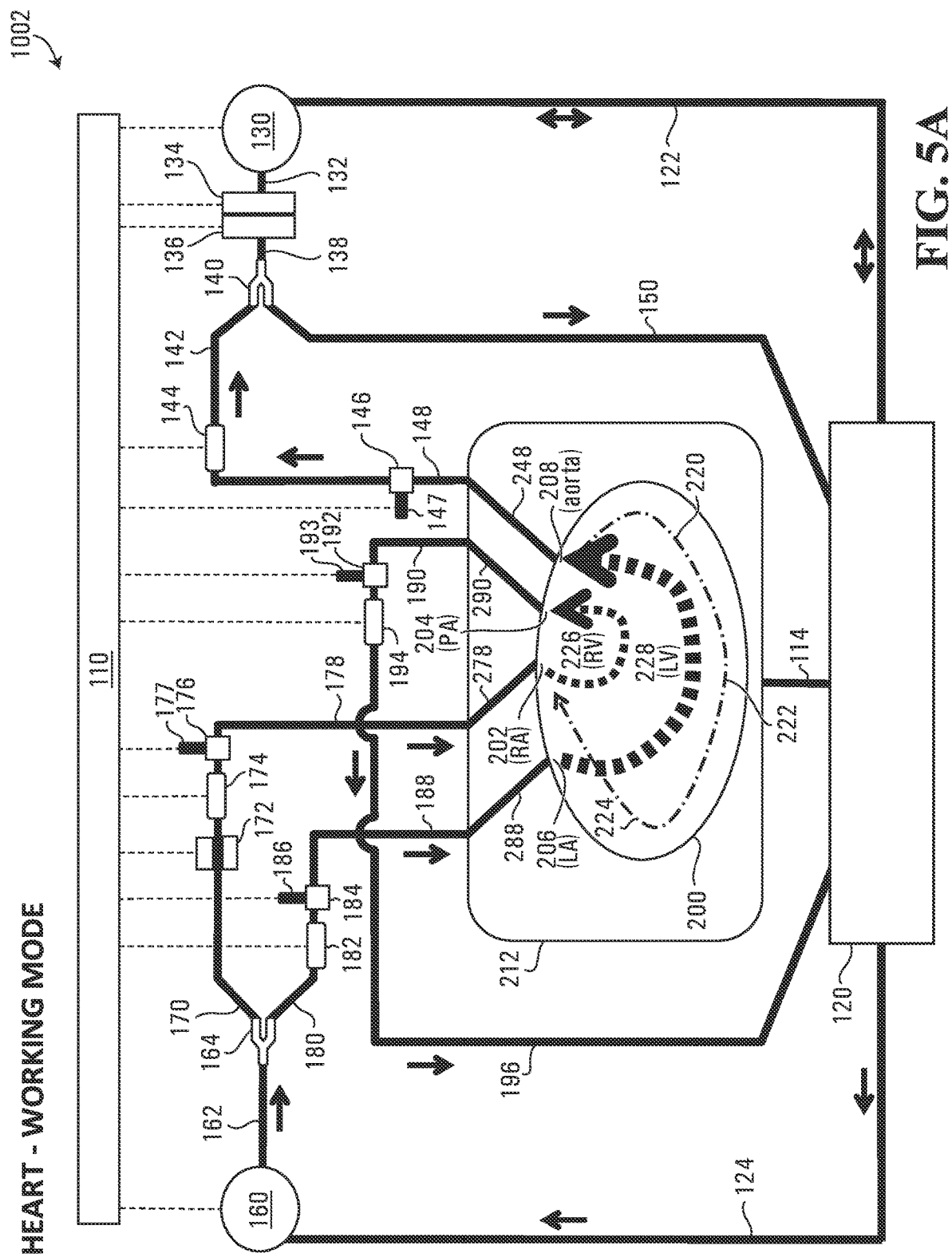
FIG. 5A is a schematic diagram illustrating operation of the apparatus of FIG. 3 in a working mode.

Once attached in this manner, the heart can be perfused in either resting mode, as illustrated in FIG. 4, or in working mode, as illustrated in FIG. 5A. The term "resting mode" refers to a method of perfusing a heart with a nutrient-rich oxygenated solution in a reverse fashion via the aorta. The backwards pressure causes the aortic valve to shut thereby forcing the solution into the coronary arteries. "Resting mode" is also known as the preservation mode or the Langendorff perfusion. The term "working mode" refers to coronary perfusion throughout a heart by ventricular filling via the left atrium and ejection from the left ventricle via the aorta driven by the heart's contractile function and regular cardiac rhythm. Arrows in FIG. 4 and FIG. 5A indicate the direction of flow of the perfusate in the conduit nearest to and parallel to the arrow.

In resting mode, as illustrated in FIG. 4, the first section of fluid subsystem 100 directs pressure into the aorta from centrifugal pump 130. As will be apparent to persons skilled in the art, suitable fluid pressure in the aorta 208 will lead to flow of conditioned perfusate from conduit 148 into the coronary arteries 220, which branch off from the aorta 208. If the pressure in the aorta is sufficient, perfusate will move through the coronary arteries 220 into capillary beds 222 inside the walls of the heart, thereby providing oxygen and nutrients to the heart muscle. Perfusate will then move from the capillary beds 222 into the coronary veins 224, moving carbon dioxide and wastes away from the heart muscle. The coronary veins 224 empty into the right atrium 202 of the heart 200, leading to a flow of perfusate from the right atrium 202, through the right ventricle 226, and into the pulmonary artery 204. In this manner, perfusate containing carbon dioxide and wastes is moved into the third section of fluid subsystem 100 and returned to the reservoir 120 via a conduit 196.

In working mode, as illustrated in FIG. 5A, the second section of fluid subsystem 100 supplies perfusate to the right atrium 202 and left atrium 206 via pumping from the centrifugal pump 160. The relative flow of perfusate delivered to each atrium is controllable through adjustment of valve or clamp 172. Perfusate pumped out of the right ventricle 226 and into the pulmonary artery 204 is collected by the third section of fluid subsystem 100 and returned to the reservoir 120 via conduit 196. Perfusate pumped out of the left ventricle 228 moves into the aorta 208. In working mode, the centrifugal pump 130 applies a back pressure on ejection of perfusate from the left ventricle. Controlling the speed of the centrifugal pump 130 can allow the resistance to left ventricular ejection to be controlled, which may allow for an assessment of the heart's contractile performance, as would be understood by persons of skill in the art, and as described in WO 2013/106908. In working mode, perfusate ejected from the left ventricle flows through the conduits 148 and 142 toward the Y-connector 140. At the Y-connector 140, the flow egressing from the conduit 142 will proceed into the reservoir 120, at least in part via the purge line 150, but also through the centrifugal pump 130 and the conduit 122, depending on the speed of the centrifugal pump 130. As in resting mode, sufficient pressure in the aorta 208 will lead to perfusion of the heart muscle through flow of conditioned perfusate into the coronary arteries 220. Further information in this regard is provided in WO 2013/106908.

Although not depicted in FIGS. 3, 4, and 5A, the base unit 1002 and the heart-specific perfusion module 212 may be configured to connect to, or include, one or more heart-specific devices (not shown), which may be used to monitor or control the activity or function of the heart. As one example, pacemaker connectors, ECG electrodes and defibrillation pads may be built into heart-specific module 212, thereby allowing continuous monitoring and correction of dysrhythmias through delivery of pacing or DC shocks as required.

The controller 110 may be configured using different heart-specific parameter settings, which may be entered by a user using a user interface such as a graphical user interface (GUI), or may be loaded from a configuration file stored in a computer memory. The target values of one or more specific parameters may be achieved or maintained by adjusting the speeds of the centrifugal pumps 130 and 160, the extent of occlusion by the valve or clamp 172, or settings on heart-specific devices being used to monitor or control the activity of the heart.

The controller 110 may comprise one or more proportional-integral-derivative (PID) controllers, which mediate feedback control of components in the fluid subsystem 100. As will be known to persons skilled in the art, a PID controller continuously calculates an error value as the difference between a desired setpoint and a measured variable. The PID controller attempts to minimize the error value or a composite of multiple error values over time by adjustment of a control variable.

In a specific embodiment, the controller 110 comprises three PID controllers 1102, 1104, and 1106. Each of the PID controllers can calculate an error rate ("E1") for one pressure input and another error rate ("E2") for one flow input. The setpoint values may be entered by a user or stored in a memory of the controller 110. The two error values are transformed into a single error value through a suitable mathematical operation that would be known to persons skilled in the art. Said mathematical operation can be different for each of the three PID controllers, can be loaded on startup from a configuration file stored in a computer memory or from data entered by a user, and can be adjusted by either software or by a user during perfusion of an organ. The composite error is subjected to a PID calculation so as to generate an adjustment of a component of the fluid subsystem 100.

Figure 5B:
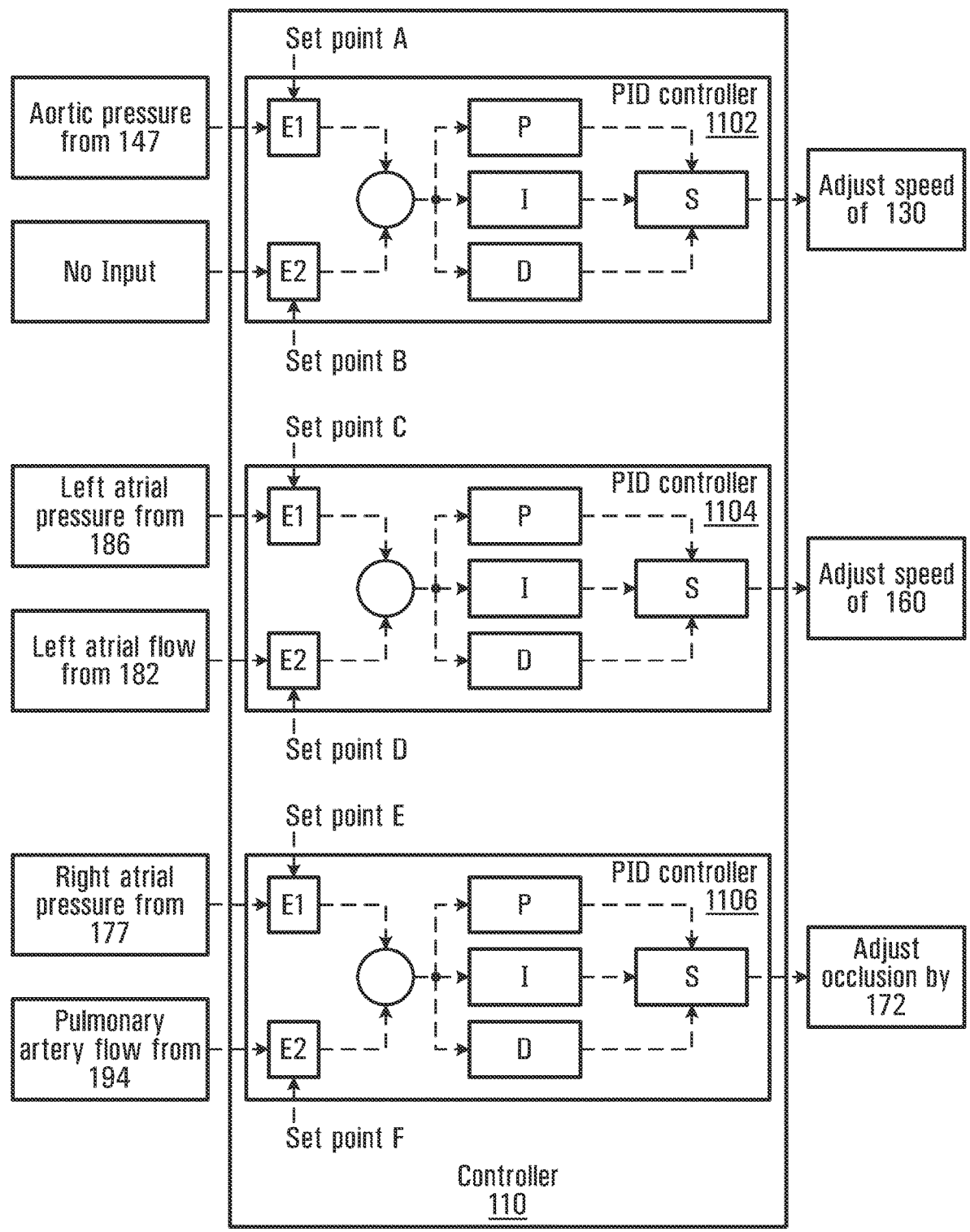
FIG. 5B is a schematic diagram illustrating feedback control of components of the apparatus of FIG. 5A.

Feedback control in a specific embodiment of the base unit 1002 coupled with a heart-specific perfusion module 212 in working mode is illustrated in FIG. 5B. The PID controller 1102 receives a measurement for aortic pressure from a pressure sensor 147, calculates an error value relative to a setpoint A, and then calculates a speed adjustment of a centrifugal pump 130. The PID controller 1102 receives no flow input. The PID controller 1104 receives a measurement for left atrial pressure from a pressure sensor 186 and calculates an error value relative to setpoint C. The PID controller 1104 also receives a measurement of left atrial flow from a flow sensor 182, and calculates an error value relative to setpoint D. The two error values are translated into a single error value through a suitable mathematical operation, and an adjustment of the speed of a centrifugal pump 160 is calculated. A PID controller 1106 receives a measurement for right atrial pressure from a pressure sensor 177 and calculates an error value relative to setpoint E. The PID controller 1106 also receives a measurement for pulmonary artery flow from a flow sensor 194 and calculates an error value relative to setpoint F. The two error values are translated into a single error value through a suitable mathematical operation, and an adjustment of a partial occlusion clamp 172 is calculated. Table 1 provides typical values, as well as a typical range of values, for the setpoint inputs A, B, C, D, E, and F with respect to a heart-specific perfusion module.

TABLE 1

Example Setpoints for Feedback Control of Heart Perfusion in Working Mode

| Setpoint in FIG. 5B | Parameter | Typical value for setpoint (range) |
| --- | --- | --- |
| A | aortic pressure (mmHg) | 40 (30-180) |
| B | no input | |

TABLE 1-continued

Example Setpoints for Feedback Control of Heart Perfusion in Working Mode

| Setpoint in FIG. 5B | Parameter | Typical value for setpoint (range) |
| --- | --- | --- |
| C | left atrial pressure (mmHg) | 6 (4-20) |
| D | left atrial flow (mL/min) | 2000 (0-5000) |
| E | right atrial pressure (mmHg) | 6 (4-20) |
| F | pulmonary artery flow (ml/min) | 200 (0-5000) |

FIG. 6A illustrates a specific embodiment of an apparatus 1000 in which a base unit 1002 is attached to a lung-specific perfusion module 312 bearing a lung 300. The lung may be a human lung or a pig lung. It should be understood that a lung may refer to a single lung, a pair of lungs, or a portion of a lung such as a lobe of a lung. The lung may include an excised portion of the left atrium of the heart that contains the connection points of one or more pulmonary veins with the left atrium.

Prior to connection of the lung 300 to the fluid subsystem 100, the fluid subsystem 100 is primed with a perfusate; one end of a cannula is connected to one or more pulmonary arteries 302; and one end of a cannula is connected to one or more pulmonary veins (not shown), for instance through attachment of the cannula to the excised left atrium 304 of the heart. Cannulae 348 and 388 of the lung-specific perfusion module 312 act as an interface between the lung 300 and the fluid subsystem 100 of the base unit 1002. Cannula 348 connects the pulmonary artery 302 with the free end of a conduit 148. Cannula 388 connects the left atrium 304 of the heart with the free end of a conduit 188.

In FIGS. 6A, 7A, and 8A, the conduits 170, 178, 190, and 196 are closed as indicated by the "X" markings, such as by valves or clamps. Alternatively, these conduits and the components on these conduits between the cross-marks (172, 174, 176, 177, 192, 193, 194) may be detached from a base unit or omitted on a base unit.

When a lung is attached in this manner to the fluid subsystem 100, centrifugal pump 130 can apply pressure to the fluid in conduit 148 and thereby drive flow into the pulmonary artery 302. The perfusate entering the pulmonary artery 302 may have been conditioned by passage through one or more of a heat exchanger 134, so as to warm the perfusate to between 20° C. and 39° C., and a gas exchanger 136, so as to deoxygenate the perfusate. As would be apparent to persons skilled in the art, with sufficient pressure, perfusate will flow from the pulmonary artery 302 into the capillary beds 322 of the lung, and from there flow into one or more of the pulmonary veins 324 which drain into the left atrium 304 of the heart. Centrifugal pump 160 can elevate pressure in the left atrium to a physiologic level by pumping against the flow out of the left atrium 304. When centrifugal pumps 130 and 160 are at particular settings, flow proceeds from the excised left atrium 304, into a conduit 188, and from there is returned to the reservoir 120 by passage through the centrifugal pump 160 in a direction that is against the direction of pumping in the centrifugal pump 160 (see arrows in FIG. 6A depicting direction of flow of perfusate in conduits nearest to and parallel to each arrow). Such an arrangement can conveniently eliminate the siphon effect in embodiments where a reservoir (source) of the perfusate is located below the lung, as can be understood by those skilled in the art.

Although not depicted in FIG. 6A, base unit 1002 coupled with a lung-specific perfusion module 312 is compatible with additional lung-specific control devices being used to monitor or control the activity of the lung 300. For instance, the trachea of the lung can be attached to a ventilator or other means can be employed to move air in and out of the lungs.

The controller 110 may have lung-specific parameter settings, inputted into it by either software or by a user, that are to be achieved or maintained by adjusting the speed of the centrifugal pumps 130 and 160, or settings on lung-specific devices being used to monitor or control the activity of the lung.

Feedback control in a specific embodiment of the base unit 1002 coupled with a lung-specific perfusion module 312 is illustrated in FIG. 6B. The PID controller 1102 receives a measurement for pulmonary artery pressure from a pressure sensor 147 and calculates an error value relative to a setpoint A. The PID controller 1102 also receives a measurement for pulmonary artery flow from a flow sensor 144 and calculates an error value relative to a setpoint B. The two error values are translated into a single error value through a suitable mathematical operation, and an adjustment of the speed of a centrifugal pump 130 is calculated. The PID controller 1104 receives a measurement for pulmonary venous pressure from a pressure sensor 186, calculates an error value relative to setpoint C, and then calculates an adjustment of the speed of a centrifugal pump 160. No flow input is received by the PID controller 1104. The PID controller 1106 receives no inputs and generates no outputs. Table 2 provides typical values, as well as a typical range of values, for the setpoint inputs A, B, C, D, E, and F with respect to a lung-specific perfusion module.

TABLE 2

Example Setpoints for Feedback Control of Lung Perfusion

| Setpoint in FIG. 6B | Parameter | Typical value for setpoint (range) |
|---|---|---|
| A | pulmonary artery pressure (mmHg) | 10 (5-30) |
| B | pulmonary artery flow (mL/min) | 1000 (200-5000) |
| C | pulmonary venous pressure (mmHg) | 2 (0-10) |
| D | no input | |
| E | no input | |
| F | no input | |

FIG. 7A illustrates a specific embodiment of an apparatus 1000 in which a base unit 1002 is attached to a liver-specific perfusion module 412 bearing a liver 400. The liver may be a whole liver or a portion of a liver, such as a liver lobe.

Prior to connection of the liver 400 to the fluid subsystem 100, the fluid subsystem 100 is primed with a perfusate and one end of a cannula is connected to each of the hepatic artery 402 and the portal vein 404. Cannulae 448 and 488 of the liver-specific perfusion module 412 act as an interface between the liver 400 and the fluid subsystem 100 of the base unit 1002. Cannula 448 connects the hepatic artery 402 with the free end of a conduit 148. Cannula 488 connects the portal vein 404 with the free end of a conduit 188.

The first section of the fluid subsystem 100 can direct fluid pressure and flow of conditioned perfusate from the centrifugal pump 130 into the hepatic artery 402. The second section of the fluid subsystem 100 can direct fluid pressure and flow of the perfusate from centrifugal pump 160 into the portal vein 404. The pressure applied to and the flow rate into the hepatic artery 402 and the portal vein 404 can be different. As would be apparent to the skilled person, if sufficient pressures are applied, perfusate will flow through the hepatic artery and portal vein respectively and into the capillary beds 422 that provide oxygen and nutrients to the liver. Perfusate can then carry carbon dioxide and wastes from the capillary beds 422 into the hepatic veins 424. Perfusate emerging from the hepatic veins into the liver-specific perfusion module 412 can be returned to the reservoir 120 through drainage conduit 114.

Although not depicted in FIG. 7A, the base unit 1002 attached to a liver-specific perfusion module 412 is compatible with organ-specific control devices that can be used to control or monitor the activity of the liver. For instance, bile output can be measured and collected with a bile collector.

The controller 110 may have liver-specific parameter settings, inputted into it by either software or by a user, that are to be achieved or maintained by adjusting the speed of the centrifugal pumps 130 and 160, or settings on liver-specific devices being used to monitor or control the activity of the liver.

Feedback control in a specific embodiment of the base unit 1002 coupled with a liver-specific perfusion module 412 is illustrated in FIG. 7B. The PID controller 1102 receives a measurement for hepatic artery pressure from a pressure sensor 147 and calculates an error value relative to a setpoint A. The PID controller 1102 also receives a measurement for hepatic artery flow from a flow sensor 144 and calculates an error value relative to a setpoint B. The two error values are translated into a single error value through a suitable mathematical operation, and an adjustment of the speed of a centrifugal pump 130 is calculated. The PID controller 1104 receives a measurement for portal vein pressure from a pressure sensor 186, and calculates an error value relative to setpoint C. The PID controller 1104 also receives a measurement for portal vein flow from a flow sensor 182, and calculates an error value relative to setpoint D. The two error values are translated into a single error value through a suitable mathematical operation, and an adjustment of the speed of a centrifugal pump 160 is calculated. The PID controller 1106 receives no inputs and generates no outputs. Table 3 provides typical values, as well as a typical range of values, for the setpoint inputs A, B, C, D, E, and F with respect to a liver-specific perfusion module.

TABLE 3

Example Setpoints for Feedback Control of Liver Perfusion

| Setpoint in FIG. 7B | Parameter | Typical value for setpoint (range) |
|---|---|---|
| A | hepatic artery pressure (mmHg) | 60 (40-80) |
| B | hepatic artery flow (mL/min) | 400 (100-1000) |
| C | portal vein pressure (mmHg) | 2 (1-10) |
| D | portal vein flow (mL/min) | 1000 (200-2000) |
| E | no input | |
| F | no input | |

FIG. 8 illustrates a specific embodiment of an apparatus 1000 in which a base unit 1002 is attached to a kidney-specific perfusion module 512 bearing a kidney 500. The kidney may refer to a single kidney or to both kidneys of a human, or of an animal such as a pig.

Prior to connection of the kidney 500 to the fluid subsystem 100, the fluid subsystem 100 is primed with a perfusate and one end of a cannula is connected to each of the renal artery 502 and the renal vein 524. Cannulae 548 and 588 of the kidney-specific perfusion module 512 act as an interface between the kidney 500 and the fluid subsystem 100 of the base unit 1002. Cannula 548 connects the renal artery 502 with the free end of a conduit 148. Cannula 588 connects the renal vein 524 with the free end of a conduit 188.

The first section of the fluid subsystem 100 can direct fluid pressure and flow of conditioned perfusate from centrifugal pump 130 into the renal artery 502. As would be apparent to the skilled person, if sufficient pressure is directed into renal artery 502, conditioned perfusate will flow into the capillary beds 522 that provide oxygen and nutrients to the cells of the kidney. Perfusate can then carry carbon dioxide and wastes from the capillary beds 522 into the renal vein 524. Centrifugal pump 160 can elevate pressure in the renal vein 524 by pumping against the flow out of the renal vein 524. When centrifugal pumps 130 and 160 are at particular settings, flow proceeds from the renal vein 524, into a conduit 188, and from there is returned to the reservoir 120 by passage through the centrifugal pump 160 in a direction that is opposite to that of the pumping by the centrifugal pump 160 (see arrows in FIG. 8 depicting direction of flow of perfusate in conduits nearest to and parallel to each arrow).

Although not depicted in FIG. 8, the base unit 1002 attached to a kidney-specific perfusion module 512 is compatible with organ-specific control devices that can be used to control or monitor the activity of the kidney. For instance, urine output can be measured and collected with a urine collector.

The controller 110 may have kidney-specific parameter settings, inputted into it by either software or by a user, that are to be achieved or maintained by adjusting the speed of the centrifugal pumps 130 and 160, the extent of occlusion by the valve or clamp 172, or settings on kidney-specific devices being used to monitor or control the activity of the kidney.

Feedback control in a specific embodiment of the base unit 1002 coupled with a kidney-specific perfusion module 512 is illustrated in FIG. 8B. The PID controller 1102 receives a measurement for renal artery pressure from a pressure sensor 147 and calculates an error value relative to a setpoint A. The PID controller 1102 also receives a measurement for renal artery flow from a flow sensor 144 and calculates an error value relative to a setpoint B. The two error values are translated into a single error value through a suitable mathematical operation, and an adjustment of the speed of a centrifugal pump 130 is calculated. The PID controller 1104 receives a measurement for renal vein pressure from a pressure sensor 186, calculates an error value relative to setpoint C, and then calculates an adjustment to the speed of a centrifugal pump 160. The PID controller 1104 receives no flow input. The PID controller 1106 receives no inputs and generates no outputs. Table 4 provides typical values, as well as a typical range of values, for the setpoint inputs A, B, C, D, E, and F with respect to a kidney-specific perfusion module.

TABLE 4

Example Setpoints for Feedback Control of Kidney Perfusion

| Setpoint in FIG. 8B | Parameter | Typical value for setpoint (range) |
| --- | --- | --- |
| A | renal artery pressure (mmHg) | 60 (40-80) |
| B | renal artery flow (mL/min) | 150 (50-500) |
| C | renal vein pressure (mmHg) | 2 (0-10) |
| D | no input | |
| E | no input | |
| F | no input | |

As indicated in FIGS. 2-8, many components of fluid subsystem 100 can communicate with controller 110, by wire or through wireless connection. The embodiments of the controller 110 depicted in FIGS. 5B, 6B, 7B, and 8B are examples of how sensors in the fluid system 100 can be used to control other components in the fluid subsystem 100. It will be apparent to persons of skill that other components inside or outside the fluid subsystem 100 can similarly be subject to feedback control by a controller 110, at least in part, by information collected from sensors in the fluid subsystem 100, the perfusate source 120, the conditioning subsystem 102, and/or the organ-specific perfusion module 112. As a further example of such feedback control, the temperature of the perfusate in the perfusate source 120 may be controlled by measuring the temperature of an organ in an organ-specific perfusion module 112 and adjusting the current through an electrical heater (not shown) submerged in perfusate in the perfusate source 120.

Figure 9:
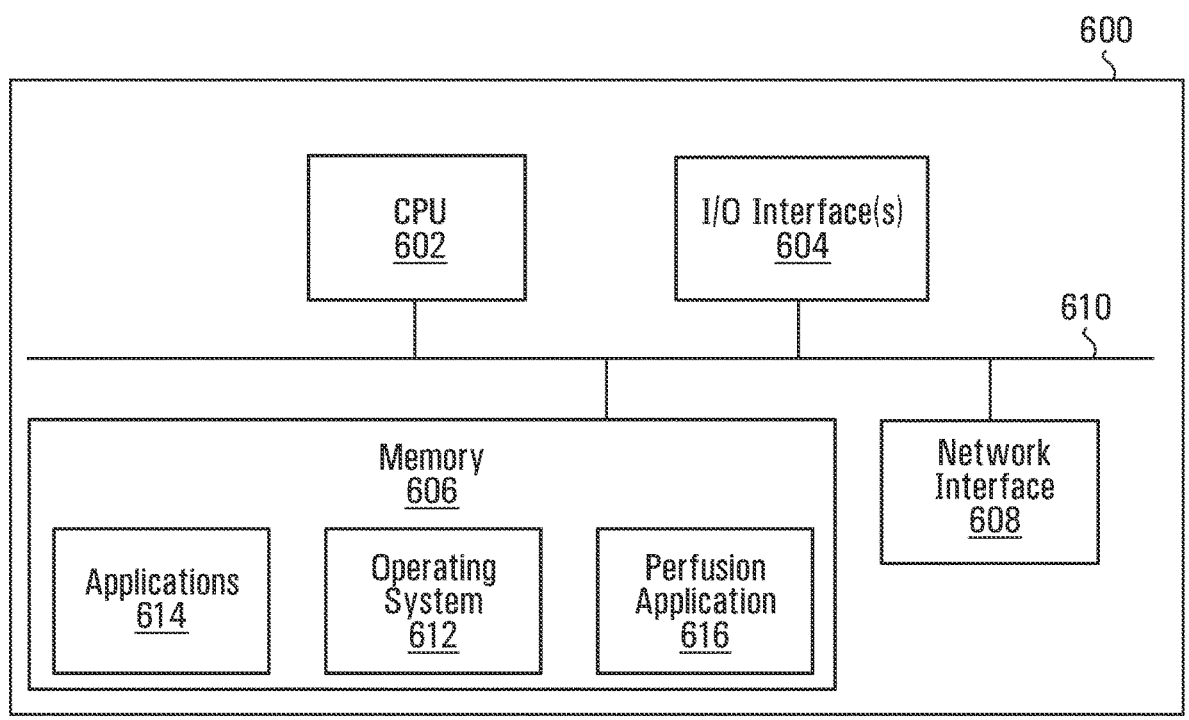
FIG. 9 is a block diagram of a computing device used in an embodiment of the control system of FIG. 1.

FIG. 9 is a high-level block diagram of a computing device 600, which is an example of controller 110. Computing device 600 may include or be part of a portable computing device (e.g., a mobile phone, netbook, laptop, personal data assistant (PDA), or tablet device) or a stationary computer (e.g., a desktop computer, or set-top box). As will become apparent, the computing device 600 includes software that allows a user to control and monitor an organ perfusion apparatus, such as apparatus 1000.

As illustrated, computing device 600 includes one or more processors 602, memory 606, a network interface 608 and one or more I/O interfaces 604 in communication over a bus 610.

One or more processors 602 may be one or more Intel x86, Intel x64, AMD x86-64, PowerPC, ARM processors or the like.

Memory 606 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network interface 608 serves as a communication device to interconnect the computing device 600 with one or more computer networks such as, for example, a local area network (LAN) or the Internet. Network interface 608 may be configured to enable computing device 600 to communicate with external devices via one or more networks. Network interface 608 may be a network interface card, such as an Ethernet card, an optical transceiver, a radio frequency transceiver, or any other type of device that can send and receive information.

One or more I/O interfaces 604 may serve to interconnect the computing device 600 with peripheral devices, such as for example, keyboards, mice, video displays, and the like (not shown). Optionally, network interface 608 may be accessed via the one or more I/O interfaces 604.

One or more I/O interfaces 604 may serve to collect information from and control components of the apparatus of the invention, as exemplified by apparatus 100. For instance, an I/O interface 604 may communicate by wire or wirelessly with centrifugal pumps, pressure sensors, flow sensors, heat exchangers, and gas exchangers.

I/O interfaces 604 may be configured to receive input from a user. Input from a user may be generated as part of a user running one or more software applications.

Software comprising instructions is executed by one or more processors 602 from a computer-readable medium. For example, software may be loaded into random-access memory from persistent storage of memory 606 or from one or more devices via I/O interfaces 604 for execution by one or more processors 602. As another example, software may be loaded and executed by one or more processors 602 directly from read-only memory.

Memory 606 stores an operating system 612, applications 614, and a perfusion application 616. Operating system 612 may be configured facilitate the interaction of applications, such as an application 614 and a perfusion application 616, with processor(s) 602, memory 606, I/O interfaces 604, and network interface 608 of computing device 600.

Operating system 612 may be an operating system designed to be installed on laptops and desktops. For example, operating system 612 may be a Windows operating system, Linux, or Mac OS. In another example, if computing device 600 is a mobile device, such as a smartphone or a tablet, operating system 612 may be one of Android, iOS or a Windows mobile operating system.

Applications 614 may be any applications implemented within or executed by computing device 600 and may be implemented or contained within, operable by, executed by, and/or be operatively/communicatively coupled to components of computing device 600. Applications 614 may include instructions that may cause processor(s) 602 of computing device 600 to perform particular functions. Applications 614 may include algorithms which are expressed in computer programming statements, such as, for loops, while-loops, if-statements, do-loops, etc. Applications may be developed using a programming language. Examples of programming languages include Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, Python, UNIX Shell, Visual Basic or Visual Basic Script, Virtual Reality Markup Language (VRML), ColdFusion™ and other compilers, assemblers, and interpreters.

Perfusion application 616 is an example of an application configured to perfuse an organ according to the techniques described herein. As described above, base unit 1001 may include graphical user interfaces that enable a user to monitor and/or control one or more perfusion parameters (e.g., flow). Perfusion application 616 may be configured to enable a user to monitor and/or control perfusion parameters using one or more graphical user interfaces. Perfusion application 616 may include different organ-specific components. That is, perfusion application 616 may be configured to enable a user to monitor and/or control perfusion parameters for specific organs/configurations of apparatus 1000.

It should be noted that although example computing device 600 is illustrated as having distinct functional blocks, such an illustration is for descriptive purposes and does not limit computing device 600 to a particular hardware architecture. Functions of computing device 600 may be realized using any combination of hardware, firmware and/or software implementations.

Figure 10:
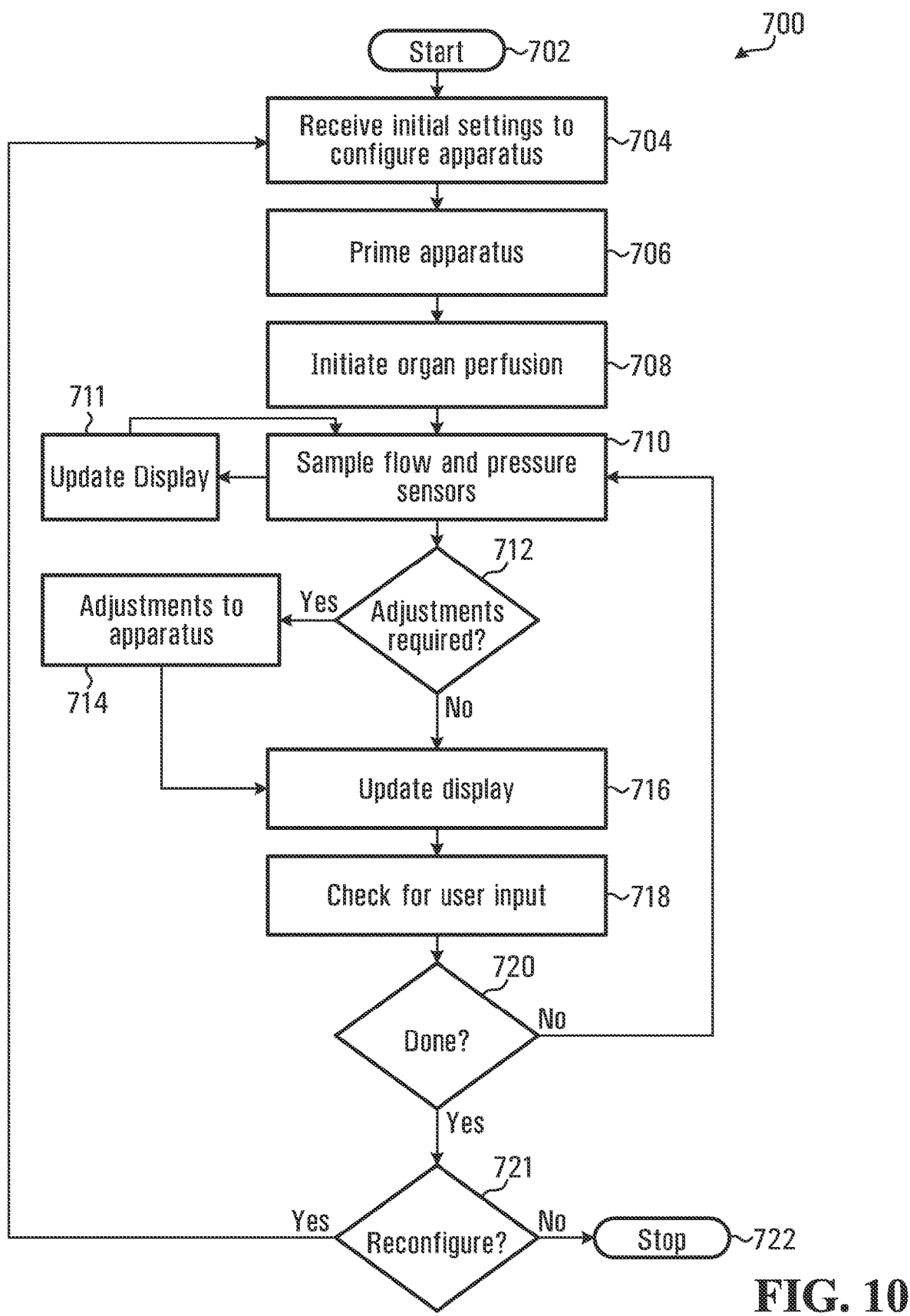
FIG. 10 is a flow chart illustrating an algorithm executed by the computer device of FIG. 9 for controlling operation of the apparatus of FIG. 1.

FIG. 10 is a flow chart of an algorithm 700 that can be executed by one or more processors 602 to monitor and control an apparatus of the disclosure, such as apparatus 1000.

The software is initiated by a signal provided by a user or automated process at block 702. At block 704, one or more processors 602 receive initial settings to configure the apparatus for the intended application, including the type of organ to be perfused, monitored, and/or controlled.

At block 706, one or more processors 602 communicates with one or more I/O interfaces 604 to prime the fluid subsystem 100 with fluid, such as a saline or a perfusate, prior to attachment of the organ.

At block 708, one or more processors 602 communicates with one or more I/O interfaces 604 to control the fluid subsystem 100 so as to initiate perfusion of an organ once attached.

At block 710, one or more processors 602 communicates with one or more I/O interfaces 604 to receive information from sensors (e.g., of flow, pressure, temperature, oxygen, and carbon dioxide) in the fluid subsystem 100 or other parts of the apparatus. Some or all of this information from the sensors is displayed at block 711, and the display may be continually or periodically updated with information received from the sensors. The software then determines at block 712 whether adjustments are required. If so, at block 714 adjustments are made to components of the fluid subsystem 100 (e.g., to change centrifugal pump speed), either according to predetermined settings or through live interfacing with a user. The steps at block 712 and block 714 may include PID calculations, similar to those described above with respect to FIGS. 5B, 6B, 7B, and 8B.

At block 716, the status of the integrated perfusion device is communicated to the user by updating the display, and at block 718 the software checks for user input (e.g. to change setpoints for feedback control). At block 720, it is determined whether perfusion is done, either according to predetermined settings or through live interfacing with a user. If perfusion is not done, the software returns to block 710 to again sample sensors. If perfusion is done, at block 721, it is determined whether the operation settings should be reconfigured, such as by loading a new configuration file. Reconfiguration may be required when a new organ-specific perfusion module is to be used, or when a different mode of operation is desired. If the settings are to be reconfigured, the software returns to block 704 to receive new initial settings. If the settings are not to be reconfigured, perfusion is stopped at block 722.

Another aspect of software 700 may be the recording of information from sensors in the apparatus and adjustments 714 made by the software. This information may be stored in memory 606.

As now can be appreciated, an example apparatus for perfusion of organs may include a plurality of organ-specific perfusion modules each comprising a perfusion chamber for perfusing a respective specific organ and a set of fluid conduits configured for connecting the specific organ to a source of a perfusate. The apparatus may also include a base unit, which includes a receptacle for removably mounting a selected organ-specific module onto the base unit, conduits connecting the source of the perfusate to the fluid conduits of each organ-specific perfusion module, to allow circulation of the perfusate through the respective specific organ. The base unit also includes first and second pumps coupled to the conduits for regulating circulation of the perfusate through the specific organ, a heat exchanger for controlling a temperature of the perfusate, a gas exchanger for oxygenating or deoxygenating the perfusate, and a controller for controlling the pumps and the heat exchanger to regulate circulation of the perfusate through the specific organ and to regulate a property or condition of the perfusate. The controller is configurable to regulate circulation of the perfusate based on a specific set of control settings associated with each one of the organ-specific modules.

It should also be understood that in some embodiments, in a method of perfusing a lung, a perfusate can be circulated through the lung by supplying the perfusate into the lung through a pulmonary artery and withdrawing the perfusate from the lung through a pulmonary vein. A first pressure is applied in the pulmonary artery to drive flow of the perfusate through the lung. A second pressure is applied in the pulmonary vein to resist the flow of the perfusate through the lung. The second pressure may be regulated to maintain the second pressure substantially constant.

In different embodiments, an apparatus for perfusion of multiple types of organs may include a base unit configured to removably couple with a perfusion module for perfusing an organ. The base unit includes conduits for connecting a source of a perfusate to the organ to circulate the perfusate through the organ. First and second pumps are coupled to the conduits for driving circulation of the perfusate in the conduits. A controller is configured and connected for controlling the first and second pumps to regulate the circulation of the perfusate through the organ. The controller is operable to control the first and second pumps to perfuse the organ in accordance with organ specific perfusion parameters, and wherein the organ specific perfusions parameters are selected based on the type of the organ and may be selected by an operator for at least two organ types selected from the group of heart, liver, kidney and lung.

In yet another embodiment, an apparatus for perfusing lungs may be provided. The apparatus may include conduits for connecting a source of a perfusate to a lung to circulate the perfusate through the lung. The conduits include a first conduit connectable to supply the perfusate into the lung through a pulmonary artery of the lung and a second conduit connectable to return perfusate egressed from the lung to the source through a pulmonary vein of the lung. A first pump is coupled to the first conduit for driving flow of the perfusate into the lung. A second pump is coupled to the second conduit for resisting flow of the perfusate out of the lung. A controller is provided for controlling the first and second pumps to regulate circulation of the perfusate through the lung. The apparatus may include a ventilator for ventilating the lung. Sensors may be provided to monitor the circulation parameters and conditions of the lung, as can be understood by those skilled in the art in view of this disclosure.

The following examples further illustrate embodiments of the present disclosure, or demonstrate functionalities that could be achieved with various configurations or combinations described herein.

Example 1

Figure 11:
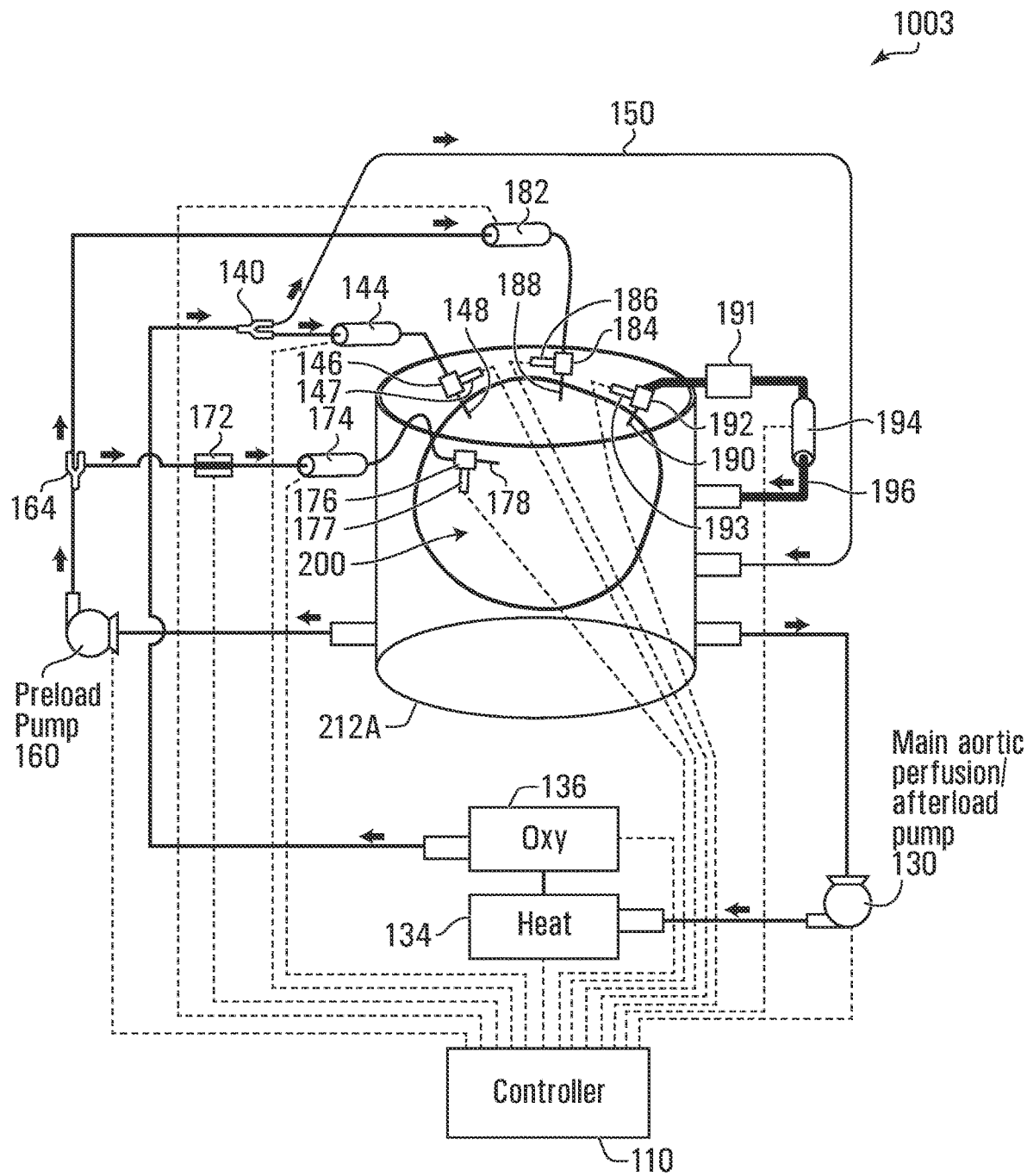
FIGS. 11 and 12 are schematic diagrams of an apparatus for heart perfusion.
Figure 12:
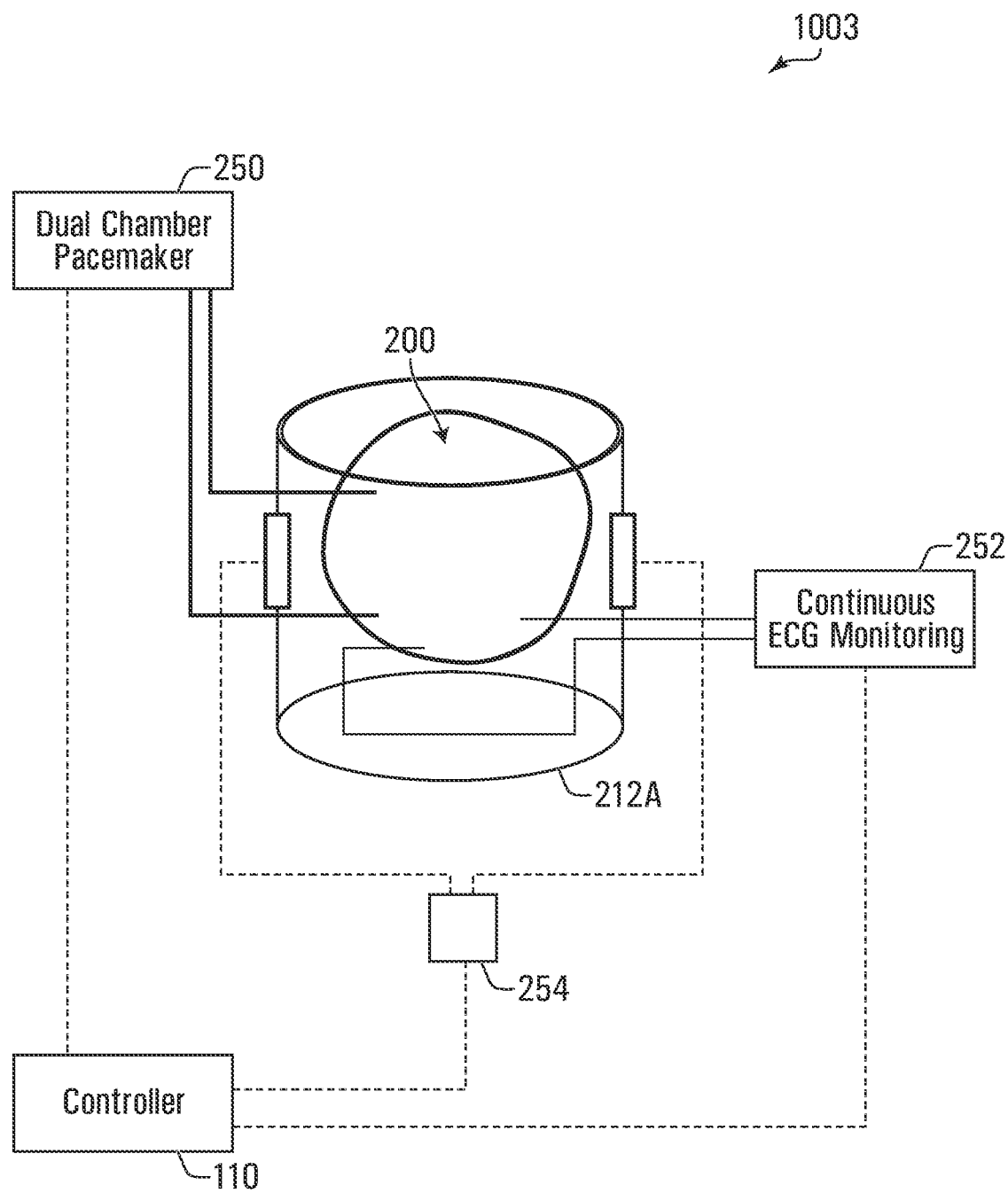

An apparatus 1003 was assembled and configured as depicted in FIGS. 11 and 12 for testing perfusion of a heart.

Only some of the relevant components of apparatus 1003 are shown in FIGS. 11 and 12. The conduits in a base unit 1001 were primed with saline prior to attachment of the conduits to a heart-specific perfusion module 212A.

Standard procurement methods were used to obtain a pig heart 200. Long sections of aorta, pulmonary artery and superior vena cava were excised with the heart to ensure adequate space for cannulation with the ex vivo perfusion system. After excision, a XVIVO™ flexible cone cannula 288 was sewn to the left atrium 206 and a ½ inch polycarbonate tubing connector 248 was inserted into the ascending aorta 208. Cannulae with ⅜ inch connectors 278 and 290 were secured to the superior and inferior vena cava 202 and the pulmonary artery 204, respectively.

The excised pig heart 200, with attached cannulae, was mounted onto a removable support that formed part of heart-specific module 212A. The heart 200 was suspended within a polycarbonate reservoir. Securing clamps attached to the mast of the rig stabilized all lines, leaving the heart unrestricted on all sides. The saline prime was displaced with swine blood to leave a blood prime with a hematocrit of 20-24%. Sodium bicarbonate and glucose were added to bring the prime within normal physiological blood ranges. The heart was de-aired by atrial filling and an air-free connection was made to the circuit. Heart-specific module 212A included a reservoir 120 for the perfusate.

This heart-specific perfusion module 212A was attached to a base unit 1001 to form the apparatus 1003, as depicted in FIG. 11. The tubing connector 248 connects the aorta 208 to the free end of a conduit 148. The cannula 290 connects the pulmonary artery 204 to the free end of a conduit 190. The cannula 278 connects the right atrium 202 to the free end of a conduit 178. The cannula 288 connects the left atrium 206 to the free end of a conduit 188. Conduit 150 was ¼ inch tubing; conduit 196 was ½ inch tubing; all other conduits were ⅜ inch tubing.

As depicted in FIG. 12, the heart 200 was also attached to a dual chamber pacemaker 250, a defibrillator 254, and an ECG monitor 252. The pacemaker 250, the defibrillator 254, and the ECG monitor 252 were connected to the controller 110. Heart-specific parameters were entered into the software 700 that operated the controller 110.

As depicted in FIG. 11, perfusion in resting mode was commenced at 300-500 milliliters per minute (mL/min) with a pressure of 50-60 mmHg from the centrifugal pump 130 to achieve coronary blood flow. The venous blood from the coronary sinus was collected from the pulmonary artery 204 and flowed through the conduit 190 to a soft shell reservoir 191, so that the perfusate could not siphon back to the reservoir. Perfusate in the soft shell reservoir 191 flowed to the reservoir 120 through the conduit 196.

After 15 min of stable resting mode perfusion, biventricular preload was instituted gradually to obtain a heart in working mode. The centrifugal pump 160 was turned on and the occlusion clamp 172 was released, increasing preload on the right and left atrium. As the heart started to eject against the retrograde flow into the aorta from the conduit 148, the speed of the centrifugal pump 130 was adjusted to provide afterload to the ejecting left ventricle and maintain aortic diastolic pressure.

When flow probes indicated that the heart was ejecting, a Ventri-Cath multi-segment 8-electrode combined pressure/volume catheter (Millar Instruments Inc., Houston, Tex., USA) was inserted along the longitudinal axis of the left ventricle with the proximal electrode at the level of the aortic valve (not shown). In similar fashion, another catheter was inserted into the right ventricle via the pulmonary artery (not shown). Data was collected at a sampling rate of 200 Hz with Lab chart 7 (AD Instruments, Bella Vista, NSW, Australia) using a Powerlab AD module (not shown).

With the apparatus 1003, standard cardiac functional parameters were evaluated through the continuous measurement of left and right ventricular output, stroke volume, and stroke work. With the addition of ventricular pressure catheters, maximal and minimal rate of pressure change over time (dP/dT max and min) and the ventricular relaxation constant (Tau) were evaluated as well. Through the addition of flow probes on the aortic and pulmonary artery cannulas, the change in volume over time (dV/dT max and min) were evaluated. Measurements were obtained using catheters and fluid filled catheters or flow probes that were integrated into the test system.

As disclosed in FIGS. 4-5 in WO 2013/106908, the attribute of a centrifugal pump providing afterload to the ejecting left ventricle may be demonstrated by increasing pump speed (rpm) resulting in an increase in aortic root pressure with a compensatory rise in left atrial pressure as the heart attempts to accommodate the increased afterload.

Figure 13:
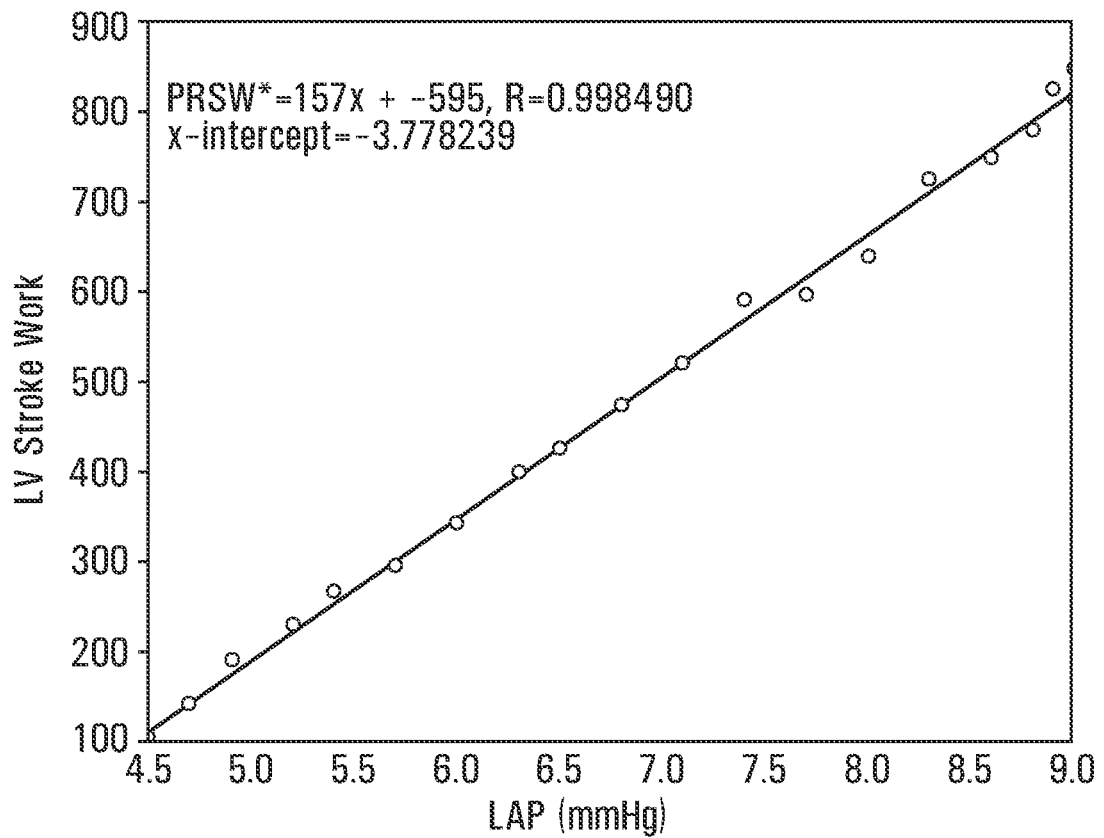
FIG. 13 is a line graph showing representative test results obtained using the apparatus of FIG. 11.

Using apparatus 1003, which includes a heart-specific module with a pig heart, as depicted in FIG. 11, standard cardiac functional parameters were evaluated through the continuous measurement of left and right ventricular output, stroke volume, and stroke work. With the addition of ventricular pressure catheters (not shown), maximal and minimal rate of pressure change over time (dP/dT max and min) and the ventricular relaxation constant (Tau) were evaluated as well. Through the addition of flow probes on the aortic and pulmonary artery cannulas, the change in volume over time (dV/dT max and min) was evaluated. The preload recruitable stroke was estimated through a gradual reduction in the preload pump speed (rpm), while continuously recording stroke work and atrial pressure, as illustrated in the graph of FIG. 13.

The circuit was effective during resting and working modes whilst proving to be successful in maintaining cardiac function in excess of five hours.

Example 2

Figure 14:
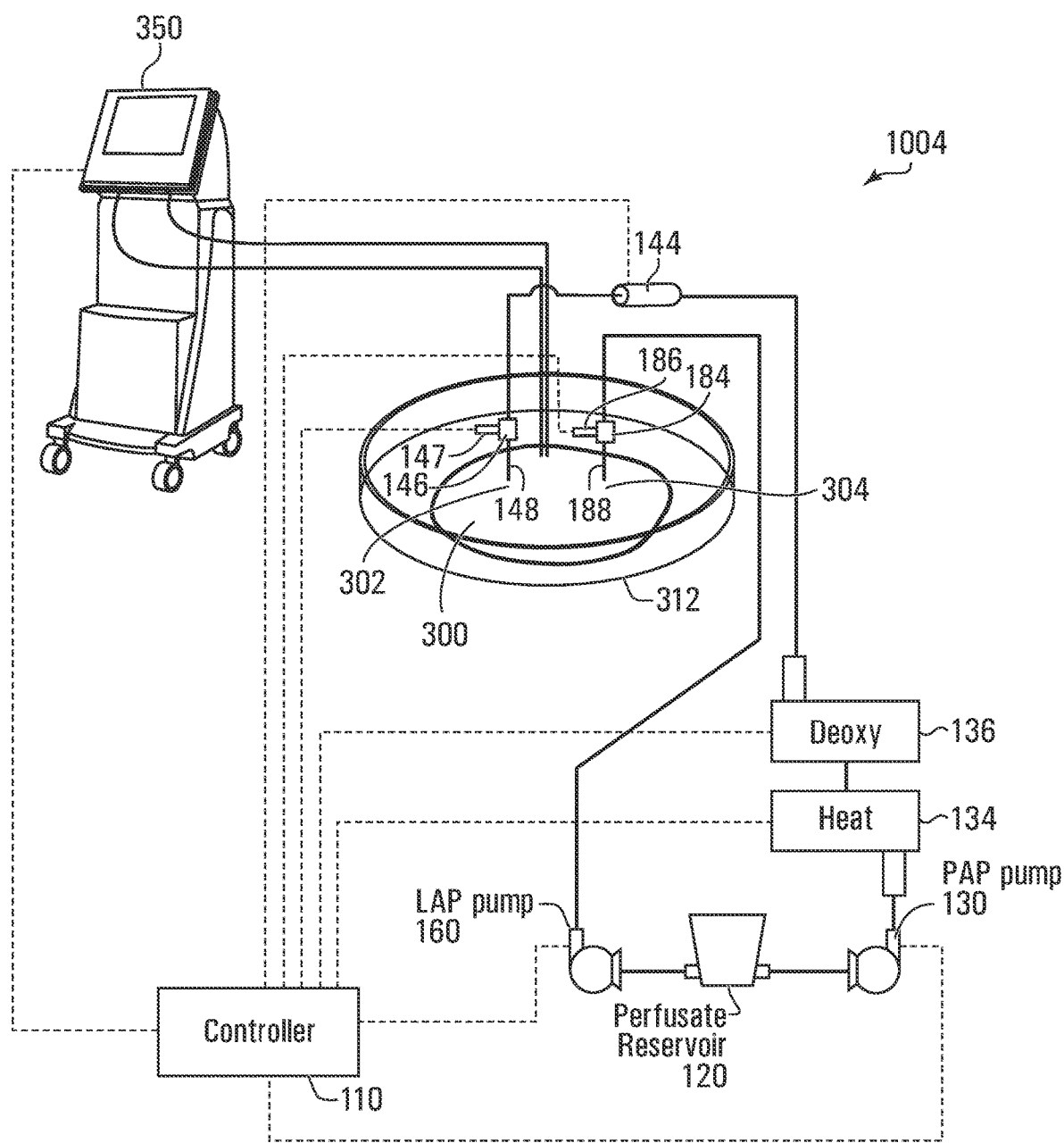
FIG. 14 is a schematic diagram of an apparatus for lung perfusion.

An apparatus 1004 was assembled and configured as depicted in FIG. 14 for testing perfusion of a lung.

The lungs 300 of a pig were harvested, mounted in a lung-specific perfusion module 312, and attached to a base unit 1001 (but only some relevant components thereof are shown in FIG. 14) to form the apparatus 1004. Lung-specific parameters were entered into the software 700 that operated the controller 110.

The trachea of the excised pig lungs 300 was connected to a ventilator 350, namely an Evita XL available from Drager. Ventilator parameters that were measured included peak/plateau pressures and positive end-expiratory pressure ("PEEP"), inspired and expired tidal volume, minute ventilation, airway compliance and resistance.

The dual pump configuration illustrated in FIG. 14 created a basic resistance to flow against the excised left atrium 304 of the heart, providing a constant left arterial pressure ("LAP") compared to typical manually-adjusted systems. Automation of LAP allowed for less inter-/intra-operator variability. In one experiment, the apparatus 1004 was able to maintain user-specified pulmonary artery (mean±standard error of the mean: 6.57±0.02 mmHg) and left arterial (2.24±0.01 mmHg) pressures constantly during ex vivo lung perfusion for up to 12 hours with minimal adjustment required on the part of the user. In another experiment, the apparatus 1004 was able to detect and respond to changes in pulmonary vascular resistance ("PVR") over time (311.2±30.0 dynes·s·cm$^{-5}$).

As illustrated in FIG. 14, the apparatus 1004 provided a closed circuit system with tight regulation of pulmonary artery pressure ("PAP") and flow, in addition to left atrial pressure ("LAP") control. A centrifugal pump 130 ("PAP pump") provided flow through a heat exchanger 134 and a gas exchanger 136 which served to deoxygenate the perfusate and add carbon dioxide. Conditioned perfusate flowed through a conduit 148 into the pulmonary artery 302, with either constant pressure or constant flow, depending on user preference. Flow egressed from the excised left atrium 304 of the heart and into a conduit 188. A centrifugal pump 160 ("LAP pump") provided a constant, physiological back pressure to the left atrium 304. In one example, through a graphical user interface (not shown) for a controller 110, the user could specify the desired perfusion parameters including pump speed, flow and pressure.

Figure 15:
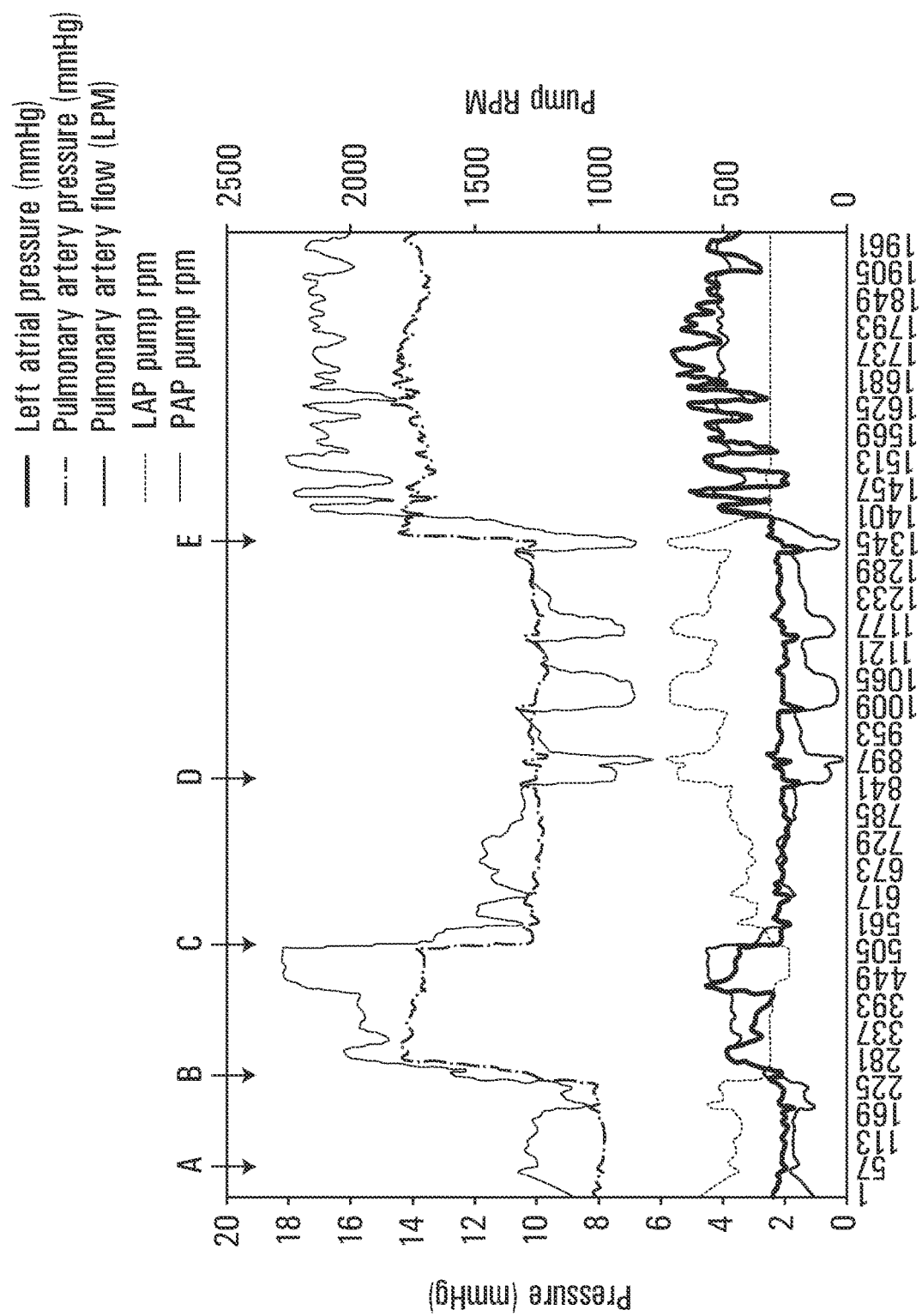
FIG. 15 is a line graph showing representative test results obtained using the apparatus of FIG. 14.

The graph in FIG. 15 illustrates feedback control of pump speed, flow and pressure. The reported parameters are left atrial pressure (mmHg), pulmonary artery pressure (mmHg), pulmonary artery flow in litres per minutes (LPM), centrifugal pump 160 speed ("LAP pump rpm"), and centrifugal pump 130 speed ("PAP pump rpm").

At point "A" in FIG. 15, PAP was set to 8 mmHg and LAP was set to 2 mmHg. Pressure was maintained while pump speed in rotations per minutes ("rpm") varied. At point "B" in FIG. 15, PAP was increased to 14 mmHg. The PAP pump 130 consequently increased speed, and therefore flow, until the desired PAP was achieved. With the increased flow, less speed was required to maintain LAP and thus the LAP pump 160 speed decreased to maintain the set LAP of 2 mmHg. At point "C" in FIG. 15, PAP was lowered to 10 mmHg, and LAP was maintained at 2 mmHg. With the decrease in flow, the LAP pump 160 increased speed to maintain a constant 2 mmHg LAP. At point "D" in FIG. 15, the lungs 300 were ventilated with air lacking oxygen to induce hypoxic pulmonary vasoconstriction. As vascular resistance increased, if pump speed were to remain constant, pressure would increase. The apparatus 1004 reacted to the increased resistance by decreasing the speed of the PAP pump 130 and therefore flow, to maintain the desired pressure of 10 mmHg. Similarly, the LAP pump 160 speed varied to maintain the desired pressure of 2 mmHg. At point "E" in FIG. 15, PAP was set to 14 mmHg, and the LAP pump 160 was set to a constant 300 rpm. As can be clearly seen in FIG. 15, after point "E", without the feedback loop being active, LAP is sporadic and uncontrolled.

Example 3

Figure 16:
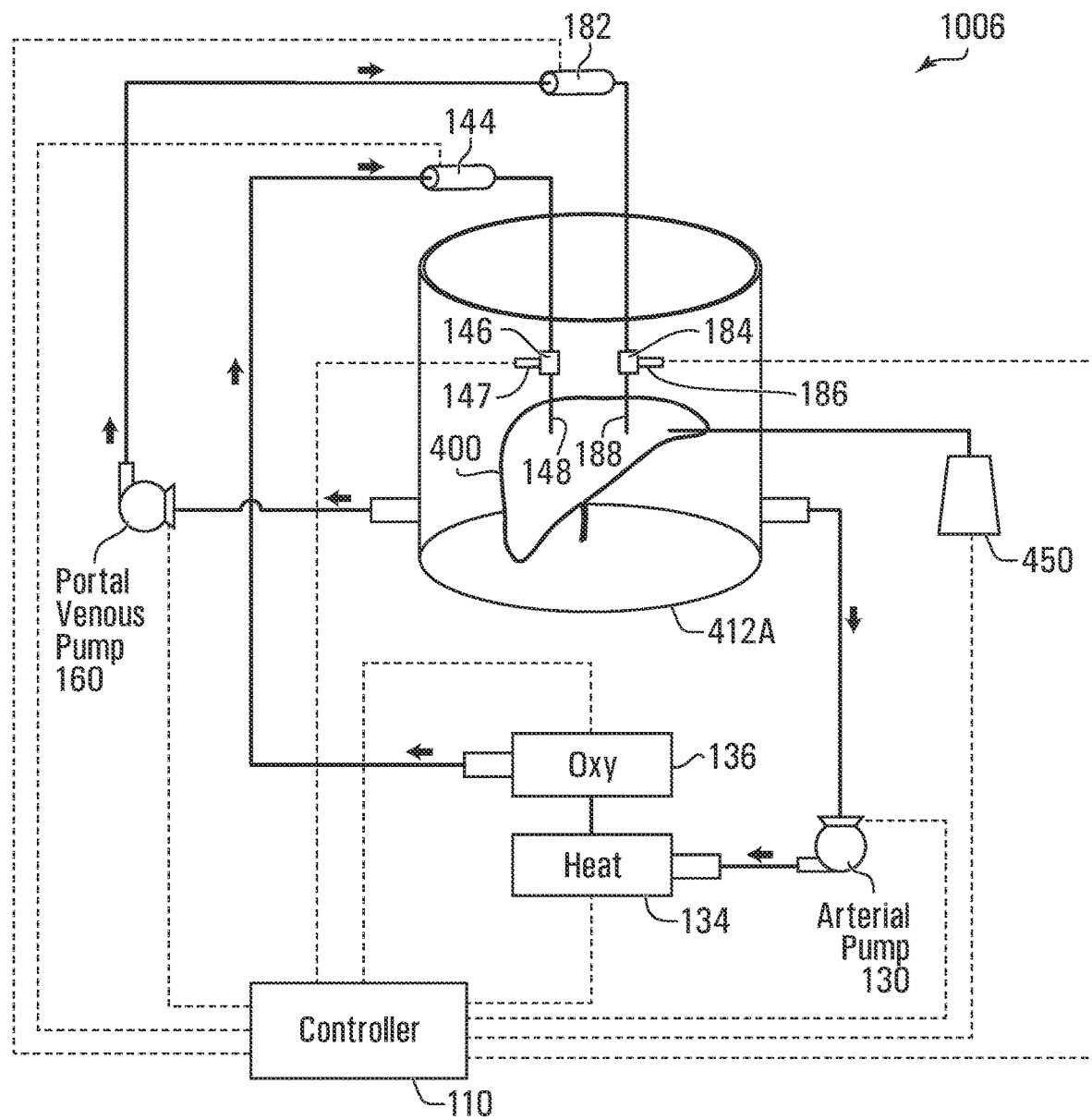
FIG. 16 is a schematic diagram of an apparatus for liver perfusion.

An apparatus 1006 was assembled and configured as depicted in FIG. 16, for testing perfusion of a liver.

A liver 400 was procured from a pig, mounted in a liver-specific perfusion module 412A, and attached to a base unit 1001 (but only some relevant components thereof are shown in FIG. 16) to form the apparatus 1006. The perfusion module 412A included a reservoir 120 for the perfusate. The liver was also attached to a bile collector 450. The liver was perfused with a whole blood-based perfusate solution by pumping through centrifugal pump 130 ("arterial pump") into a conduit 148, which was connected to the hepatic artery 402, and by pumping through centrifugal pump 160 ("portal venous pump") into a conduit 188, which was connected to the portal vein 404.

Figure 17:
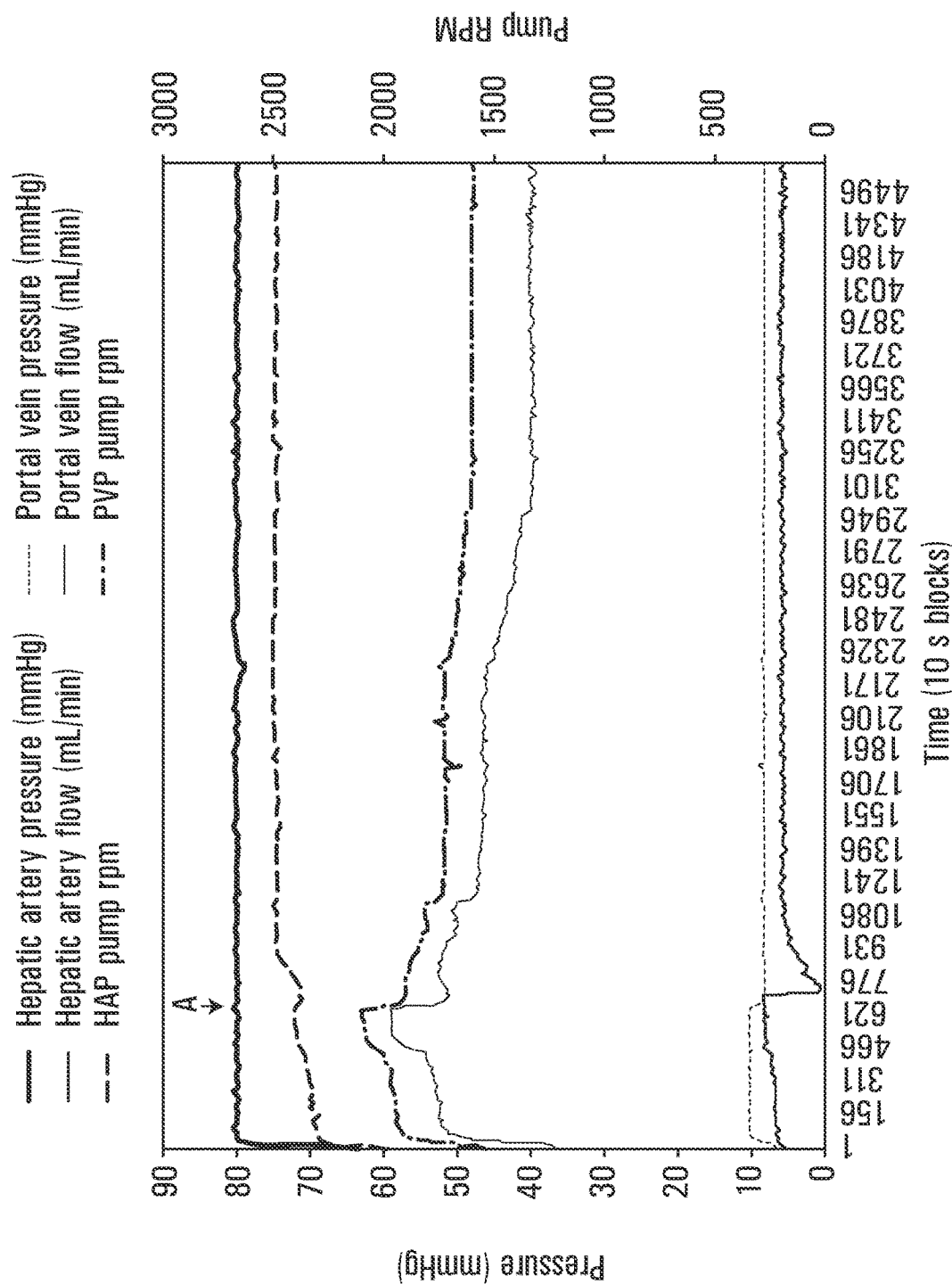
FIG. 17 is a line graph showing representative test results obtained using the apparatus of FIG. 16.

The graph in FIG. 17 demonstrates certain parameters over the perfusion interval for the apparatus 1006 depicted in FIG. 16. Recorded parameters were the hepatic artery pressure (mmHg), the hepatic artery flow (mL/min), the centrifugal pump 130 speed in rpms ("HAP pump rpm"), the portal vein pressure (mmHg), the portal vein flow (mL/min), and the centrifugal pump 160 speed in rpms ("PVP pump rpm").

The hepatic artery pressure was set at 80 mm Hg and the pressure remained constant throughout the perfusion interval, with pump speed (in rpms) and therefore flow varying as the hepatic arterial resistance changed over time. The portal venous pressure was initially set to 10 mm Hg, and then lowered to 8 mm Hg at point "A" in FIG. 17. The graph FIG. 17 demonstrates that pressure was held constant while pump speed and therefore flow changed to maintain the desired pressure.

Example 4

Figure 18:
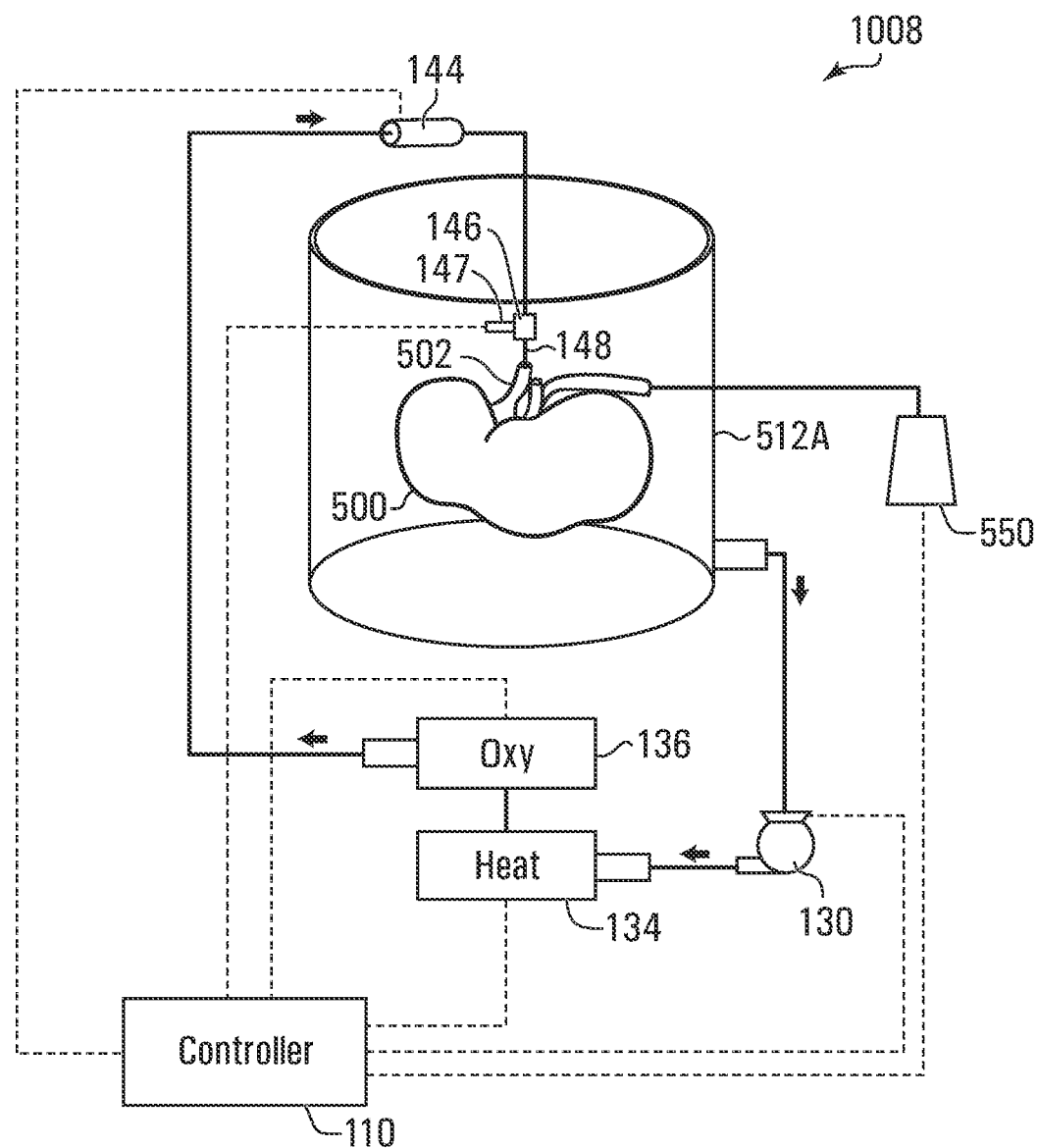
FIG. 18 is a schematic diagram of an apparatus for kidney perfusion.

An apparatus 1008 was assembled as depicted in FIG. 18 for testing perfusion of kidney.

Figure 19:
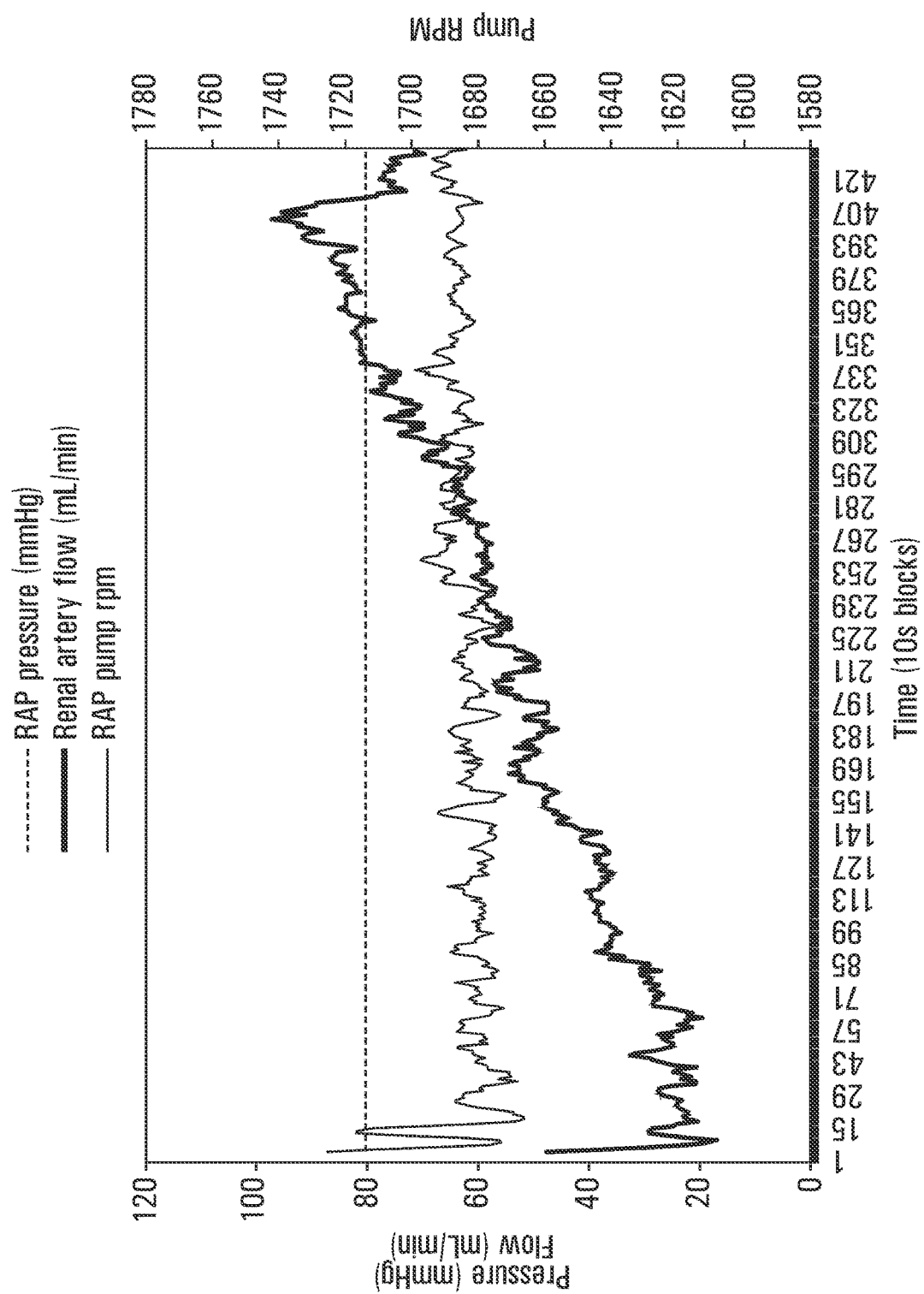
FIG. 19 is a line graph showing representative test results obtained using the apparatus of FIG. 18.

A kidney 500 was procured from a pig, mounted in a kidney-specific module 512A, and attached to an embodiment of base unit 1001 (but only some relevant components thereof are shown in FIG. 18) to form the apparatus 1008. The kidney was also attached to a waste collector 550. The kidney was perfused by pumping through the centrifugal pump 130 into a conduit 148, which was connected to the renal artery 502. The graph in FIG. 19 demonstrates certain perfusion parameters over the perfusion interval, including renal artery pressure ("RAP"), renal artery flow (mL/min), and pump 130 speed in rpms ("RAP pump rpm").

Concluding Remarks

Selected Embodiments of the present invention may be used in a variety of fields and applications. For example, they may have applications in transplantation surgery and research.

Other features, modifications, and applications of the embodiments described here may be understood by those skilled in the art in view of the disclosure herein.

It will be understood that any range of values herein is intended to specifically include any intermediate value or sub-range within the given range, and all such intermediate values and sub-ranges are individually and specifically disclosed.

The word "include" or its variations such as "includes" or "including" will be understood to imply the inclusion of a stated integer or groups of integers but not the exclusion of any other integer or group of integers.

It will also be understood that the word "a" or "an" is intended to mean "one or more" or "at least one", and any singular form is intended to include plurals herein.

It will be further understood that the term "comprise", including any variation thereof, is intended to be open-ended and means "include, but not limited to," unless otherwise specifically indicated to the contrary.

When a list of items is given herein with an "or" before the last item, any one of the listed items or any suitable combination of two or more of the listed items may be selected and used.

Of course, the above described embodiments of the present disclosure are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A method of perfusing a lung, comprising:
circulating a perfusate through the lung by supplying the perfusate into the lung through a pulmonary artery and withdrawing the perfusate from the lung through a pulmonary vein;
applying a first pressure in the pulmonary artery to drive flow of the perfusate through the lung; and
applying a second pressure in the pulmonary vein to resist the flow of the perfusate driven by the first pressure through the lung, wherein the second pressure is regulated independent of a flow rate of the flow of the perfusate through the lung.

2. The method of claim 1, comprising regulating the second pressure to maintain the second pressure substantially constant.

3. The method of claim 1, wherein the second pressure is applied using a pump.

4. The method of claim 3, wherein the pump comprises a centrifugal pump.

5. The method of claim 1, wherein the second pressure is automatically regulated.

6. The method of claim 1, wherein the first pressure is applied using a first pump, and the second pressure is applied using a second pump.

7. The method of claim 6, wherein the first pressure and the second pressure are automatically regulated using a controller controlling operations of the first pump and the second pump.

8. The method of claim 6, wherein the first and second pumps are centrifugal pumps.

9. The method of claim 3, comprising measuring the second pressure and adjusting a pump speed of the pump based on a measured value of the second pressure.

10. The method of claim 9, comprising measuring the first pressure and adjusting the pump speed of the pump based on measured values of the first pressure and the second pressure.

11. The method of claim 1, wherein the first pressure and the second pressure are individually and independently regulated.

12. The method of claim 1, wherein the first pressure, the second pressure and the flow rate are regulated independently.

13. A method of perfusing a lung, comprising:
circulating a perfusate through the lung by supplying the perfusate into the lung through a pulmonary artery and withdrawing the perfusate from the lung through a pulmonary vein;
applying a first pressure in the pulmonary artery by a first pump to drive flow of the perfusate through the lung; and
applying a second pressure in the pulmonary vein by a second pump to resist the flow of the perfusate driven by the first pressure through the lung, and
adjusting one or more of the first pressure and the second pressure without changing the flow rate.

14. A method of perfusing a lung, comprising:
circulating a perfusate through the lung by supplying the perfusate into the lung through a pulmonary artery and withdrawing the perfusate from the lung through a pulmonary vein;
applying a first pressure in the pulmonary artery to drive flow of the perfusate through the lung; and applying a second pressure in the pulmonary vein to resist the flow of the perfusate driven by the first pressure through the lung, wherein the first pressure, the second pressure, and a flow rate of the flow of the perfusate through the lung are independently regulated.

15. The method of claim 14, comprising adjusting one or both of the first pressure and the second pressure without changing the flow rate.

* * * * *